United States Patent [19]
Johnson et al.

[11] Patent Number: 5,673,252
[45] Date of Patent: Sep. 30, 1997

[54] COMMUNICATIONS PROTOCOL FOR REMOTE DATA GENERATING STATIONS

[75] Inventors: Dennis F. Johnson; Don Marcynuk; Erwin Holowick, all of Winnipeg, Canada

[73] Assignee: Itron, Inc., Spokane, Wash.

[21] Appl. No.: 451,386

[22] Filed: May 26, 1995

Related U.S. Application Data

[63] Continuation of Ser. No. 247,988, May 23, 1994, abandoned, which is a continuation-in-part of Ser. No. 124,495, Sep. 22, 1993, abandoned, which is a continuation of Ser. No. 732,183, Jul. 19, 1991, which is a continuation-in-part of Ser. No. 480,573, Feb. 15, 1990, Pat. No. 5,056,107.

[51] Int. Cl.$^6$ .................................................... H04J 3/16
[52] U.S. Cl. ................... 370/94.1; 370/95.2; 370/100.1
[58] Field of Search ........................ 370/95.1, 95.2, 370/95.3, 105.1, 105.4, 105.2, 94.1, 94.2, 94.3, 60, 60.1, 61, 100.1, 110.1, 85.1, 85.6, 85.08; 375/354, 355, 356, 357, 359, 363, 365, 366, 372; 340/825.5, 825.51, 825.52, 825.08; 455/13.3, 13.4, 51.1, 54.2, 58.1

[56] References Cited

U.S. PATENT DOCUMENTS

| | | | |
|---|---|---|---|
| 1,987,889 | 1/1935 | Beverage et al. | 342/367 |
| 3,705,385 | 12/1972 | Batz | 340/152 |
| 3,786,423 | 1/1974 | Martell | 340/151 |
| 3,860,870 | 1/1975 | Richardsn et al. | 370/11 |
| 4,013,962 | 3/1977 | Beseke et al. | 370/11 |

(List continued on next page.)

FOREIGN PATENT DOCUMENTS

| | | |
|---|---|---|
| 0244384 | 11/1987 | European Pat. Off. . |
| 0263421 | 4/1988 | European Pat. Off. . |
| 0366342 | 5/1990 | European Pat. Off. . |
| 2205260 | 10/1980 | Germany . |
| 2060843 | 4/1981 | Germany . |

OTHER PUBLICATIONS

WO93/14585 (PCT/US93/00014) with International Search Report.

*Primary Examiner*—Dang Ton
*Attorney, Agent, or Firm*—Patterson & Keough, P.A.

[57] ABSTRACT

A method for communicating data between a central data terminal, a plurality of intermediate data terminals, a plurality of remote cell nodes, and a plurality of network service modules, using a plurality of frames with each frame having a plurality of channels. The plurality of intermediate data terminals transmit IDT-synchronization signals to the plurality of remote cell nodes on a first channel of the frame. The plurality of remote cell nodes transmit RCN-synchronization signals to the plurality of network service modules on a second channel of the frame. The network service modules transmit data from a plurality of physical devices, using radio waves, as NSM-packet signals to the plurality of remote cell nodes using a fourth channel of the frame. The plurality of remote cell nodes store the incoming NSM-packet signals and, responsive to a first polling signal transmitted in a third channel of the frame from a particular intermediate data terminal, transmit the NSM-packet signals to the intermediate data terminal as RCN-packet signals on a fifth channel of the frame. The intermediate data terminal in turn stores the RCN-packet signals received from the plurality of remote cell nodes and, responsive to a second polling signal transmitted from the central data terminal on a sixth channel of the frame, transmits the RCN-packet signals as an IDT-packet signal on a seventh channel of the frame to the central data terminal.

85 Claims, 39 Drawing Sheets

U.S. PATENT DOCUMENTS

| | | | |
|---|---|---|---|
| 4,040,046 | 8/1977 | Long et al. | 340/310 |
| 4,190,800 | 2/1980 | Kelly, Jr. et al. | 340/310.02 |
| 4,361,851 | 11/1982 | Asip et al. | 358/84 |
| 4,388,690 | 6/1983 | Lumsden | 364/483 |
| 4,495,596 | 1/1985 | Sciulli | 364/900 |
| 4,661,804 | 4/1987 | Abel | 340/539 |
| 4,707,679 | 11/1987 | Kennon et al. | 340/310 |
| 4,734,680 | 3/1988 | Gehman et al. | 340/539 |
| 4,780,910 | 10/1988 | Huddleston et al. | 455/617 |
| 4,783,623 | 11/1988 | Edwards et al. | 324/156 |
| 4,799,059 | 1/1989 | Grindahl et al. | 340/870.03 |
| 4,799,062 | 1/1989 | Sanderford et al. | 342/450 |
| 4,804,938 | 2/1989 | Rouse et al. | 340/310 |
| 4,815,106 | 3/1989 | Propp et al. | 375/257 |
| 4,839,642 | 6/1989 | Batz et al. | 340/825 |
| 4,887,259 | 12/1989 | Morita | 370/60 |
| 4,952,928 | 8/1990 | Carroll et al. | 340/825.54 |
| 4,958,645 | 9/1990 | Cadell et al. | 128/903 |
| 5,014,213 | 5/1991 | Edwards et al. | 364/483 |
| 5,056,107 | 10/1991 | Johnson et al. | 375/200 |
| 5,086,292 | 2/1992 | Johnson et al. | 340/637 |
| 5,132,968 | 7/1992 | Cephus | 370/94.1 |
| 5,166,664 | 11/1992 | Fish | 340/539 |
| 5,239,575 | 8/1993 | White et al. | 379/107 |
| 5,264,828 | 11/1993 | Meiksin et al. | 340/539 |
| 5,381,136 | 1/1995 | Powers et al. | 340/539 |

Fig. 3

| PREAMBLE | OPENING FRAME | MESSAGE TYPE | MESSAGE IDENT'N | SERVICE MODULE TYPE | MESSAGE NUMBER | SERVICE MODULE ADDRESS | DATA FIELD | ERROR DETECTION | CLOSING FRAME |

Fig. 4

| GROUP | | APPLICATION |
|---|---|---|
| 1. · BILLING | 1.1 | BASIC MONTHLY BILLING (RES./COMMERCIAL) |
| | 1.2 | TIME OF USE BILLING (RES./COMMERCIAL) |
| | 1.3 | DEMAND BILLING (RES./COMMERCIAL) |
| | 1.4 | CONSOLIDATED BILLS FOR MULTI-SITE CUSTOMERS E.G. BILLBOARD OPERATORS (COMMERCIAL) |
| | 1.5 | PREPAYMENT CUSTOMER SUPPORT (RESIDENTIAL) |
| 2. · SPECIAL READS | 2.1 | CUSTOMER INQUIRIES (1-3 MONTH DAILY CONSUMPTION RECORD AVAILABLE FOR EACH CUSTOMER) |
| | 2.2 | OPENING ACCOUNTS (CURRENT READING AVAILABLE) |
| | 2.3 | CLOSING ACCOUNTS (CURRENT READING AVAILABLE) |
| | 2.4 | REFUND AUTHORIZATION ON PREPAYMENTS |
| 3. · UNAUTHORIZED SERVICE USE | 3.1 | SOURCE OF LOSSES |
| | 3.2 | METER TAMPER DETECTION AND MONITORING |
| | 3.3 | REVENUE DIVERSION ESTIMATION |
| 4. · GRID STATUS | 4.1 | DISTRIBUTION GRID OUTAGE (FUSE, RECLOSER, SECTIONALIZER, DISTRIBUTION TRANSFORMER) |
| | 4.2 | INDIVIDUAL SERVICE LOSS |
| | 4.3 | RESTORATION NOTIFICATION |
| 5. · SERVICE QUALITY | 5.1 | OUTAGE INFORMATION |
| | 5.2 | VOLTAGE ON LINES |
| 6. · GRID CONFIGURATION MANAGEMENT | 6.1 | CAPACITOR BANK SWITCHING |
| | 6.2 | TRANSFORMER LOAD MANAGEMENT |
| | 6.3 | FEEDER LOAD MANAGEMENT |
| | 6.4 | SECTIONALIZER CONTROL |
| 7. · LOAD CONTROL | 7.1 | AIR CONDITIONERS |
| | 7.2 | WATER HEATERS |
| | 7.3 | POOL PUMPS/HEATERS |
| 8. · SERVICE CONTROL | 8.1 | SERVICE CONNECT |
| | 8.2 | SERVICE DISCONNECT |
| | 8.3 | SERVICE LIMITATION |
| 9. · LOAD SURVEY | 9.1 | 15 MINUTE RESOLUTION LOAD SURVEY |
| 10. · SUB-STATION MONITORING SUB-SCADA AND SCADA | 10.1 | TRANSFORMERS (TEMPERATURE, VOLTAGE, DEMAND, ETC.) |
| | 10.2 | OTHER |
| 11. · LOAD CURTAILMENT MONITORING AND NOTIFICATION | 11.1 | HIGH RESOLUTION READINGS ON DEMAND |
| | 11.2 | CENTRALIZED CONTROL FOR MULTIPLE-STATE GEOGRAPHIC AREAS |
| | 11.3 | CUSTOMER NOTIFICATION (CRT, PAGE, RADIO) |

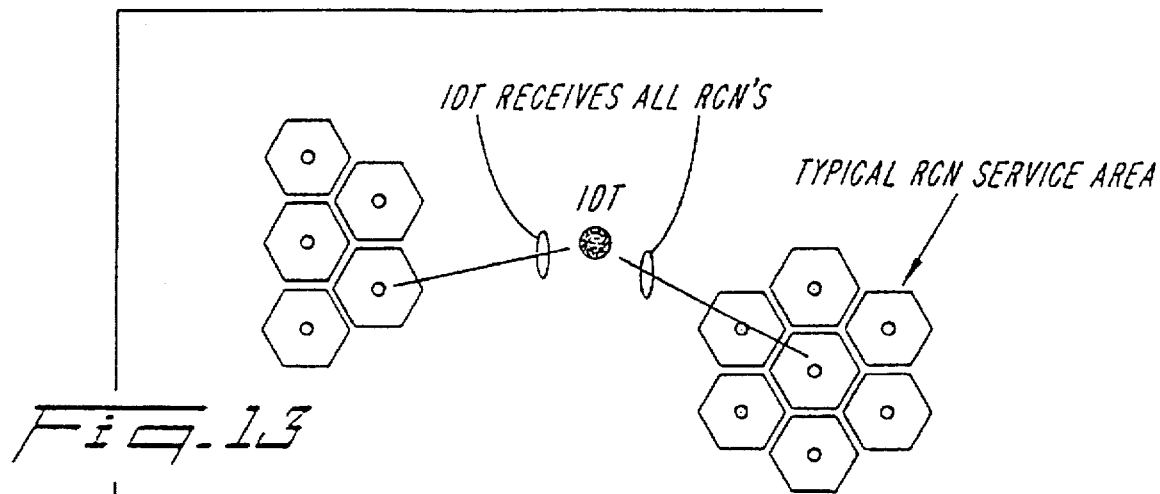
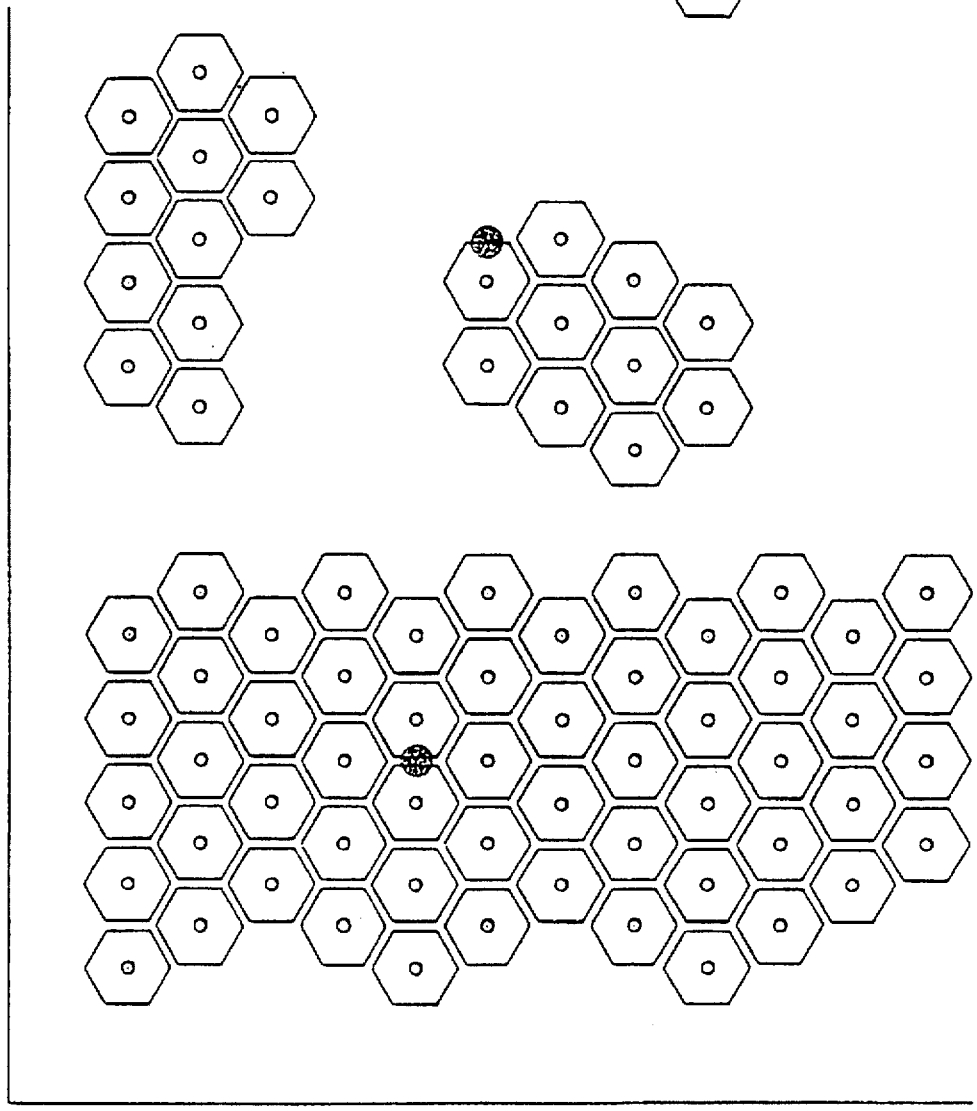
Fig. 13

(f) THE TWO RND SLOTS PER CYCLE WHICH COMPRISE RND (0).3.X000

FIG. 16

| LEADING GUARD | PREAMBLE | DATA LINK PACKET | TRAILING GUARD |
|---|---|---|---|
| | | | STOP BIT |

FIG. 17

| DATA CHANNEL SLOT DESCRIPTION ||||||||||
|---|---|---|---|---|---|---|---|---|---|
| SLOT || LEADING GUARD || PREAMBLE || DL PACKET ||| TRAILING GUARD |
| NAME | SIZE (ms) | TX DELAY (ms) | RX DELAY (ms) | TX (ms) | RX (min) (ms) | SIZE (ms) | BITS || ÷ | (ms) |
| | | | | | | | FLAG | PKT | | |
| NRR | 100 | 6±1 | 8 | 12 | 8 | 80 | 8 | 152 | F | 2±1 |
| RND | 100 | 8 | 7±1 | 0 | 0 | 90 | 6 | 84‡ | F | 2 |
| RNC | 100 | 8 | 7±1 | 0 | 0 | 90 | 6 | 84‡ | F | 2 |
| IRH | 100 | 8 | 8 | 10 | 8 | 80 | 8 | 152 | F | 2 |
| RIQ | 100 | 8 | 8 | 10 | 8 | 80 | 8 | 152 | F | 2 |
| IRD | 500 | 8 | 8 | 10 | 8 | 480 | 8 | 952 | V | 2 |
| RIR | 500 | 8 | 8 | 10 | 8 | 480 | 8 | 952 | V | 2 |

÷ - FIXED VS. VARIABLE LENGTH PACKET
‡ - NOT A MULTIPLE OF 8

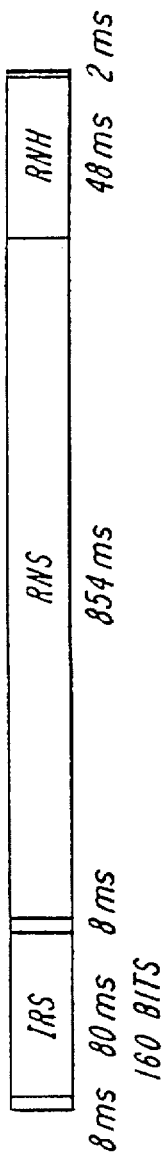
FIG. 18
FIG. 19
FIG. 20

FIG. 21

| SYNCHRONIZATION PATTERN (011111110) | COUNT TO RNH |
|---|---|
| (12) | (6) |

FIG. 22

| SETTLING TIME (1111111111) | FREQUENCY VERIFICATION (111111111111) | CLOSING FLAG (0101) |
|---|---|---|
| (10) | (12) | (4) |

FIG. 23

| DAY-OF-WK | HOUR | MINUTE+4 | FRAME # | SPARE | CATID | CAT VERSION # | CRC |
|---|---|---|---|---|---|---|---|
| (3) | (5) | (4) | (4) | (10) | (2) | (4) | (16) |

FIG. 25

| FLAG | ADDRESS | CONTROL | INFORMATION | FCS | FLAG |
|---|---|---|---|---|---|
| (8) | (8) | (8/16) | (VARIABLE) | (16/32) | (8) |
| 01111110 | EXTENDABLE | | | CRC | 01111110 |

FIG. 26

| FLAG | LENGTH | NETWORK MESSAGE | CRC |
|---|---|---|---|
| (8) | (8) | (VARIABLE ≤ 928) | (16) |

FIG. 27

| FLAG | RCNADR | CONTROL | LENGTH | NETWORK MESSAGE | CRC |
|---|---|---|---|---|---|
| (8) | (24) | (24) | (8) | (VARIABLE ≤ 880) | (16) |

FIG. 28

| FLAG | RCNADR | CONTROL | NETWORK MESSAGE | CRC |
|---|---|---|---|---|
| (8) | (24) | (8) | (80) | (16) |

FIG. 29

| FLAG | ADDRESS (NSMTYPE+NSMADR) | CONTROL | NETWORK MESSAGE | CRC |
|---|---|---|---|---|
| (8) | (40) | (16) | (80) | (16) |

FIG. 30

| FLAG | RCNADR | CONTROL | NETWORK MESSAGE | CRC |
|---|---|---|---|---|
| (8) | (24) | (24) | (24) | (16) |

FIG. 31

| FLAG | ADDRESS (NSMTYPE) | CONTROL | NETWORK MESSAGE | CRC |
|------|-------------------|---------|-----------------|-----|
| (6)  | (8/0)             | (8)     | (52/60)         | (16)|

FIG. 32

| FLAG | ADDRESS (NSMTYPE+NSMADR) | CONTROL | NETWORK MESSAGE | CRC |
|------|--------------------------|---------|-----------------|-----|
| (6)  | (40/32)                  | (8)     | (20/28)         | (16)|

FIG. 33

| FLAG | CONTROL (UNDEFINED) | NETWORK MESSAGE | CRC |
|------|---------------------|-----------------|-----|
| (6)  | (4)                 | (64)            | (16)|

| NODE | NO. OF ADDR BITS | SIZE OF ADDR SPACE |
|------|------------------|---------------------|
| NSM  | 32               | 4 BILLION           |
| RCN  | 24               | 16 MILLION          |
| IDT  | 16               | 64 K                |

FIG. 35

```
0000 1000 0000 0000 0000 0000 0011   TIER ADDRESS PATTERN
0000 1011 0000 0000 0000 1111   TIER ADDRESS MASK
xxxx 1x00 xxxx xxxx xxxx 0011   LOGICAL TIER ADDRESS
1101 1100 0010 1111 1001 0011   E.G. SELECTED ADDRESS
1101 1100 0010 1111 1001 0101   E.G. NON-SELECTED ADDRESS
```

| COMMON FIELDS OF BROADCAST MESSAGES | |
|---|---|
| MESSAGE TYPE | CODE INDICATING FORMAT AND CONTENT OF REST OF MESSAGE, MAY BE CONSIDERED TO BE A COMMAND OPCODE |
| NSM TYPE | RESTRICTS MESSAGE RECIPIENTS TO PARTICULAR CLASS OF NSM, MAY BE OMITTED IF SUBCHANNEL IS DEDICATED TO ONE NSM TYPE |
| VERSION SEQUENCE NUMBER | EACH TIME ANY MESSAGES IN THE CIRCULATION LIST CHANGES, THIS NUMBER IS INCREMENTED (MODULO 22); NSMs CAN ABORT SEARCH FOR MESSAGES IF PERFORMED PREVIOUSLY |
| LIST POSITION | POSITION OF CURRENT MESSAGE IN COMPLETE CIRCULATION LIST; TOGETHER WITH LIST LENGTH, MAY BE USED TO OPTIMIZE SEARCH |
| LIST LENGTH | NUMBER OF MESSAGES IN CIRCULATION LIST |

FIG. 38

| | |
|---|---|
| SUBCHANNEL SIZE | 1/16, 1 RND SLOTS PER CHANNEL |
| LIST LENGTH | 68 MSGS (4 RATE CLASSES, 17 MSGS EACH) |
| CIRCULATION TIME | 9 HOURS 4 MINUTES |

FIG. 39A

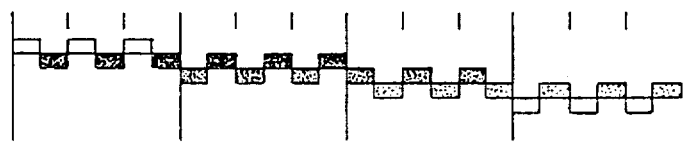

FIG. 39B

| | |
|---|---|
| SUBCHANNEL SIZE | 1/4, 3 RND SLOTS PER CHANNEL |
| LIST LENGTH | 8 MSGS |
| CIRCULATION TIME | 5 MINUTES, 20 SECONDS (AVG) |
| MSG LIFESPAN | 6 TRANSMISSIONS OVER 32 MINUTES |
| LIST LIFESPAN | 50% TURNOVER (4 MSGS) EVERY 16 MINUTES |
| MAX THRUPUT | 360 MSGS/DAY OR 15 MSGS/HR |

FIG. 40

| ADDRESS | | CONTROL | | | | NETWORK MESSAGE |
|---|---|---|---|---|---|---|
| NSMTYP | NSMADR | MSGTYPE | MSGNO | REVPOLL | PROTOCOL STATUS | PRIORITY | RDATA |
| (8) | (32) | (4) | (4) | (1) | (3) | (4) | (80) |

(NRRMa - IDENTIFICATION PART)
(56)

(NRRMb)
(FOR RIR)

DATA LINK LAYER
NETWORK LAYER
(BITS)

FIG. 42

| ADDRESS | CONTROL | | NETWORK MESSAGE |
|---|---|---|---|
| [NSMTYP] | MSGTYPE | APPL. DEP. | APPLICATION COMMAND |
| (8/0) | (4) | (4) | (52/60) |

DATA LINK LAYER
NETWORK LAYER
(BITS)

FIG. 43

| ADDRESS | CONTROL | | NETWORK MESSAGE |
|---|---|---|---|
| [NSMTYP] | NSMADR | MSGTYPE | APPL. DEP. | APPLICATION COMMAND |
| (8/0) | (32) | (4) | (4) | (20/28) |

DATA LINK LAYER
NETWORK LAYER
(BITS)

FIG. 44

| ADDRESS | CONTROL | | | NETWORK MESSAGE | | | DATA LINK LAYER NETWORK LAYER |
|---|---|---|---|---|---|---|---|
| NSMTYP | APPLTYP | CAT ID | UNUSED | BITMAP | B/C SUBCHAN | REV POLL SUBCHAN | CAT VERS |
| (8) | (4) | (2) | (2) | (28) | (10) | (10) | (4) |

(BITS)

FIG. 45

| RND SLOT | CHANNEL | SUBCHANNEL SIZE/LOCATION |
|---|---|---|
| ss: 0,1,2 3→ALL | ccc: 0..7 | 0 yyyy  RND[ss].ccc.yyyy<br>10 yyy  RND[ss].ccc.xyyy<br>110 yy  RND[ss].ccc.xxyy<br>1110 y  RND[ss].ccc.xxxy<br>11110   RND[ss].ccc.xxxx |
| ss = 3 | ccc = 7 | 11111   NO SUBCHANNEL ASSIGNED |
| (2) | (3) | (5) |

(BITS)

FIG. 46

| RCNADR | CONTROL SEE (b) | LENGTH | NSM MSG IDs | INTERMEDIATE CRC | RCN STATUS | NSM MSG CONTENTS | DATA LINK LAYER NETWORK LAYER |
|---|---|---|---|---|---|---|---|
| (24) | (24) | (8) | (56 X NITEMS) | (16) | (24) | (VARIABLE) | |

(BITS)

FIG. 47

| CONTROL | | | | | | DATA LINK LAYER / NETWORK LAYER |
|---|---|---|---|---|---|---|
| msgtype | seqbcst ACK/NAK | nitems | seqref | seqbcst | seqind | |
| (7) | (1) | (4) | (4) | (4) | (4) | (BITS) |

FIG. 48

| RCN STATUS | | | | |
|---|---|---|---|---|
| msgs.s | alms.s | RCNST | msgfmt | priority |
| (4) | (4) | (8) | (4) | (4) |

FIG. 49

MAXIMUM NUMBER OF NSM MSGS PER RIR

| msgfmt | tags | NSM msg size (bits) | # NSM msgs/report |
|---|---|---|---|
| 0 | p,v | 144 | 5 |
| 1 | p,v,f,s,t | 176 | 4 |
| 2 | p,v,f,d,t | 176 | 4 |
| 3 | p,v,f,s,d,t,c,crc | 200 | 4 |
| 4 | p,v,f,s,d,t | 184 | 4 |
| 5 | p,v,d,t | 168 | 5 |

FIG. 53

| FRAME # | SUBCHANNEL | | LIFETIME | | INITIALSLOT | | |
|---|---|---|---|---|---|---|---|
| | MASK | CHANNEL | SLOT | UNITS | LENGTH | DAY-OF-WEEK | CYCLE # | FRAME # |
| (4) | (4) | (3) | (3) | (2) | (8) | (4) | (8) | (4) |

FIG. 54

IRD-NSM REVERSE POLL MESSAGES

| 4 RCNADRS | SUBCHANNEL | LIFETIME | PARMS | CRITERIA | NSM MESSAGE | UNUSED |
|---|---|---|---|---|---|---|
| (96) | (14) | (10) | (8) | (16) | (68) | (4) |

FIG. 55

| REPETITIONS | HASHPARMS | | | USE CRITERIA |
|---|---|---|---|---|
| | HASH ALGORITHM | PRIORITY | CHAINING | |
| (2) | (3) | (1) | (1) | (1) |

FIG. 56

| RCNADR | CONTROL | NETWORK MESSAGE | RCN STATUS |
|---|---|---|---|
| (24) | (24) | (24) | (24) |

DATA LINK LAYER
NETWORK LAYER (BITS - 64 UNUSED)

FIG. 57

| NSM MESSAGE PRIORITY | | |
|---|---|---|
| PRIORITY FIELD | ACTUAL PRIORITY | COMMENT |
| 0 | NSM-LOW | · ACTUAL PRIORITY ASSIGNED AT RCN |
| 15 | NSM-HIGH | · ACTUAL PRIORITY ASSIGNED AT RCN |
| 1..14 | 1..14 | · EXPLICIT PRIORITY INCLUDED IN MESSAGE |

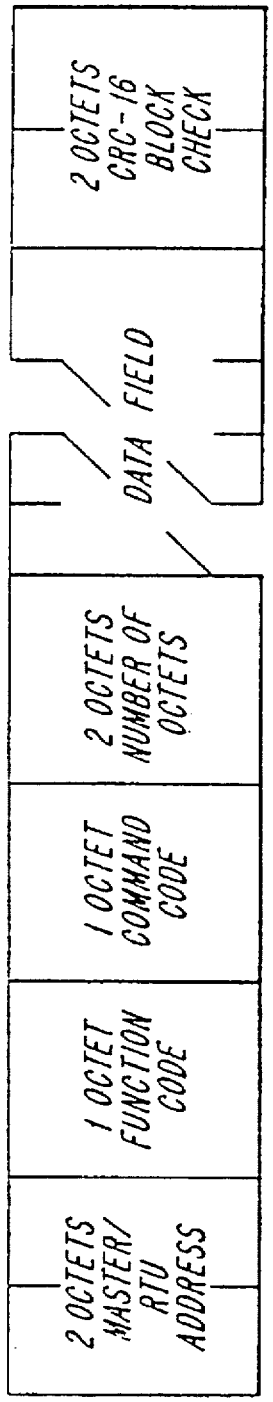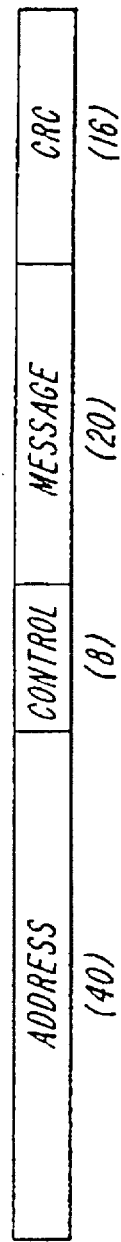
FIG. 59
2.4 MASTER MESSAGE FORMAT(S)
CURRENT SYSTEM 2020 MESSAGES HAVE THE FORMAT:
INDIVIDUALLY ADDRESSED NSM MESSAGE
NSM REPORT MESSAGE
SELECT BEFORE OPERATE SEQUENCE

FIG. 60

| | BASIC SYSTEM SERVICES | | | DSN | | OA SERVICES | | |
|---|---|---|---|---|---|---|---|---|
| | AMR OR TOU | LOAD SURVEY | LOAD CONTROL | INDUSTRIAL METERING | LOAD MANAGEMENT | LMN | FWN | CBN |
| NUMBER OF FEEDERS | 10 | 10 | 10 | 10 | 10 | 10 | 10 | 10 |
| NUMBER OF NSN'S | 10,000 | 100 | 6000 | 100 | 50 | 30 | 100 | 40 |
| REPORTS/DAY/NSN | 3 | 32 | 1 | 48 | 6 | 96 | FAULT DEPEND. EG. 2X | 2 |
| REPORT MESSAGES/DAY | 30,000 | 3200 | 6000 | 4800 | 300 | 2880 | 200 | 80 |
| ALARM MSGS/DAY | | | | | | | | |
| BROADCAST MESSAGES/DAY | | | 60 | | 24 | | | |
| POLL MESSAGES/DAY/NSN | | 1 | 1/30 | | 6 | 2 | 0.1 | 2 |
| CONTROL MESSAGES/DAY/NSN | | INDIRECT | INDIRECT | | | | | |
| RESPONSE TIME | | | | | | 10 SEC | 10 SEC | 10-30 SEC |
| DOWNSTR. MESSAGES/DAY | | 100 | 200 | | 300 | 60 | 10 | 80 |
| TOTAL MESSAGES/DAY | 30,000 | 3300 | 6200 | 4800 | 600 | 3000 | 210 | 160 |
| | TOTAL 39,500 MESSAGES/DAY | | | TOTAL 5400 DSN MSGS/DAY | | TOTAL 3450 OA MSGS/DAY | | |

FIG. 61

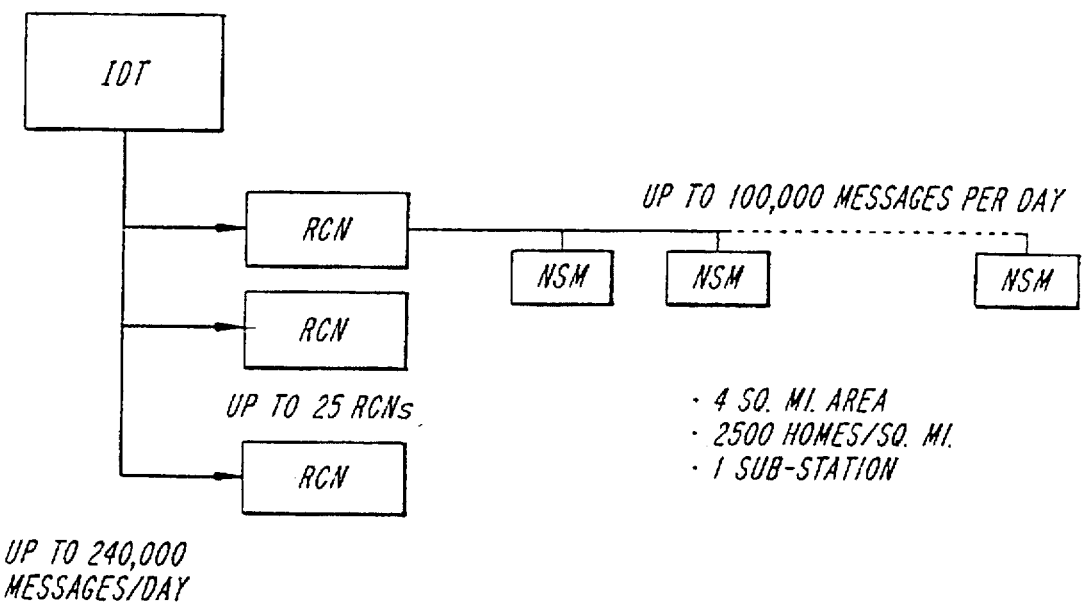

UP TO 100,000 MESSAGES PER DAY

- 4 SQ. MI. AREA
- 2500 HOMES/SQ. MI.
- 1 SUB-STATION

UP TO 25 RCNs

UP TO 240,000 MESSAGES/DAY

| DIRECTION | MESSAGE TYPE | #NSM's | REPORTS/ DAY/NSM | MESSAGES/ DAY |
|---|---|---|---|---|
| UPSTREAM | METER READING REPORT | 10,000 | 3 | 30,000 |
| | LOAD SURVEY REPORT | 100 | 32 | 3200 |
| | LCM REPORT | 2000 | 1 | 2000 |
| | VOLTAGE MONITOR | 60 | 24 | 1440 |
| | FAULT MONITOR ALARMS | 320 | 2 | 640 |
| | SUB-TOTAL | 12,480 | | 37,280 |
| DOWNSTREAM | TOU SCHEDULE | | | 96 |
| | LOAD CONTROL | | | 48 |
| | LOAD CURTAIL | | | 48 |
| | ENABLE/DISABLE LCM | 100 | | 100 |
| | ENABLE/DISABLE LSURVEY | 100 | | 100 |
| | SUB-TOTAL | | | 392 |
| | TOTAL | | | 37,672 |

FIG. 64  □ IOT LOCATION

| | SDMP | MODIFIED ADMP | DDMP |
|---|---|---|---|
| COMMUNICATION RELIABILITY ISSUES | | | |
| RESISTANCE TO ADJACENT AREA INTERFERENCE | HIGHEST | MEDIUM | HIGH |
| IMMUNITY TO WEATHER | HIGH | HIGH | HIGH |
| EASE OF ADJACENT AREA COVERAGE (IN EVENT OF IDT FAILURE) | MEDIUM | LOW | HIGH |
| TOPOLOGICAL FLEXIBILITY | LOW | MEDIUM | HIGH |
| PERFORMANCE ISSUES | | | |
| RESPONSE TIME | DETERMINISTIC | DETERMINISTIC | DETERMINISTIC |
| POLLING EFFICIENCY | 0.25 | 67% | >90% |
| EAVESDROPPING EFFICIENCY | - | - | - |
| ALARM REPORTING DELAY | 0 | 0 | UP TO 4 SEC. |
| EASE OF HANDLING DA. TRAFFIC | HIGH | LOW | MEDIUM |
| COST ISSUES | | | |
| HARDWARE DEVELOPMENT COST | LOW | LOW | HIGH |
| F/W & S/W DEVELOPMENT COST | LOW | HIGH | MEDIUM |
| HARDWARE FAB COST | LOW | MEDIUM | HIGH |
| INSTALLATION COST | LOW | LOW | MEDIUM |

Fig. 68A

◄─────── 1 SEC ───────►

| IRH | RND | RND | RND | SCRAM | IRD | STANDARD CHANNEL |
|---|---|---|---|---|---|---|
| | NRR | NRR | NRR | RIQ | RIR | |

Fig. 68B

| IRH | DA | RND | RND | SCRAM | IRD | DA CHANNEL |
|---|---|---|---|---|---|---|
| | | NRR | NRR | RIQ | RIR | |

| POLLING METHOD | DA CHANNEL CONFIGURATION | D/A MESSAGES PER HOUR | DA MESSAGES PER DAY | DA RESPONSE TIME | REPORT/CONTROL MESSAGES/DAY |
|---|---|---|---|---|---|
| ADMP | 4 R CHANNELS/FRAME | 240 | 5260 | 15 SEC. | 120000 |
| ADMP | 16 D/A SLOTS/FRAME | 120 | 2880 | 30 SEC. | 140000 |
| SDMP | 4 R CHANNELS/FRAME | 240 | 5260 | 15 SEC. | 45000 |
| DDMP | 4 R CHANNELS/FRAME | 960* 240** | 5260 | 15 SEC. | 175000 |

*THEORETICAL
**PRACTICAL

FIG. 71

CHANNEL

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |

A B C D a b c d a b c d A B C D

REPORT MESSAGE CAPACITY =
29 CH/FRAME X 5 SLOTS/CH X 120 FRAMES/HR X .647 POLLING EFF. = 5829 MSG/HR

DA MESSAGE CAPACITY =
1 MESSAGE/FRAME X 120 FRAMES/HR X 1.0 POLLING EFF. = 120 MSG/HR

FIG. 72

REPORT MESSAGE CAPACITY =
25 CH/FRAME X 5 SLOTS/CH X 120 FR/HR X .67 POLLING EFF. X .5 EAVESDROPPING EFF. = 5025 MSG/HR

DA MESSAGE CAPACITY =
2 CH/FRAME X 120 FR/HR X 1.0 POLL. EFF. = 240 MSG/HR WITH 15 SECOND RESPONSE TIME

1

COMMUNICATIONS PROTOCOL FOR REMOTE DATA GENERATING STATIONS

RELATED PATENTS

This application is a continuation of application Ser. No. 08/247,988 filed on Mar. 23, 1994 now abandoned, which is a continuation-in-part patent application of a patent application entitled, HIERARCHIAL RADIO COMMUNICATION NETWORK FOR REMOTE DATA GENERATING STATIONS, having Ser. No. 08/124,495 now abandoned, filing date of Sep. 22, 1993, which was a file wrapper continuation (FWC) patent application of a patent application entitled, RADIO COMMUNICATION NETWORK FOR REMOTE DATA GENERATING STATIONS, having Ser. No. 07/732,183 and filing date Jul. 19, 1991, which is a continuation-in-part patent application of a patent application entitled, RADIO COMMUNICATION NETWORK FOR REMOTE DATA GENERATING STATIONS, having Ser. No. 07/480,573 and filing date of Feb. 15, 1990 and is now U.S. Pat. No. 5,056,107. The benefit of the earlier filing dates of the parent patent applications is claimed pursuant to 35 U.S.C. §120.

BACKGROUND OF THE INVENTION

This invention relates to a protocol for collecting data from remote data generating stations in a communications network, and more particularly a radio based system for sending data from a plurality of network service modules, with each network service module attached to a meter, and communicating through remote cell nodes and through intermediate data terminals, to a central data terminal, i.e., a headend.

DESCRIPTION OF THE RELEVANT ART

Many attempts have been made in recent years to develop an automatic meter reading system for utility meters such as used for electricity, gas and water, which avoids meter reading personnel having to inspect and physically note the meter readings. There are of course many reasons for attempting to develop a system of this type.

Most of the prior art systems have achieved little success. The system which has achieved some success or is most widely used has an automatic meter reading unit mounted on an existing meter at the usage site and includes a relatively small transmitter and receiver unit of very short range. The unit is polled on a regular basis by a travelling reading unit which is carried around the various locations on a suitable vehicle. The travelling reading unit polls each automatic meter reading unit in turn to obtain stored data. This approach is of limited value in that it requires transporting the equipment around the various locations and hence only very infrequent, for example monthly, readings can be made. The approach avoids a meter reader person actually entering the premises to physically inspect the meter which is of itself of some value but only limited value.

Alternative proposals in which reading from a central location is carried out have been made but have achieved little success. One proposal involves an arrangement in which communication is carried out using the power transmission line of the electric utility. Communication is, therefore, carried out along the line and polls each remote reading unit in return. This device has encountered significant technical difficulties.

Another alternative attempted to use the pre-existing telephone lines for communication. The telephone line proposal has a significant disadvantage since it must involve a number of other parties, in particular the telephone company, for implementing the system. The utility companies are reluctant to use a system which cannot be entirely controlled and managed by themselves.

A yet further system using radio communication has been developed by Data Beam, which was a subsidiary of Connecticut Natural Gas. This arrangement was developed approximately in 1986 and has subsequently received little attention and it is believed that no installations are presently operative. The system includes a meter reading device mounted on the meter with a transmitting antenna which is separate from the meter reading device. The transmitting antenna is located on the building or other part of the installation site which enables the antenna to transmit over a relatively large distance. The system uses a number of receiving units with each arranged to receive data from a large number of transmitters, in the range 10,000 to 30,000. The transmitters, in order to achieve maximum range, are positioned to some extent directionally or at least on a suitable position of the building to transmit to the intended receiving station. The arrangement leads to using a minimum number of receiving stations for optimum cost efficiency.

The separate transmitter antenna, however, generated significant installation problems due to wiring the antenna through the building to the transmitter and receiver. The anticipated high level of power used for transmitting involved very expensive battery systems or very expensive wiring. The proposal to reduce the excessive cost was to share the transmission unit with several utilities serving the building so that the cost of the transmitter could be spread, for example, between three utilities supplied to the building. Such installation requires separate utility companies to cooperate in the installation. While this might be highly desirable, such cooperation is difficult to achieve on a practical basis.

In order to avoid timing problems, the meter reading units were arranged to communicate on a random time basis. However, the very large number, up to 30,000 of meter reading units reporting to a single receiving station, leads to a very high number of possible collisions between the randomly transmitted signals. The system, therefore, as proposed, with daily or more often reporting signals could lose as many as 20% to 50% of the signals transmitted due to collisions or interference which leads to a very low efficiency data communication. The use of transmitters at the meter reading units which are of maximum power requires a larger interference protection radius between systems using the same allocated frequency.

An alternative radio transmission network is known as ALOHA. ALOHA has a number of broadcasting stations communicate with a single receiving station, with the broadcasting stations transmitting at random intervals. In the ALOHA system, collisions occur so that messages are lost. The solution to this problem is to monitor the retransmission of the information from the receiving station so that each broadcasting station is aware when its transmission has been lost. Each broadcasting station is then programmed to retransmit the lost information after a predetermined generally pseudorandom period of time. The ALOHA system requires retransmission of the information from the receiving station to take place substantially immediately and requires each broadcasting station to also have a receiving capability.

Cellular telephone networks are implemented on a wide scale. Cellular systems, however, use and allocate different frequencies to different remote stations. While this is acceptable in a high margin use for voice communications, the costs and complications cannot be accepted in the relatively lower margin use for remote station monitoring. The technology of cellular telephones leads to the perception in the art that devices of this type must use different frequency networks.

While theoretically automatic meter reading is highly desirable, it is, of course, highly price sensitive and hence it is most important for any system to be adopted for the price per unit of particularly the large number of meter reading units to be kept to a minimum. The high cost of high power transmission devices, receiving devices and battery systems generally leads to a per unit cost which is unacceptably high.

SUMMARY OF THE INVENTION

A general object of the invention is a communications network for communicating data from a plurality of network service modules to a central data terminal.

Another object of the invention is a communications network which is suitable for an automatic meter reading system.

A further object of the invention is a communications network for collecting data from remote data generating stations that is simple and economical to install and maintain.

A still further object of the invention is a communications network for collecting data from network service modules that is spectrum efficient, and has inherent communication redundancy to enhance reliability and reduce operating costs.

An additional object of the invention is an open architecture communication network which accommodates new technology, and allows the network operator to serve an arbitrarily large contiguous or non-contiguous geographic area.

According to the invention, as embodied and broadly described herein, a method is provided for communicating over a wide area communications network between a central data terminal (CDT), a plurality of intermediate data terminals (IDT), a plurality of remote cell nodes (RCN), and a plurality of network service modules (NSM). The method uses a plurality of frames with each frame having a plurality of channels. During each frame, an intermediate data terminal transmits an IDT-synchronization signal to the plurality of remote cell nodes, using a first channel of the frame. The intermediate data terminal also transmits a first polling signal, synchronized to the IDT-synchronization signal, to the plurality of remote cell nodes, using a second channel of the frame.

Upon receipt of the IDT-synchronization signal, the plurality of remote cell nodes synchronize an RCN-timing circuit to the IDT-synchronization signal. The plurality of remote cell nodes then transmit an RCN-synchronization signal, synchronized to the IDT-synchronization signal, using a fourth channel of the frame.

The RCN-synchronization signal is received by at least one network service module. Network service modules receiving the RCN-synchronization signal synchronize an NSM timing circuit to the RCN-synchronization signal. Once synchronized, the network service module transmits, using radio waves, an NSM-packet signal to at least one remote cell node, using a fifth channel of the frame. This transmission from the network service module to the remote cell node can occur at a time which is randomly or pseudorandomly selected within a predetermined time period. Alternatively, the network service module can transmit in response to a command signal received from a remote cell node, using radio waves, requesting the NSM-packet signal. The command signal from the remote cell node can also be used to transmit command information from the intermediate data terminal and/or the central data terminal to the network service module. This command information can include a request for an immediate meter reading or other real-time response from the network service module.

In addition to transmitting data, either randomly or in response to a command signal from a particular remote cell node, the NSM-packet signal can also be used to convey alarm conditions from the network service module to the remote cell node. Such alarm conditions can include loss of electrical connection, tilting of the network service module indicative of tampering, or other unusual condition. These alarm conditions can be transmitted on a real-time basis using a real-time channel of the frame. Upon receipt of an alarm condition from the network service module, the remote cell node transmits the alarm condition to the intermediate data terminal; the intermediate data terminal transmits the alarm condition to the central data terminal; the central data terminal processes the alarm condition and responds with appropriate direction back to the network service module using the command signal.

The NSM-packet signal is received by at least one remote cell node which stores the NSM-packet signal. Each remote cell node receives a multiplicity of NSM-packet signals from a multiplicity of network service modules. The multiplicity of network service modules is a subset of the plurality of network service modules. Each remote cell node stores the NSM-packet signals received from the multiplicity of network service modules. Upon receipt of the first polling signal, sent by the intermediate data terminal using the second channel of the frame, the remote cell node transmits the stored NSM-packet signals as an RCN-packet signal, using a third channel of the frame.

The RCN-packet signal is received by the intermediate data terminal on the third channel of the frame. Each intermediate data terminal receives a multiplicity of RCN-packet signals from a multiplicity of remote cell nodes. The multiplicity of RCN-packet signals are then stored by the intermediate data terminal. Upon receipt of a second polling signal, sent by the central data terminal using a sixth channel of the frame, the intermediate data terminal transmits the stored RCN-packet signals as an IDT-packet signal, using a seventh channel of the frame. The IDT-packet signal is received by the central data terminal on the seventh channel of the frame.

Alternatively, the invented method as embodied and broadly described herein, may be effected without the plurality of intermediate data terminals, in which case the central data terminal assumes the roles and functions that would otherwise be provided by the intermediate data terminals.

The wide area communications network, as broadly described herein, collects NSM data generated by a plurality of physical devices located within a geographical area. The physical devices may be, for example, a utility meter as used for electricity, gas or water. Each network service module is coupled to a respective physical device.

The network service module (NSM) includes NSM-receiver means, NSM-transmitter means, and NSM-processor means, NSM-memory means and an antenna. The NSM-receiver means, which is optional, receives a command signal at a first carrier frequency or a second carrier frequency. In a preferred mode of operation, the NSM-receiver means receives the command signal on the first carrier frequency for spectrum efficiency. The wide area communications network can operate using only a single carrier frequency, i.e., the first carrier frequency. The command signal allows the oscillator of the NSM-transmitting means to lock onto the frequency of the remote cell node, correcting for drift. Signalling data also may be sent from the remote cell node to the network service module using the command signal.

The NSM-processor means arranges data from the physical device into packets of data, transfers the data to the NSM-memory means, and uses the received command signal for adjusting the first carrier frequency of the NSM transmitter. The NSM data may include meter readings, time of use and other information or status from a plurality of sensors. The NSM-processor means, for all network service modules throughout a geographical area, can be programmed to read all the corresponding utility meters or other devices being serviced by the network service modules. The NSM-processor means also can be programmed to read peak consumption at predetermined intervals, such as every 15 minutes, throughout a time period, such as a day. The NSM-memory means stores NSM data from the physical device. The NSM-processor means can be programmed to track and store maximum and minimum sensor readings or levels throughout the time period, such as a day.

The NSM-transmitter means transmits at the first carrier frequency the respective NSM data from the physical device as an NSM-packet signal. The NSM-packet signal is transmitted at a time which is randomly or pseudorandomly selected within a predetermined time period, i.e., using a one-way-random-access protocol, by the NSM-processor means. The NSM-transmitter includes a synthesizer or equivalent circuitry for controlling its transmitter carrier frequency. The NSM-transmitter means is connected to the antenna for transmitting multi-directionally the NSM-packet signals.

A plurality of remote cell nodes are located within the geographical area and are spaced approximately uniformly and such that each network service modeled is within a range of several remote cell nodes, and so that each remote cell node can receive NSM-packet signals from a multiplicity of network service modules. The remote cell nodes preferably are spaced such that signals from each of the network service modules can be received by at least two remote cell nodes. Each remote cell node (RCN) includes RCN-transmitter means, RCN-receiver means, RCN-memory means, RCN-processor means, and an antenna. The RCN-transmitter means transmits at the first carrier frequency or the second carrier frequency, the command signal with signalling data. Transmitting a command signal from the RCN-transmitter means is optional, and is used only if the NSM-receiver means is used at the network service module as previously discussed.

The RCN-receiver means receives at the first carrier frequency a multiplicity of NSM-packet signals transmitted from a multiplicity of network service modules. Each of the NSM-packet signals typically are received at different points in time, since they were transmitted at a time which was randomly or pseudorandomly selected within the predetermined time period. The multiplicity of network service modules typically is a subset of the plurality of network service modules. The RCN-receiver means also receives polling signals from the intermediate data terminal, and listens or eavesdrops on neighboring remote cell nodes when they are polled by the intermediate data terminal.

The RCN-memory means stores the received multiplicity of NSM-packet signals. The RCN-processor means collates the NSM-packet signals received from the network service modules, identifies duplicates of NSM-packet signals and deletes the duplicate NSM-packet signals. When a polling signal is sent from an intermediate data terminal, the RCN-transmitter means transmits at the first carrier frequency the stored multiplicity of NSM-packet signals as an RCN-packet signal.

When a first remote cell node is polled with a first polling signal by the intermediate data terminal, neighboring remote cell nodes receive the RCN-packet signal transmitted by the first remote cell node. Upon receiving an acknowledgment signal from the intermediate data terminal, at the neighboring remote cell nodes, the respective RCN-processor means deletes from the respective RCN-memory means messages, i.e., NSM-packet signals, received from the network service modules that have the same message identification number as messages transmitted in the RCN-packet signal from the first remote cell node to the intermediate data terminal.

The plurality of intermediate data terminals are located within the geographic area and are spaced to form a grid overlaying the geographic area. Each intermediate data terminal includes IDT-transmitter means, IDT-memory means, IDT-processor means and IDT-receiver means. The IDT-transmitter means includes a synthesizer or equivalent circuitry for controlling the carrier frequency, and allowing the IDT-transmitter means to change carrier frequency. The IDT-transmitter means transmits preferably at the first carrier frequency, or the second carrier frequency, the first polling signal using a first polling-access protocol to the plurality of remote cell nodes. When the first polling signal is received by a remote cell node, that remote cell nodes responds by sending the RCN-packet signal to the intermediate data terminal which sent the polling signal. If the intermediate data terminal successfully receives the RCN-packet-signal, then the IDT-transmitter means sends an acknowledgment signal to the remote cell node. Each intermediate data terminal receives a multiplicity of RCN-packet signals from a multiplicity of remote cell nodes. The multiplicity of remote cell nodes typically is a subset of the plurality of remote cell nodes.

The IDT-receiver means receives the RCN-packet signal transmitted at the first carrier frequency from the remote cell node which was polled. Thus, after polling a multiplicity of remote cell nodes, the IDT-receiver means has received a multiplicity of RCN-packet signals.

The IDT-memory means stores the received RCN-packet signals. The IDT-processor means collates the NSM-packet signals embedded in the RCN-packet signals received from the multiplicity of remote cell nodes, identifies duplicates of NSM-packet signals and deletes the duplicate NSM-packet signals, i.e., messages from network service modules that have the same message identification number. In response to a second polling signal from a central data terminal, the IDT-transmitter means transmits the stored multiplicity of received RCN-packet signals as an IDT-packet signal to the central data terminal.

While not required by the current invention as presently embodied, the intermediate data terminals may also eavesdrop on neighboring intermediate data terminals in the same manner as was described for a given remote cell node eavesdropping on neighboring remote cell nodes. Such intermediate data terminal eavesdropping would serve as an additional means of identifying duplicate NSM data and eliminating such data before sending the non-duplicate data on to the central data terminal.

The central data terminal (CDT) includes CDT-transmitter means, CDT-receiver means, CDT-processor means and CDT-memory means. The CDT-transmitter means transmits sequentially the second polling signal using a second polling access protocol to each of the intermediate data terminals. The CDT-receiver means receives a plurality of IDT-packet signals. The central data terminal, intermediate data terminals and the remote cell nodes may be coupled through radio channels, telephone channels, fiber optic channels, cable channels, or other communications medium. The CDT-processor means decodes the plurality of IDT-packet signals as a plurality of NSM data. The CDT-processor means also identifies duplicates of NSM data and deletes the duplicate NSM data. The CDT-memory means stores the NSM data in a data base.

Additional objects and advantages of the invention are set forth in part in the description which follows, and in part are obvious from the description, or may be learned by practice of the invention. The invention disclosed may be adapted for use in any application requiring measurement of the use of a given resource through the use of a meter or other measuring device. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3 is a representative NSM-data packet;

FIG. 4 is a listing or representative applications supported by the communications network;

FIG. 13 illustrates a typical communications network with gradual growth in the number of areas served;

FIG. 16 illustrates a general slot structure;

FIG. 17 provides a data slot channel description;

FIG. 18 illustrates the synchronization channel slots;

FIG. 19 illustrates the IRS slot in the synchronization channel;

FIG. 20 illustrates the IIS subchannel;

FIG. 21 illustrates the field sequence used to fill the RNS slot in the synchronization channel;

FIG. 22 illustrates the final portion of the RNS slot in the synchronization channel;

FIG. 23 illustrates the RNH slot in the synchronization channel;

FIG. 25 illustrates the HDLC data link frame format;

FIG. 26 illustrates the IRD data link packet structure;

FIG. 27 illustrates the RIR data link packet structure;

FIG. 28 illustrates the IPH data link packet structure with 24 bits in the slot unused;

FIG. 29 illustrates the NRR data link packet structure;

FIG. 30 equals the RIQ data packet structure with 64 bits in the slot unused;

FIG. 31 illustrates the RND broadcast to class address data link packet structure;

FIG. 32 illustrates the RND broadcast to individual address and reverse poll data link packet structure;

FIG. 33 illustrates the RNC broadcast special application control data link packet structure;

FIG. 35 illustrates node identifications;

FIG. 36 is an example tier address specification and selected/non-selected network service modules;

FIG. 37 depicts common fields of broadcast messages;

FIG. 38 is an example of time of use table and schedule broadcast to class address;

FIG. 39A and 39B is an example of a service reconnect broadcast to individual address;

FIG. 40 illustrates delivery of reverse poll messages to network service modules;

FIG. 42 illustrates the RND broadcast to class address message format in the context of a data link packet;

FIG. 43 illustrates the RND broadcast to individual address and reverse poll network message format in the context of a data link packet;

FIG. 44 illustrates the network message format used to distribute CAT entries, in the context of a data link packet;

FIG. 45 illustrates the format of a subchannel designator;

FIG. 46 illustrates the RIR network message format used to relay NSM messages, in the context of a data link packet;

FIG. 47 illustrates the RIR network message subfields comprising the data link control field;

FIG. 48 illustrates the subfields comprising remote cell node status fields;

FIG. 49 illustrates a maximum number of NSM messages per RIR;

FIG. 53 illustrates the subfields comprising various IRD fields;

FIG. 54 illustrates the IRD network message format for delivering NSM reverse poll messages to remote cell nodes;

FIG. 55 illustrates the subfields comprising "parms", field of IRD message of FIG.

FIG. 56 illustrates the RIQ message format used to request service from the intermediate data terminal, in the context of a data link packet;

FIG. 57 illustrates a summary of message priorities; and

FIG. 59 illustrates a command message format that is compatible with a specific protocol whose general format.

FIG. 60 illustrates service traffic for a single neighborhood network;

FIG. 61 example of neighborhood network traffic representing roughly 16% of theoretical network capacity;

FIG. 62 illustrates space division multiplexing showing wide separation of concurrently polled areas;

FIG. 63 illustrates amplitude division multiplexing showing concurrent polling zones;

FIG. 64 illustrates directional multiplexing in which corresponding quadrants of all neighborhood networks are polled concurrently;

FIG. 65 illustrates polarization multiplexing in which alternate zones operate on different polarization, with areas in the corners of each zone may have interference;

FIG. 67 illustrates a comparison of IDT polling protocols;

FIG. 68 shows a comparison of standard channel slot assignment with a revised slot assignment for a DA channel;

FIG. 71 illustrates frame configuration using real time channels for DA functions; and FIG. 72 illustrates one possible frame configuration using allocated D/A slots.

DETAILED DESCRIPTION OF THE PREFERRED EMBODIMENTS

Figure 1:
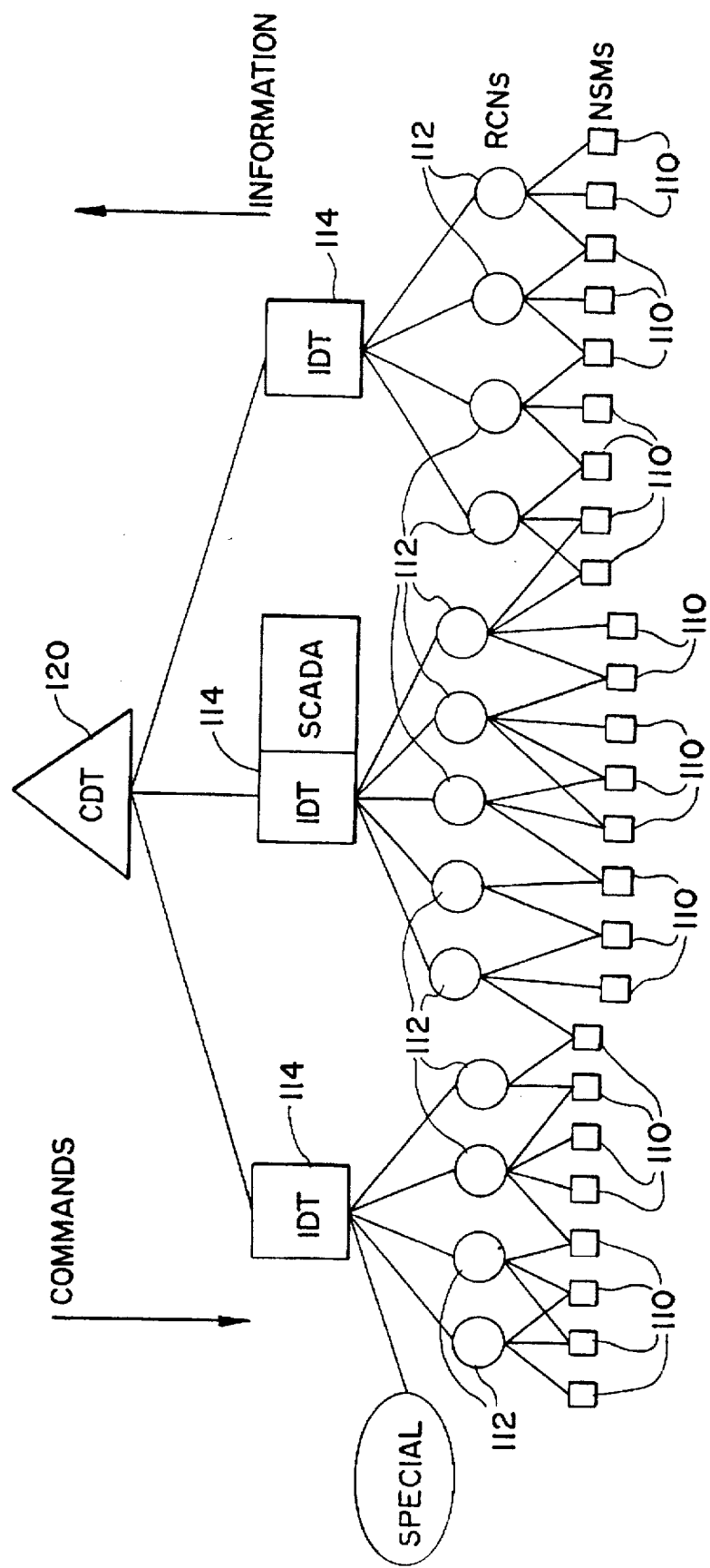
FIG. 1 illustrates the hierarchial communications network topology.

Reference now is made in detail to the present preferred embodiments of the invention, examples of which are illustrated in the accompanying drawings, wherein like reference numerals indicate like elements throughout the several views.

A wide area communications network communicates data from a plurality of network service modules to a central data terminal. The wide area communications network collects NSM data generated by a plurality of physical devices located within a geographical area. The wide area communications network, as illustratively shown in FIG. 1, is a layered network having a hierarchial communications topology comprising a plurality of network service modules 110, a plurality of remote cell nodes 112, a plurality of intermediate data terminals 114, and a central data terminal 120. They physical devices may be, for example, a utility meter as used for electricity, gas or water.

The central data terminal controls network operation. Intelligence exists at a all layers of the network, thereby easing the workload of the central data terminal. The intelligence attributed to each module is a function of the application of that module.

Network Service Module

Information is acquired at the lowest level of the wide area communications network of FIG. 1, and the network service module 110 performs the data acquisition functions. Network service modules 110 include meter service modules for electricity, gas and water, a service disconnect module, a load management module, an alarm monitoring module, or any other module that can be used with the wide area communications network. The network service modules may be used in other applications such as vending machines, pay telephones, etc., where collecting remote data is desirable.

The network service modules 110 are linked to the wide area communications network via high frequency radio channels, typically in the 928 MHz–952 MHz band, as well as related frequencies in the 902 MHz–912 MHz and 918 MHz–928 MHz bands. Radio channels in these bands are the preferred communications medium because use of radio communications eliminates the need for physical connections to the network service modules which drastically reduces installation costs compared to other communication media such as telephone, cable networks and power line carriers. Also, operation in the high frequency bands permits the use of small antennas so the retrofitting standard watt hour meters is simplified. Radio communication channels in other bands may work equally as well, however.

Figure 2:
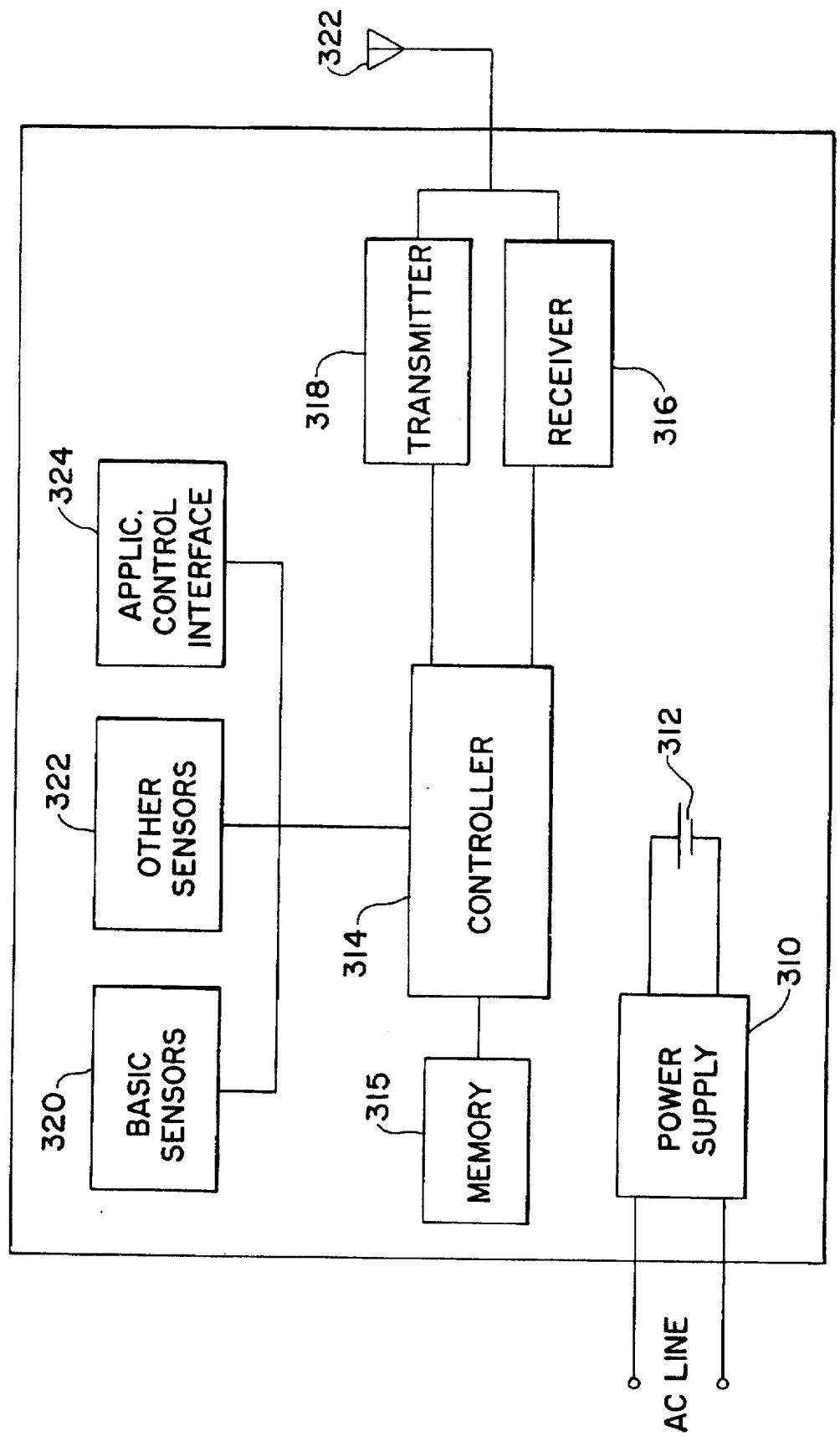
FIG. 2 is a network service module block diagram.

In the exemplary arrangement shown in FIG. 2, the network service module (NSM) 110 includes NSM-receiver means, NSM-transmitter means, NSM-processor means, NSM-memory means and an NSM antenna 322. The NSM-transmitter means and the NSM-receiver means are coupled to the NSM antenna 322. The NSM-processor means is coupled to the NSM-transmitter means, NSM-receiver means, NSM-memory means and the physical device. The physical device is shown as basic sensors 320 and other sensors 322, and application control interface 324. The network service module also includes an AC power supply 310 and back-up battery power 312.

The NSM-receiver means is embodied as a NSM receiver 316, and is optional. If an NSM receiver 316 is included with the network service module, then the NSM receiver 316 can be used for receiving an RCN-synchronization signal and/or a command signal, which includes signalling data. The RCN-synchronization signal and/or the command signal can be transmitted at either a first carrier frequency or a second carrier frequency. Normally the first carrier frequency is used by the NSM-transmitter means for transmitting to a remote cell node. In a preferred embodiment, the NSM receiver 316 receives the RCN-synchronization signal and/or the command signal on the first carrier frequency for spectrum efficiency. Thus, the wide area communications network can operate using only a single carrier frequency, i.e., the first carrier frequency. The RCN-synchronization signal can provide a time reference for updating a local clock, and serve as a frequency reference to the network service module. Signalling data, such as manage service disconnect or control loads, also may be sent from the remote cell node to the network service module using the command signal. While the network service modules could be polled by the command signal, in general, such polling is not required and preferably not used with the present invention. The RCN-synchronization signal may be included as part of the command signal or a separate signal from the command signal.

The NSM-processor means, which is embodied as an NSM controller 314, arranges data from the physical device into packets of data, and transfers the data to the NSM-memory means which is embodied as an NSM memory 315. The term NSM data is defined to include data from the physical device. The NSM controller 314 may be a microprocessor or equivalent circuit for performing the required functions. The NSM controller 314 uses the received RCN-synchronization signal and/or command signal for adjusting the first carrier frequency of the NSM transmitter. The NSM data may include meter readings, time of use and other information or status from a plurality of sensors. The NSM controller 314, for each network service module throughout a geographical area, can be programmed to read all the corresponding utility meters or other devices being serviced by the network service module, respectively. The NSM controller 314 can be programmed to read peak consumption at predetermined intervals, such as every 15 minutes, throughout a time period, such as a day. The NSM controller 314 also can be programmed to track and store maximum and minimum sensor readings or levels throughout the time period, such as a day.

The NSM memory 315 stores NSM, data from the physical device. NSM data may include meter reading data and time of use (TOU) and other information or status from a plurality of sensors. The NSM memory 315 may be random access memory (RAM) or any type of magnetic media other memory storage devices known in the art. The NSM controller 314 uses the received RCN-synchronization signal and/or command signal for adjusting the first carrier frequency of the NSM transmitter 318.

The NSM-transmitter means is embodied as an NSM transmitter 318. The NSM transmitter 318 transmits at a first carrier frequency, using radio waves, the respective NSM data from the physical device in brief message packets called NSM-packet signals. The NSM-packet signal might have a time duration of 100 milliseconds, although other time durations can be used to meet particular system requirements. The NSM-packet signal transmitted by the NSM transmitter 318 follows a generic or fixed format, and a representative message packet is illustrated in FIG. 3. Included in the message is: preamble; opening frame; message type; message identification; service module type; message number; service module address; data field; error detection; and closing frame.

The NSM transmitter 318 is connected to an NSM antenna 322 for transmitting multi-directionally the NSM-packet signals. The NSM transmitter 318 includes a synthesizer, crystal oscillator or equivalent circuitry for controlling its transmitter carrier frequency and schedule.

The NSM-packet signal is transmitted at a time which is randomly or pseudorandomly selected within a predetermined time period, i.e., using a one-way-random-access protocol, by the NSM-processor means. Alternatively, the NSM-packet signal may be transmitted in response to a poll received as part of a command signal from a remote cell node requesting the NSM-packet signal. In order to simplify network operation and reduce costs, the wide area communications network as embodied herein does not poll individual network service modules. Rather, each network service module reports autonomously at a rate appropriate for the application being supported. Routine reports are therefore transmitted randomly or pseudorandomly at fixed average intervals, while alarm signals are transmitted immediately following detection of alarm conditions. Alarm signals may be transmitted several times with random delays. This avoids interference among alarm messages if many alarms occur simultaneously, as in an area-wide power outage.

As an alternative arrangement, the network service module may be programmed to transmit three different types of messages at different intervals. The first type of message can relate to the accumulated usage information. The second type of message can relate to an alarm condition which is basically transmitted immediately. The alarm conditions that occur might relate to a tamper action or to the absence of electrical voltage indicative of a power failure. The third type of information which may be transmitted less frequently can relate to the housekeeping information.

After preparing the packet of data for transmission, the controller 314 is arranged to hold the data packet for a random period of time. This random period can be calculated using various randomizing techniques including, for example, a pseudo-random calculation based upon the rotation of the metering disk at any particular instant. In this way each of the network service modules is arranged to transmit at a random time. The controller 314 is arranged so that the transmission does not occur within a particular predetermined quiet time so that the network service modules are not allowed to transmit during this quiet time. This quiet time could be set as one hour in every eight hour period. In this way, after an eight hour period has elapsed, each of the network service modules would transmit at a random time during the subsequent seven hours followed by one hour of quiet time.

Network capacity or throughput is limited by the probability of message collisions at each remote cell node 112. Because all network service modules 110 share a single carrier channel and transmit at random times, several network service modules 110 within a range of a particular remote cell node 112 may transmit simultaneously, with NSM-packet signals colliding at the remote cell node 112. If the received signal levels were comparable, then the overlapping messages mutually interfere, causing receive errors and both messages being lost. However, if one signal were substantially stronger than the other, then the stronger signal is successfully received. Moreover, since both signals are received by at least two and preferably four of the remote cell nodes, the probability of both messages being received is fairly high unless the network service modules are in close spatial proximity. During an interval T, each NSM transmitter within a geographical area surrounding a single remote cell node sends a single randomly timed message of duration M to several potential remote cell node receive stations.

N=no. of transmitter/cell

M=message duration (seconds)

T=message interval $P_c$=probability of collision $P_s$=probability of no collision Once any Transmitter, $T_i$, starts transmitting, the probability that another particular transmitter, $T_j$, completes or starts another transmission is $$\frac{2M}{T}.$$

The probability that there will be no collision is $$1-\frac{2M}{T}.$$

If there were N−1 other transmitters, then the probability of no collision, $P_s$, is given by $$P_s=\left(1-\frac{2M}{T}\right)^{N-1}$$

For large N $$P_s \sim \left(1 - \frac{2M}{T}\right)^N$$

For a given Transmitter, $T_j$, the probability of a collision occurring during the interval T is $$P_c = 1 - P_s = 1 - \left(1 - \frac{2M}{T}\right)^N$$

The probability of collisions occurring on An successive tries is $$P_{cn} = (P_c)^{An}$$

For M=0.3 Sec T=8 hrs.=28.8×10³ secs.

$$P_s = \left(1 - \frac{2M}{T}\right)^N \quad 1 - 2.08 \times 10^{-5} = (.999979)^N$$

| N | Ps | Pc1 | Pc2 | Pc3 |
|---|---|---|---|---|
| 100 | .9979 | .0021 | $4 \times 10^{-6}$ | $8 \times 10^{-9}$ |
| 200 | .9958 | .0042 | $1.6 \times 10^{-5}$ | $6.4 \times 10^{-8}$ |
| 500 | .9896 | .0104 | $10^{-4}$ | $10^{-6}$ |
| 1,000 | .9794 | .0206 | $4 \times 10^{-4}$ | $8 \times 10^{-6}$ |
| 2,000 | .9591 | .041 | $1.6 \times 10^{-3}$ | $6.8 \times 10^{-5}$ |
| 5,000 | .9010 | .099 | $9.8 \times 10^{-3}$ | $9.7 \times 10^{-4}$ |
| 10,000 | .811 | .189 | $3.5 \times 10^{-2}$ | $6.7 \times 10^{-3}$ |

From the viewpoint of a remote cell node, the number of transmitters, $N_T$, whose signal level exceeds the receiver noise level and can, therefore, be received reliably depends on:

(a) the density of transmitters;

(b) transmit power level;

(c) propagation path loss;

(d) background noise.

Propagation path loss is highly variable due to attenuation, reflection, refraction and scattering phenomena which are a function of terrain, building structures, and antenna location. Some of these parameters can even vary on a diurnal and seasonal basis.

In estimating network performance however, the simple message collision model is not completely accurate because:

1. random noise bursts from various sources can obscure messages which do not collide;

2. some colliding message signals will be of such sufficiently different amplitude that the stronger signal will still be received correctly.

A statistical model can be developed to provide data by which a determination can be made of the best location and number of remote cell nodes for a particular geographical location. Thus, the model can include data relating to house density, the N-value defined above, and also relating to the attenuation of the signal and the location and presence of trees.

FIG. 4 is an illustrative listing of applications supported by the network service module within the wide area communications network. The following is a detailed discussion of the electricity meter application.

Network Service Module with an Electricity Meter

Figure 5:
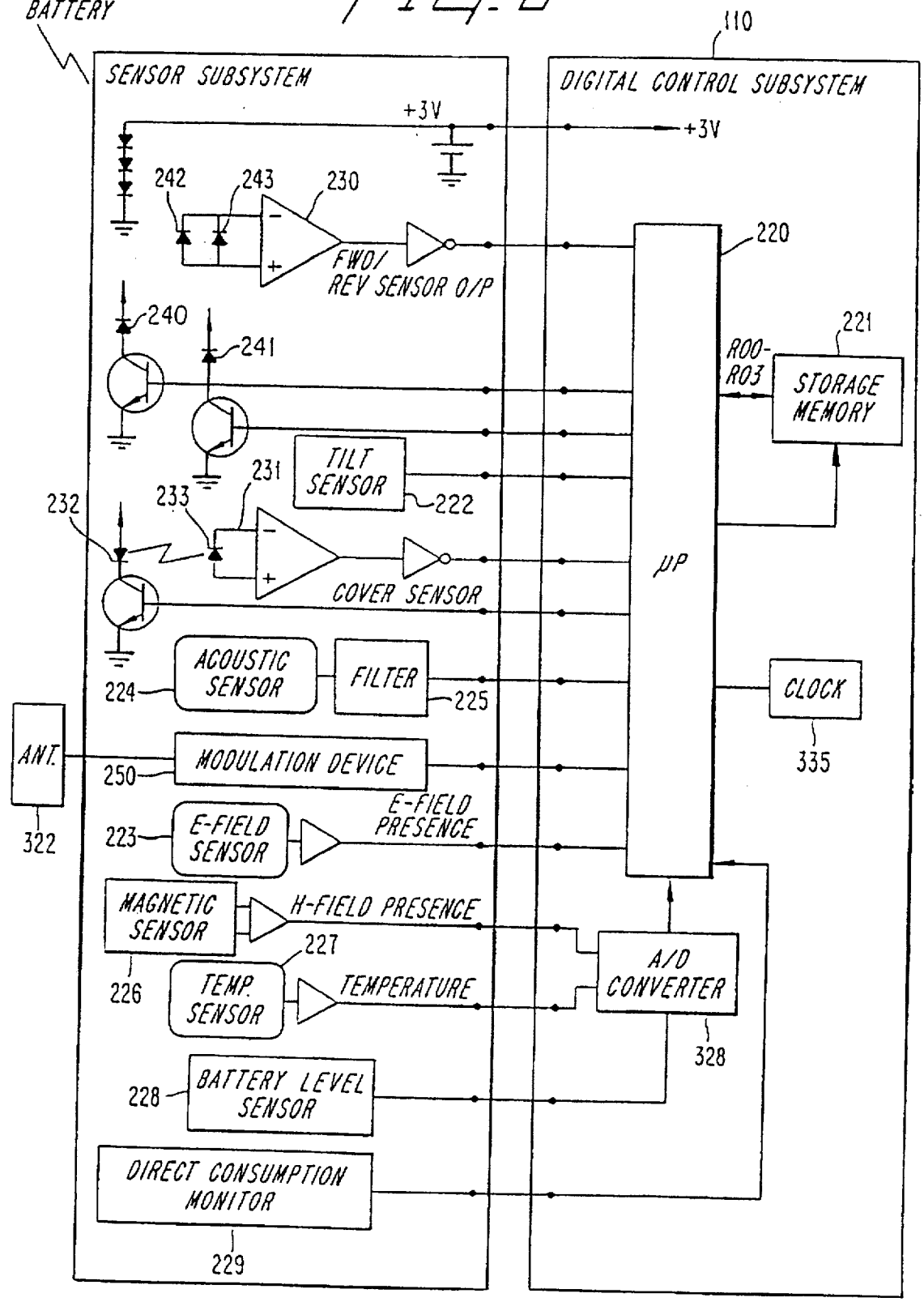
FIG. 5 is a schematic diagram of a network service module.
Figure 6:
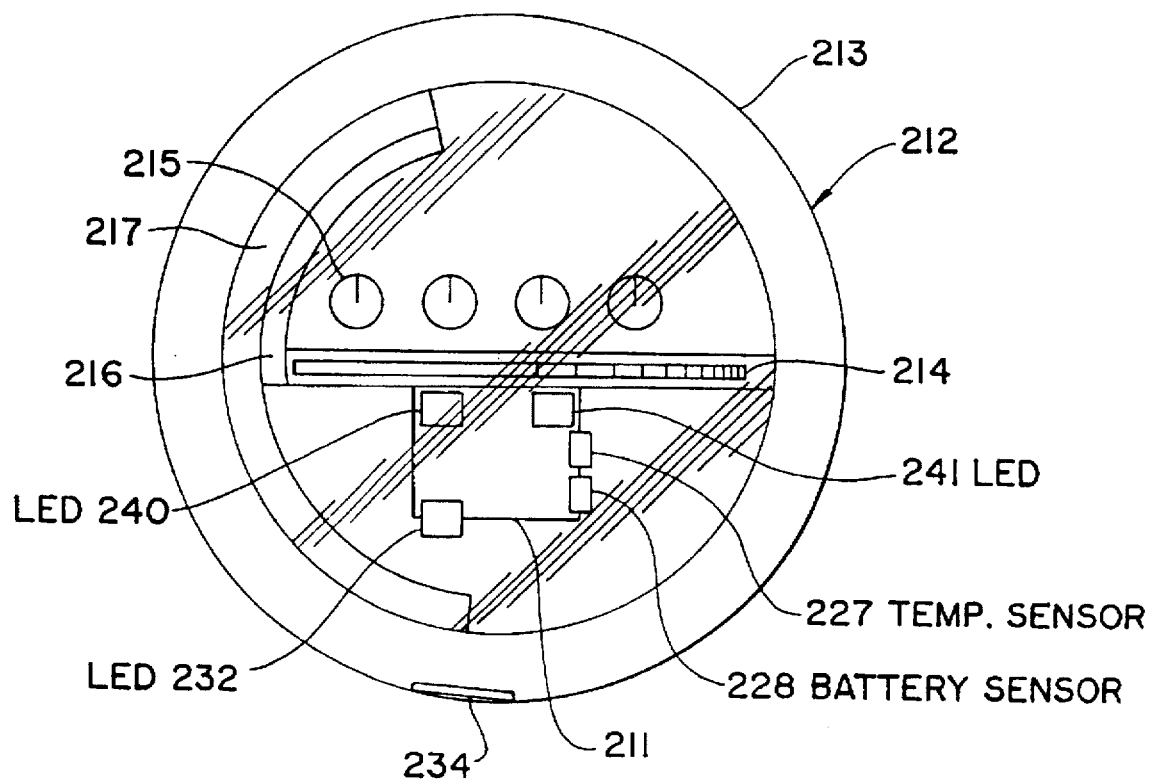
FIG. 6 shows a front elevation view of an electricity utility meter with a detection unit.
Figure 7:
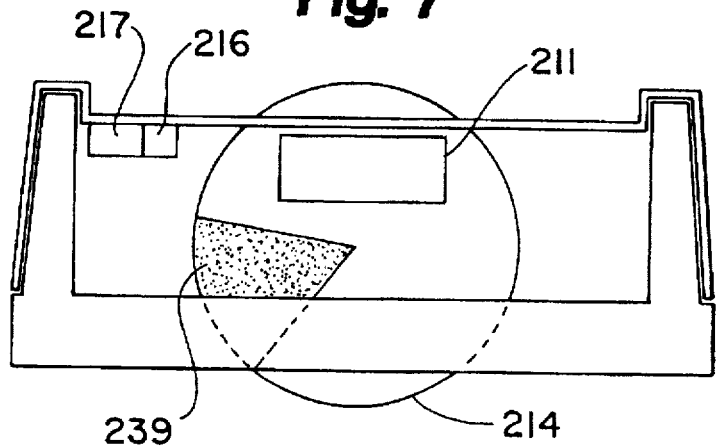
FIG. 7 shows a bottom plan view of the electricity utility meter.

A network service module 110 schematically is shown in FIG. 5 and is mounted in a suitable housing 211 illustrated in FIG. 6 and 7 with the housing including suitable mounting arrangement for attachment of the housing into the interior of a conventional electricity meter 212. Each network service module is coupled to a respective physical device. In FIG. 6, the physical device is an electricity meter 212.

Referring to FIGS. 5, 6 and 7 the electricity meter 212 includes an outer casing embodied as a cover 213 which is generally transparent. Within the casing is provided the meter system which includes a disk 214 which rotates about a vertical axis and is driven at a race dependent upon the current drawn to the facility. The number of turns of the disk 214 are counted by a counting system including mechanical dials 215. The meter is of conventional construction and various different designs are well known in the art.

An antenna 217 is mounted on a bracket 216 carried on the housing inside the cover 213. The antenna as shown is arc-shaped extending around the periphery of the front face. Other antenna configurations are possible.

As illustrated in FIG. 6, the antenna 217 of each of the network service modules is mounted within the cover of the meter. Thus the NSM antenna 217 is mounted on the support structure itself of the network service module 110. This enables the network service module 110 to be manufactured relatively cheaply as an integral device which can be installed simply in one action. However, this provides an NSM antenna 217 which can transmit only relatively short distances. In addition, the power level is maintained at a relatively low value of the order of 10–100 milliwatts, the energy for which can be provided by a smaller battery system which is relatively inexpensive. An NSM antenna 217 of this type transmitting at the above power level would have a range of the order of one to two kilometers.

The network service module 110 is in a sealed housing 211 which prevents tapering with the sensors, microprocessor and memory located within the housing.

Turning now to FIG. 5, the network service module optionally may include a detection device which uses the microprocessor 220 which has associated therewith a storage memory 221. An essential sensor is for meter reading, for measuring the amount of electricity, amount of water or amount of gas consumed. Such a sensor alleviates having a meter reader person, by allowing the system to automatically report the amount of usage of the physical device.

Any number of sensors may be provided for detection of tampering events with the network service module of the present invention, and the sensors may be adapted for electricity, gas, water or other applications. For the most part, information reported by the various sensors would be considered low data rate. The wide area communications network supports distributed automation functions including basic meter reading, time of use meter reading, service connect and disconnect operations, alarm reporting, theft of service reporting, load research, residential load control, commercial and industrial load curtailment, and distributed supervisory control and data acquisition (SCADA). Furthermore, the wide area communications network is readily expandable to support new applications as they are developed.

While the emphasis, by way of example, is automatic meter reading and on measuring time of use of an electricity meter, other functions such as 15-minute peak consumption recording, line power monitoring, i.e., outage and restoration, tamper sensing and timekeeping are supported.

The following is a representative listing of possible sensors that may be used with the network service module of the present invention. Each sensor is optional, and to a person skilled in the art, variants may be added to the network service module of the present invention. For example, FIG. 5 illustratively shows a temperature sensor 227 and a battery level sensor 228; however, each sensor 227, 228 may be substituted by or may be in addition to other possible sensors from the following representative listing of sensors.

(a) A tilt sensor 222 detects movement of the housing through an angle greater than a predetermined angle so that once the device is installed, indication can be made if the device is removed or if the meter is removed from its normal orientation.

(b) A electric field sensor 223 detects the presence of an electric field. Unless there is power failure, the electric field sensor should continue to detect the presence of an electric field unless the meter is removed from the system.

(c) An acoustic sensor 224 detects sound. The sounds detected are transmitted through a filter 225 which is arranged to filter by analog or digital techniques the sound signal so as to allow to pass through only those sounds which have been determined by previous experimentation to relate to cutting or drilling action, particularly on the cover.

(d) A magnetic sensor 226 detects the presence of a magnetic field. A magnetic field is generated by the coils driving the disk so than magnetic fields should always be present unless the meter has been by-passed or removed. As is well known, the rate of rotation of the disk is dependent upon the magnetic field and, therefore, this rate of rotation can be varied by changing the magnetic field by applying a permanent or electromagnet in the area of the meter to vary the magnetic field. The magnetic sensor 226 is, therefore, responsive to variations in the magnetic field greater than a predetermined magnitude so as to indicate that an attempt has been made to vary the magnetic field adjacent the disk to slow down the rotation of the disk.

(e) A temperature sensor 227 detects heat so that the temperature associated with a particular time period can be recorded. A battery level sensor is indicated at 228. The sensors 226, 227 and 228 communicate information through an analog digital converter 328 to the microprocessor 220. The information from sensors 227 and 228 can be communicated to provide "housekeeping" status of the operation of the unit. The temperature sensor 227 can be omitted if required and this information replaced by information gained from a public weather information source. In some cases the meter is located inside the building and hence the temperature remains substantially constant whereas the outside temperature is well known to vary consumption quite dramatically.

(f) A consumption sensor comprises a direct consumption monitor 229 which can be of a very simple construction since it is not intended to act as an accurate measure of the consumption of the electricity used. The direct consumption monitor can, therefore, simply be a device which detects the value of the magnetic field generated, on the assumption that this value is proportional to the current drawn. The direct consumption value obtained can then be completed with a measurement of the consumption as recorded by the rotation of the disk 214. In the event that the direct consumption monitor provides a sum of the consumption over a time period which is different from the consumption measured by rotation of the disk 214 by an amount greater than a predetermined proportion, then the direct consumption monitor 229 can be used to provide a tamper signal. This would be indicative, for example, of a mechanical tag applied to the disk to reduce recorded consumption.

(g) A forward/reverse sensor 230, discussed in more detail hereinafter, detects reverse rotation of the disk 214 and provides an input to the microprocessor upon detection of such an event.

(h) A cover sensor 231 is used to detect the continual presence of the cover 213. The cover sensor comprises a light emitting diode (LED) 232 which generates a light beam which is then reflected to a photo diode 233. The absence of the reflected beam at the photo diode 233 is detected and transmitted as a tamper signal to the microprocessor 220. The reflected beam is generated by a reflective strip 234 applied on the inside surface of the cover adjacent the diode 232 as shown in FIG. 6.

The above sensors thus act to detect various tampering events so that the presence of such a tampering event can be recorded in the storage memory 221 under the control of the microprocessor 220.

The microprocessor 220 also includes a clock signal generator 335 so that the microprocessor 220 can create a plurality of time periods arranged sequentially and each of a predetermined length. In the example of the present invention shown, the time periods are eight hours in length and the microprocessor 220 is arranged to record in each eight hour period the presence of a tamper event from one or more of the tamper signals.

Figure 8:
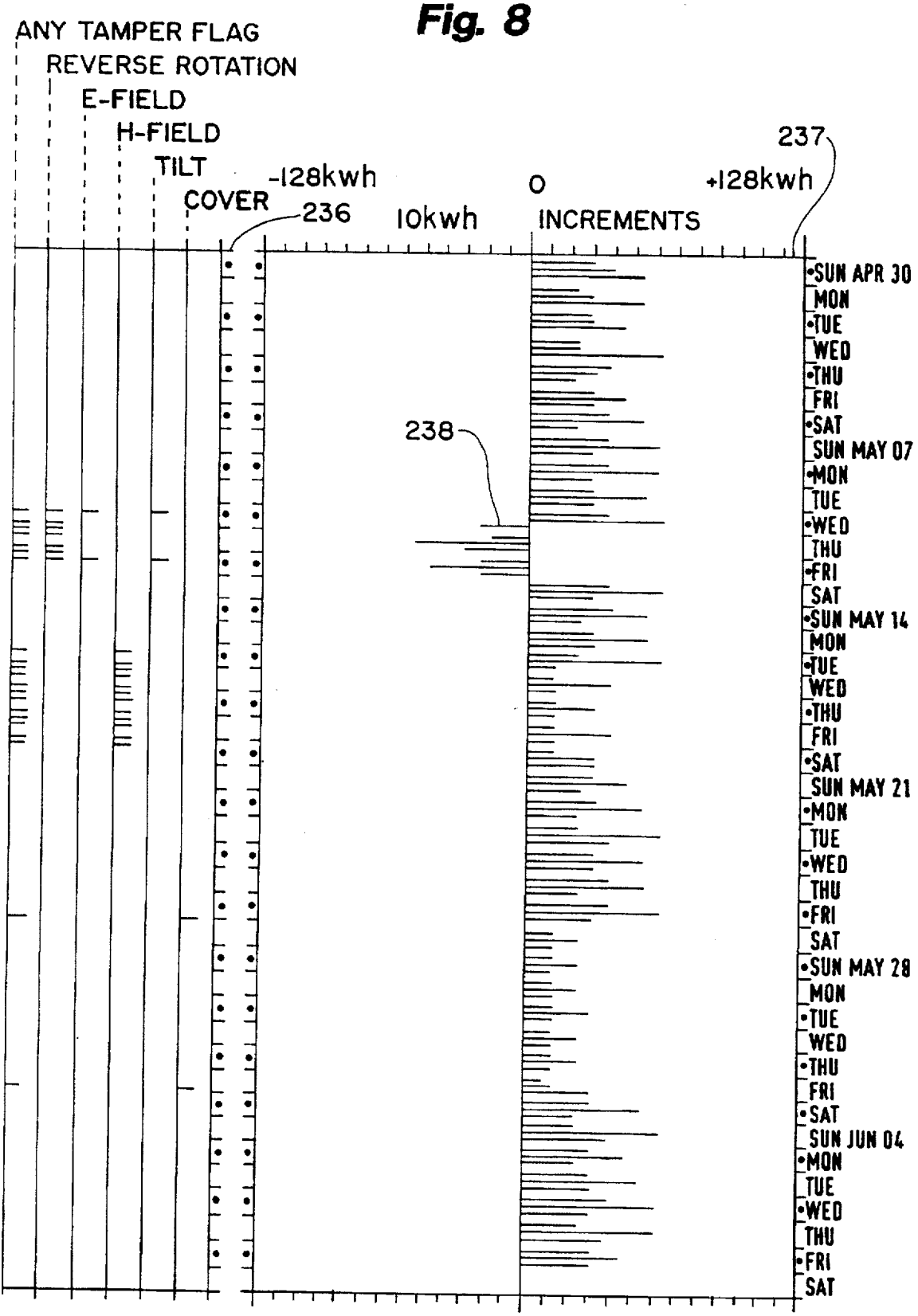
FIG. 8 is an illustration of a typical printout of information obtained by the network service module.

As shown in FIG. 8, the series of predetermined time periods is recorded with the series allocated against specific dates and each eight hour period within the day having a separate recording location within the storage memory 221. One such series is shown in FIG. 8, where a number of tampering events 236 are indicated. The print-out thus indicates when any tampering event 236 has occurred and in addition then identifies which type of tampering event has taken place.

The rotation of the disk 214 also is detected to accurately record the number of rotations of the disk both in a forward and in a reverse direction. In FIG. 8, a table 237 shows in graphical form the amount of rotation of a disk recorded in eight hour periods as previously described. For one period of time the disk is shown to have rotated in a reverse direction 238. Whenever the disk rotates in a reverse direction, the reverse rotation subtracts from the number of turns counted on the conventional recording system 215, shown in FIG. 6.

As shown in FIGS. 6 and 7, detection of the rotation of the disk is carried out by the provision of a dark segment 239 formed on the undersurface of the disk, leaving the remainder of the disk as a reflective or white material. The detection system thus provides a pair of light emitting diodes 240, 241 which are positioned on the housing so as to direct light onto the underside of the disk. The light emitting diodes 240, 241 are angularly spaced around the disk. The diodes are associated with the photo diodes 242, 243 which receive light when the disk is positioned so that the light from the associated light emitting diode 240, 241 falls upon the reflective part of the disk and that light is cut off when the dark part of the disk reaches the requisite location. Basically, therefore, one of the pairs of light emitting diodes 240, 241 or photo diodes 242, 243 is used to detect the passage of the dark segment which is, of course, one rotation of the disk 214. The direction of rotation is then detected by checking with the other of the pairs as the dark segment reaches the first of the pairs as to whether the second pair is also seeing the dark segment or whether it is seeing the reflective material. Provided the sensors are properly spaced in relation to the dimension of the segment, therefore, this indicates the direction which the disk rotated to reach the position which is detected by the first pair of diodes.

In order to conserve energy, the sensors are primarily in a sampling mode using an adaptive sensing rate algorithm. In one example the dark or non-reflective segment is 108° of arc and there is provided a 50° displacement between the sensors. In a practical example of a conventional meter, the maximum rotation race is of the order of 2 rps. A basic sample interval can be selected at 125 m/sec, short enough to ensure at least one dark sample is obtained from the dark segment. In operation, only the first pair of sensors is sampled continuously. When a dark response is observed, a second confirming sample is obtained and the sample rate increased to 16 pps. As soon as a light segment of the disk is sensed, the second sensor is sampled. If the second sensor still saw the dark segment, then clockwise rotation is confirmed; if a light segment were observed, then counterclockwise rotation is indicated.

At slower speeds, the algorithm results in a sample rate of 8 pps for 70% of a rotation and 16 pps for 30% of a rotation for the first pair of sensors plus two samples for direction sensing for the second pair. For annual average consumption of 12,000 kwh, the disk rotates approximately 1.6 million times.

In order to sense the presence of stray light which could innerfere with measurements, the photo diode output is sampled immediately before and immediately after the light emitting diode (LED) is activated. If light is sensed with the LED off, stray light is indicated and an alarm my be initiated after a confirming test. The latter may include a test of ocher sensors such as the optical communication port sensor discussed hereinafter.

As shown in FIG. 5, communication from the meter reading unit is carried out by radio transmission from the microprocessor 220 through a modulation device 250 which connects to the antenna 322. The transmission of the signal is carried out under the control of the microprocessor 220. Modulation carried out by the modulation device 250 can be of a suitable type including, for example, phase modulation using amplitude shift keying (ASK), phase shift keying (PSK) such as binary PSK (BPSK), frequency modulation using frequency shift keying (FSK), such as, for example, binary FSK, or spread spectrum modulation. This allows the system to be used without the allocation of a dedicated frequency so that the signal appears merely as noise to receivers which do not have access to the decoding algorithm by which the signal can be recovered from the different frequencies on which it is transmitted.

Remote Cell Nodes

A plurality of remote cell nodes 112 in FIG. 1 is located within the geographical area and is spaced approximately uniformly and such that each network service module 110 is within a range of several remote cell nodes 112 to provide overlapping coverage. The remote cell nodes 112 typically might be spaced at 0.5 mile intervals on utility poles or light standards. Each remote cell node 112 provides coverage over a limited area much like the cell in a cellular telephone network. Remote cell nodes 112 preferably are spaced to provide overlapping coverage, so that on an average, each NSM-packet signal transmitted by a network service module 110 is received by three or four remote cell nodes 112, even in the presence of temporary fading. As a consequence, erection of a tall building near a network service nodule 110 has little or no effect on message reception, nor does the failure of a remote cell node 112 result in loss of NSM-packet signals or NSM data.

Figure 9:
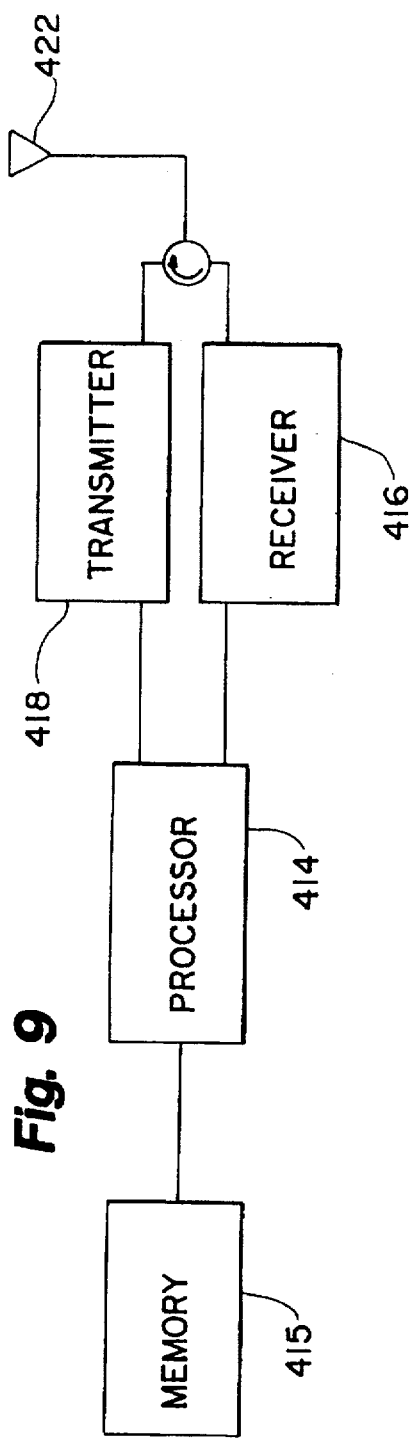
FIG. 9 is a remote cell node block diagram.

As illustratively shown in FIG. 9, each remote cell node (RCN) 112 of FIG. 1 includes RCN-transmitter means, RCN-receiver means, RCN-memory means, RCN-processor means and an RCN antenna 422. The RCN-transmitter means, RCN-receiver means, RCN-memory means and RCN-processor means may be embodied as an RCN transmitter 418, RCN receiver 416, RCN memory 415 and RCN processor 414, respectively. The RCN transmitter 418 and the RCN receiver 416 are coupled to the RCN antenna 422. The RCN processor 414 is coupled to the RCN transmitter 418, RCN receiver 416, and RCN memory 415.

The RCN transmitter 418, under the control of the RCN processor 414, transmits an RCN-synchronization signal and/or a command signal using radio waves at the first carrier frequency or the second carrier frequency. The choice of frequency depends on which frequency is being used for the NSM receiver 316 at each of the plurality of network service modules 110. Transmitting an RCN-synchronization signal and/or a command signal from the RCN transmitter is optional, and is used if the NSM receiver 316 is used at the network service module 110. The command signal can include signalling data being sent to the network service module 110. The signalling data may require the network service module 110 to transmit status or other data; set reporting time period, e.g., from an eight hour period to a four hour period; and any other command, control or "housekeeping" jobs as required.

The RCN receiver 416 receives at the first carrier frequency a multiplicity of NSM-packet signals transmitted from a multiplicity of network service modules 110 by radio waves. Each of the multiplicity of NSM-packet signals typically is received at a different point in time, since they are transmitted at a time which is randomly or pseudorandomly selected within the predetermined time period. The multiplicity of network service modules 110 usually is a subset of plurality of network service modules 110. Received NSM-packet signals are time stamped by the RCN processor 414 and temporarily stored in the RCN memory 415 before being transmitted to the next higher network level. The RCN receiver 416 also receives polling signals from the intermediate data terminal 114, and listens or eavesdrops on neighboring remote cell nodes when they are polled by the intermediate data terminal 114.

The RCN processor 414 collates the NSM-packet signals received from the network service modules, identifies duplicates of NSM-packet signals and deletes the duplicate NSM-packet signals. The RCN processor 414 controls the RCN transmitter 418 and RCN receiver 416. The RCN memory 415 stores the received multiplicity of NSM-packet signals. Thus each remote cell node 112 receives, decodes and stores in RCN memory 415 each of these NSM-packet signals as received from the network service modules 110.

The remote cell node 112 comprises simply a suitable resistant casing which can be mounted upon a building, lamp standard or utility pole at a suitable location in the district concerned. The remote cell node 112 can be battery powered, and have a simple omni-directional antenna as an integral part of the housing or supported thereon.

Information accumulated at remote cell nodes 112 periodically is forwarded via a polled radio communications link to a higher level network node, as illustrated in FIG. 1, termed an intermediate data terminal 114. The communications link may alternatively be by cable or other communications channel. The intermediate data terminals 114 are spaced typically at four mile intervals and can be conveniently cited at substations, providing coverage for up to 100 cells. Remote cell nodes also receive timing information and command signals from intermediate data terminals.

When a polling signal is sent from an intermediate data terminal 114, the RCN transmitter 418 transmits at the first carrier frequency the stored multiplicity of NSM-packet signals as an RCN-packet signal to the intermediate data terminal 114.

When a first remote cell node is polled with a first polling signal by the intermediate data terminal, neighboring remote cell nodes 112 receive the RCN-packet signal transmitted by the first remote cell node. Upon receiving an acknowledgment signal from the intermediate data terminal that polled the first remote cell node, at the neighboring remote cell nodes 112 the respective RCN processor deletes from the respective RCN memory messages from the network service modules that have the same message identification number as messages transmitted in the RCN-packet signal from the first remote cell node to the intermediate data terminal. The message identification number is illustrated in a typical NSM-data packet in FIG. 3.

FIG. 1 illustrates a plurality of the network service modules 110. The network service modules 110 are set out in a pattern across the ground. This pattern is dependent upon the locations of the utility usage which generally do not have any particular pattern and which vary significantly in density from location to location.

The remote cell nodes 112 are arranged in an array with the spacing between the remote cell nodes 112 relative to the network service modules 110 such that each network service module 110 can transmit to at least two and preferably four of the remote cell nodes 112. Thus, the remote cell nodes 112 are provided in significantly larger numbers than is absolutely necessary for the signals from each network service module 110 to be received by a respective one of the remote cell nodes 112. The remote cell nodes 110 theoretically receive high levels of duplicate information. In a normal residential situation, locating the remote cell nodes 112 so that each network service module 110 can be received by four such remote cell nodes 112 would lead to an array in which each remote cell node 112 would be responsive to approximately 1,000 of the network service modules 110.

Each of the network service modules 110 is arranged to calculate an accumulated value of utility usage for a set period of time which in the example shown is eight hours. Subsequent to the eight hour period, the NSM controller 314 prepares to transmit the information in a packet of data as an NSM-packet signal. The packet of data includes:

(a) The total of usage during the see period, e.g., eight hours.

(b) The accumulated total usage stored in the NSM memory 315 to date. The transmission of this information ensures that even if a message is lost, resulting in the total for one of the time periods not being communicated to the central data terminal, the central data terminal 120 can recalculate the amount in the missing time periods from the updated accumulated total.

(c) Some or all of the tamper signals defined above.

(d) The time of transmission.

(e) A message number so that the messages are numbered sequentially. In this way, again, the remote cell node 112 can determine whether a message has been lost or whether the information received is merely a duplicate message from a duplicate one of the receiving stations.

(f) Housekeeping information concerning the status of the network service module 110, for example, the temperature and the battery level indicator sensor values.

When information is received at the remote cell node 112, the RCN processor 414 acts to store the information received in The RCN memory 415 and then to analyze the information. The first step in the analysis is to extract from the received messages the identification code relating to the respective network service module 110. The information relating to that network service module 110 is introduced into an RCN memory register relating to that network service module 110 to update the information already stored.

One technique for avoiding transmission of duplicate information from the remote cell nodes 112 to the intermediate data terminal 114 requires that each remote cell node 112 monitor the transmissions of the other remote cell nodes 112. When the signals are monitored, the information transmitted is compared with information stored in the monitoring remote cell node 112 and if any redundant information were found in the memory of the monitoring remote cell node 112, then the redundant information is canceled. Using this technique, when very high levels of redundancy are used, the time for transmission from the remote cell node 112 to the intermediate data terminal is not significantly increased.

In addition to the periodic transmission of the usage data, each network service module 110 can be programmed to transmit an alarm signal upon detection of the removal of the electric voltage or excessive tilting of the network service module. The transmission of the alarm signal can be delayed by a short random period of time so that if the loss of the voltage were due to a power outage covering a number of locations, then all signals are not received at the same time. The remote cell nodes 112 and intermediate data terminals 114 also can be programmed to retransmit such alarm signals immediately this way the central data terminal 120 has immediate information concerning any power outages, including the area concerned. This can, of course, enable more rapid repair functions to be initiated.

In addition to automatic alarm signal transmission, the central data terminal or the intermediate data terminals can send a request for transmission of data to a particular network service module over a real-time channel. Upon receiving such a request, the network service module responds with a current reading of power usage, alarm condition, or other, as data requested. This real-time channel enables the central data terminal to gather up-to-the-minute data rather than having to wait for the network service module's next scheduled transmission. This real-time channel can also be used to send a power cut-off, or other, command from the central data terminal co specific network service modules, with nearly instantaneous results if necessary.

Furthermore, the remote cell nodes 112 can be arranged to transmit control signals for operating equipment within the premises in which the network service module 110 is located. The remote cell nodes 112 are necessarily arranged in a suitable array to transmit such information so that the information can be received in each of the premises concerned using relatively low transmission power and using the equipment already provided for the meter reading system. This transmission capability can be used to control, for example, radio-controlled switches within the premises of relatively high power equipment for load shedding at peak periods. In similar arrangements, the network service module 110 may include a receiving facility to enable detection of signals transmitted by the remote cell nodes 112. In one example, these signals may relate to synchronizing signals so that each of the network service modules 110 is exactly synchronized in time with the remote cell node 112 and/or intermediate data terminal 114 and central data terminal 120. This exact synchronization can be used to accurately detect usage during specific time periods, enabling the utility to charge different rates for usage during different time periods in order to encourage use at non-peak times, again for load shedding purposes.

The attenuation of a radio signal is proportional to the inverse of the distance from the source to the power N. In free space N is equal to 2. In more practical examples where buildings, trees and other geographical obstructions interfere, the power N general lies between 4.0 and 5.0. This interference, therefore, significantly reduces the distance over which the signal from the network service module can be monitored. Thus, the number of network service modules which can be monitored by a single remote cell node is significantly reduced. Furthermore, the large N rapidly reduces the signal strength after a predetermined distance so that while a network service module can be effectively monitored at a certain distance, the signal strength rapidly falls off beyond that distance. This enables the cells defined by each remote cell node 112 to be relatively specific in size and for the degree of overlap of the cells to be controlled to practical levels without wide statistical variations.

An advantage of the present system is that network service modules, which are located at a position which is geographically very disadvantageous for transmission to the closest remote cell node, may be monitored by a different one of the remote cell nodes. Thus, in conventional systems some of the network service modules may not be monitored at all in view of some particular geographical problem. In the present invention this possibility is significantly reduced by the fact that the network service module concerned is likely to be in a position to be monitored by a larger number of the remote cell nodes so that the geographical problem probably does not apply to all of the remote cell nodes.

The increased density of remote cell nodes permits the network service modules to operate with an integral NSM antenna which can be formed as part of the meter reading unit housed within the conventional electric utility meter. In this way the network service module can be totally self-contained within the meter housing, thus enabling installation to be completed within a very short period of time, avoiding customer dissatisfaction caused by wiring problems, and reducing the possibility of damage to a separately mounted NSM antenna. In addition, this arrangement significantly reduces the cost of the network service module to a level which makes it economically viable to install the system.

The present invention can employ a system in which the network service modules are permitted to transmit only during a predetermined time period so that an open time period is available for communication on the same frequency between the intermediate data terminal and the remote cell node without any interference from the network service modules. This level of communication can be carried out using a polling system from the intermediate data terminals to each of the remote cell nodes, in turn, preferably including a directional transmission system at the innermediate data terminal. This system allows optimization of the remote cell node density to meet cost/performance criteria in different deployment scenarios.

The present invention, by recognizing the non-volatile nature of the information source and the acceptability of missing an occasional update through transmission errors or collisions enables the implementation of data collection networks of greater simplicity and at lower cost than is possible with established communication network approaches involving two-way communication. The present invention, therefore, provides a radio communication network which can be employed to acquire data from a large number of remote meter monitoring devices dispatched over a wide area using very low power transmitters in conjunction with an array of remote cell nodes all operating on a single radio communication channel or frequency.

Intermediate Data Terminal

The plurality of intermediate data terminals 114 are located within the geographic area and are spaced to form a grid overlaying the geographic area. The intermediate data terminals typically are spaced to cover large geographic areas. Intermediate data terminals preferably are spaced to provide overlapping coverage, so that on an average, an RCN-packet signal transmitted from a remote cell node is received by two or more intermediate data terminals.

Figure 10:
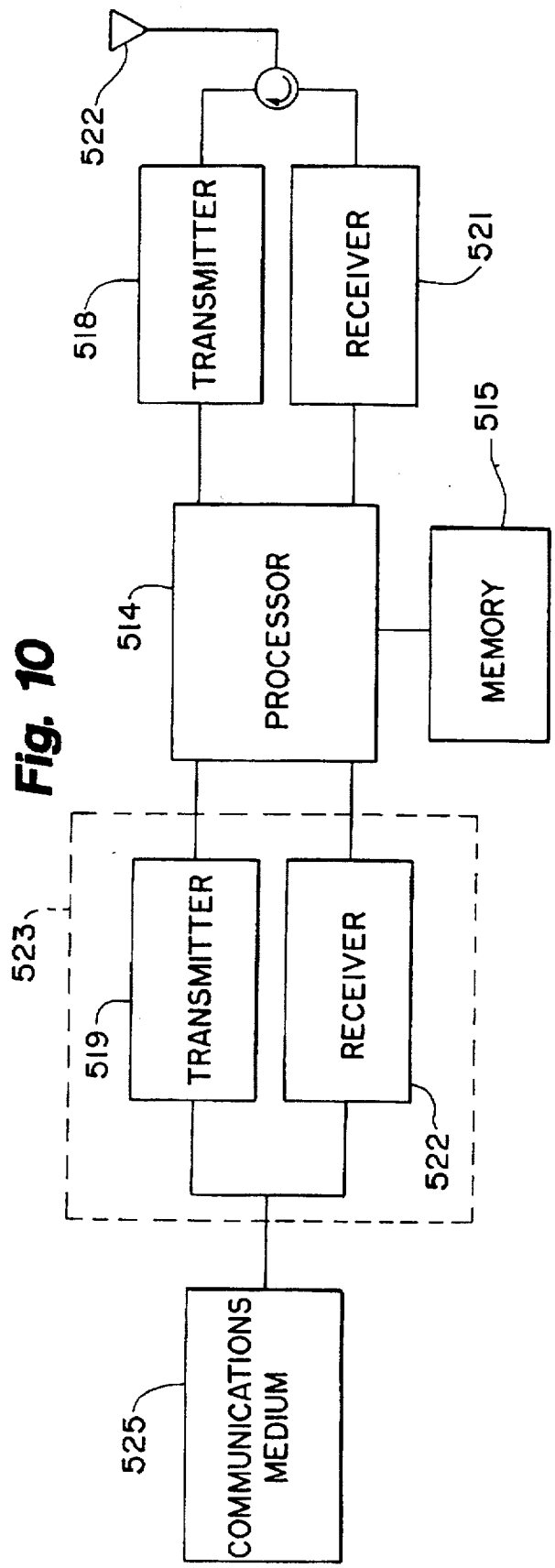
FIG. 10 is an intermediate data terminal block diagram.

As illustratively shown in FIG. 10 each intermediate data terminal includes first IDT-transmitter means, second IDT-transmitter means, IDT-memory means, IDT-processor means, first IDT-receiver means, second IDT-receiver means and an IDT antenna. The first IDT-transmitter means, second IDT-transmitter means, IDT-memory means, IDT-processor means, first IDT receiver means and second IDT-receiver means may be embodied as a first IDT transmitter 518, second IDT transmitter 519, IDT memory 515, IDT processor 514, first IDT receiver 521 and second IDT receiver 522, respectively. The first IDT transmitter 518 and the first IDT receiver 521 are coupled no the IDT antenna 522. The IDT processor 514 is coupled to the first IDT transmitter 518 and second IDT transmitter 519, and the first IDT receiver 521 and second IDT receiver 522. The second IDT transmitter 519 and the second IDT receiver 522 may be embodied as a device such as a modem 523.

The first IDT transmitter 518 under the control of the IDT processor 514, includes a synthesizer or equivalent circuitry for controlling the carrier frequency, and allowing the first IDT transmitter 518 to change carrier frequency. The first IDT transmitter 518 transmits preferably at the first carrier frequency, or the second carrier frequency, the first polling signal using a first polling-access protocol to the plurality of remote cell nodes. When the first polling signal is received by a remote cell node, that remote cell node responds by sending the RCN-packet signal to the intermediate data terminal which sent the first polling signal. If the intermediate data terminal successfully receives the RCN-packet-signal, then the first IDT transmitter 518 sends an acknowledgment signal to the remote cell node. Upon receiving the acknowledgment signal, the RCN processor 414 at the remote cell node deletes, from the RCN memory 415, the data sent in the RCN-packet signal to the intermediate data terminal.

The transmitted signal may be by radio waves over a freespace channel, or using a high frequency signal over a cable or other channel. Thus, the communications channel between remote cell nodes and intermediate data terminals may be free space, cable or a combination thereof, or other equivalent channels.

Intermediate data terminals also communicate an IDT-synchronization signal for conveying timing information and command signals to remote cell nodes. Remote cell nodes serving important SCADA functions can be polled more frequently by an intermediate data terminal to reduce network response time.

The first IDT receiver 521 receives the RCN-packet signal transmitted at the first carrier frequency from the remote cell node which was polled. Thus, after sequentially polling a multiplicity of remote cell nodes 112, the first IDT receiver 521 has received sequentially in time a multiplicity of RCN-packet signals. The multiplicity of RCN-packet signals usually is a subset of the plurality of RCN-packet signals.

The IDT memory 515 stores the received RCN-packet signals. The IDT processor 514 collates the NSM-packet signals embedded in the RCN-packet signals received from the multiplicity of remote cell nodes, identifies duplicates of NSM-packet signals and deletes the duplicate NSM-packet signals, i.e., messages from network service modules that have the same message identification number.

In response to a second polling signal from a central data terminal 120, the second IDT transmitter 519 transmits the stored multiplicity of RCN-packet signals as an IDT-packet signal to the central data terminal 120. The second IDT transmitter 519 and second IDT receiver 522 may be embodied as a modem 523 or other device for communicating information over a communications medium 525 linking the intermediate data terminal via a telephone line or other communications channel with the central data terminal.

The intermediate data terminals may include one or more directional antennas 522. During the quiet time, the intermediate data terminal is arranged to direct the antenna 522 or antennas to each of the remote cell nodes in turn and to transmit to the respective remote call node the first polling signal, calling for the remote cell node to transmit the stored information from the RCN memory 415. Use of more than one antenna can allow communication with more than one remote cell node at a time. The remote cell node is required, therefore, merely to transmit the information upon request in a collated package which is transmitted to the intermediate data terminal and collected for analysis.

In an alternative embodiment of the invention, the invented method may be effected without the plurality of intermediate data terminals, in which case the central data terminal assumes the roles and functions that would otherwise be provided by intermediate data terminals.

Central Data Terminal

At the upper level of the hierarchy is a central data terminal 120 which acts as a network control center and data consolidation point. The central data terminal 120 controls basic network operation, allowing the central data terminal to make global decisions regarding network organization. The central data terminal's purpose is to integrate information from a variety of network nodes into a coherent form which may be forwarded to different utility operating groups for specific applications. In addition to linking regional data terminals, the central data terminal is connected to critical SCADA sites, some of which may be co-located with intermediate data terminals at sub-stations. At this level, there are relatively few communication links, so those required can be selected to optimize cost, speed and reliability. The transmission between the central data terminal 120 and the plurality of intermediate data terminals 114 is carried out using a communications medium 525 such as telephone lines, T1 carriers, fiber optic channels, coaxial cable channels, microwave channels, or satelite links.

Figure 11:
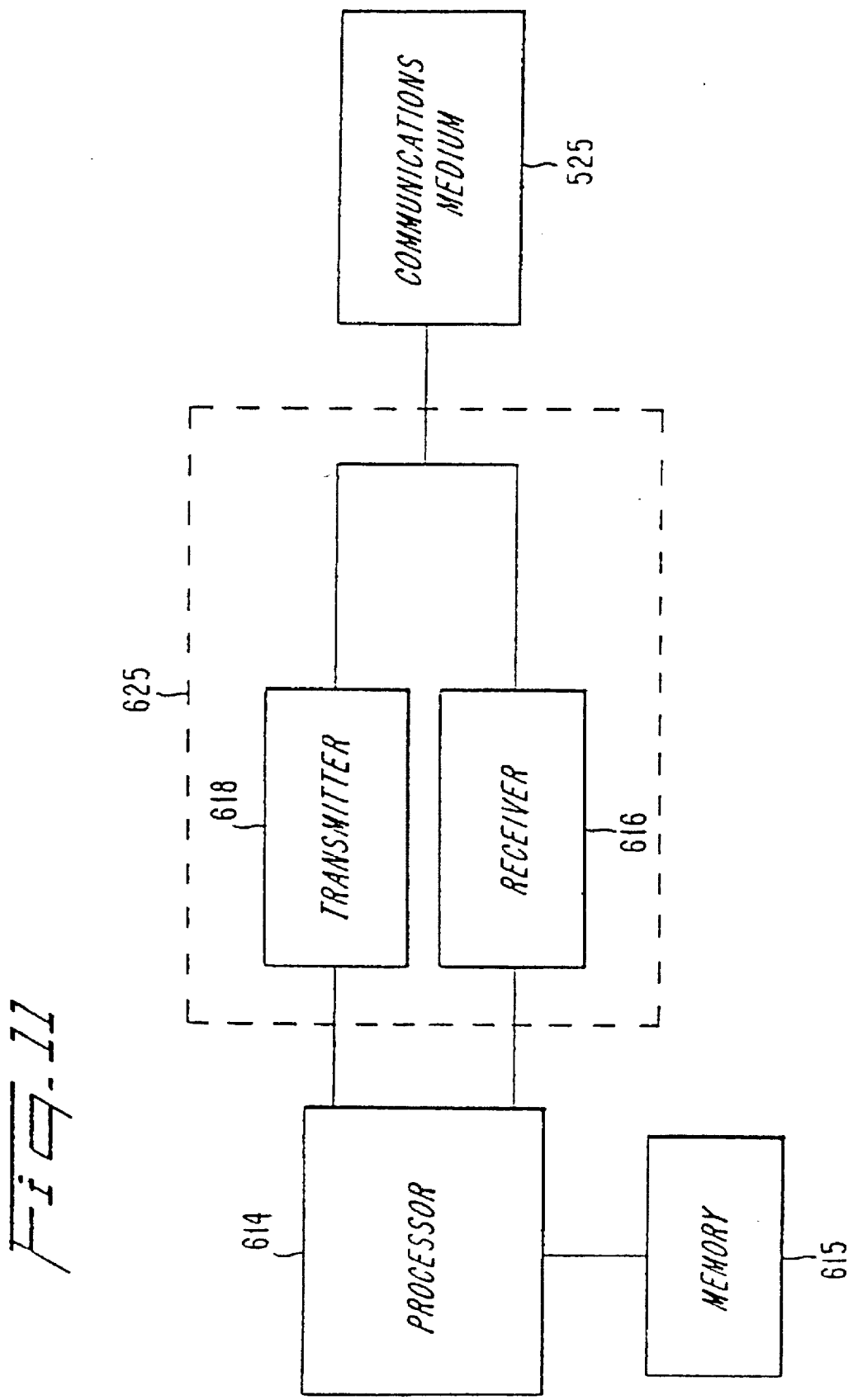
FIG. 11 is a central data terminal block diagram.

As illustratively shown in FIG. 11, the central data terminal (CDT) includes CDT-transmitter means, CDT-receiver means, CDT-processor means and CDT-memory means. The CDT-transmitter means, CDT-receiver means, CDT-processor means and CDT-memory means may be embodied as a CDT transmitter 618, CDT receiver 616, CDT processor 614 and CDT memory 615, respectively. The CDT transmitter 618 and CDT receiver 616 are coupled to the communications medium 525. The CDT processor 614 is coupled to the CDT transmitter 618, CDT receiver 616 and CDT memory 615. The CDT transmitter 618 and CDT receiver 616 may be a modem 625 or other device suitable for communicating information over the communications medium 525 between the central data terminal 120 and each intermediate data terminal 114.

The CDT transmitter 618 transmits the second polling signal sequentially in time, using a second polling access protocol, to the plurality of intermediate data terminals. The CDT receiver 616 receives a plurality of IDT-packet signals. The CDT processor 614 decodes the plurality of IDT-packet signals as a plurality of NSM data. The CDT processor 614 also identifies duplicates of NSM data and deletes the duplicate NSM data. The CDT memory 615 stores the NSM data in a data base. The NSM data is outputted, analyzed or processed as desired.

Utility Overview

The performance of the network is in large part determined by the performance of the network service module 110 to remote cell node 112 link, which is defined by the network service module message loss rate. The network architecture is designed to minimize the network service module message loss rate, which is defined as the fraction of transmitted network service module messages which are not received by the remote cell nodes. The two issues that affect the message loss rate are:

1. relatively large and varying pathloss which is caused by the nature of the urban propagation environment; and
2. simultaneous message transmissions, or collisions, which are a problem for any multiple-access system.

The issue of large and varying pathloss is resolved through the use of:

1. transmit power adjustment;
2. path redundancy, controlled by the remote cell node grid spacing; and
3. multiple transmissions per day.

The collision issue is resolved using:

1. path redundancy, controlled by the remote cell node grid spacing;
2. multiple transmission per day;
3. partitioning of traffic according to priority; and
4. capture effect.

Remote cell node spacing can be selected to control the path redundancy, thus leading to an adjustable level of performance. Notice that path redundancy and multiple transmission per day are used to resolve both issues, and thus are principal features of the wide area communications network. The effect of collisions is minimal, so the probability of receiving a packet any time during the day is maintained at exceptionally high levels.

The link budget contains all of the gains and losses between the network service module power amplifier and the remote cell node receiver, and is used to calculate the maximum pathloss which can be allowed on any link. The minimum receivable signal at the remote cell mode is estimated as 31 115 dBm, which is equal to the sum of the noise floor and the carrier to noise level which is required in order to receive the message, e.g., 10 dB.

Every network service module has many remote cell nodes within receiving range, which increases the reliability of packet reception. When a network service module transmits, the transmission has the potential to be received by many remote cell nodes. Some of the remote cell nodes are in shadow fading zones and do not receive the signal whereas others have an increased signal due to shadowing.

Even though some of the remote cell nodes are quite far from the network service module, and thus the average pathloss is above the maximum allowed limit, receiving the network service module transmission is possible if the signal level fluctuations, shadowing, multipathing, etc., contributed enough to the signal level. Similarly, some remote cell nodes which are close to the network service module do not hear the network service module because signal variations have decreased the signal network level by a significant amount. The unexpected loss of network service module transmission is anticipated to be offset by fortuitous gains as described.

In addition to short-term variations in signal reception, long-term effects also impact the success of transmission. During the life of the system, the urban landscape changes due to building construction and demolition, and foliage growth. These changes in landscape affect the network service module-remote cell node links, causing some remote cell nodes to no longer receive the network service module transmissions while new remote cell nodes begin to receive those same network service module transmissions. For each link that is no longer available, a new link is expected to become operational.

Figure 12:
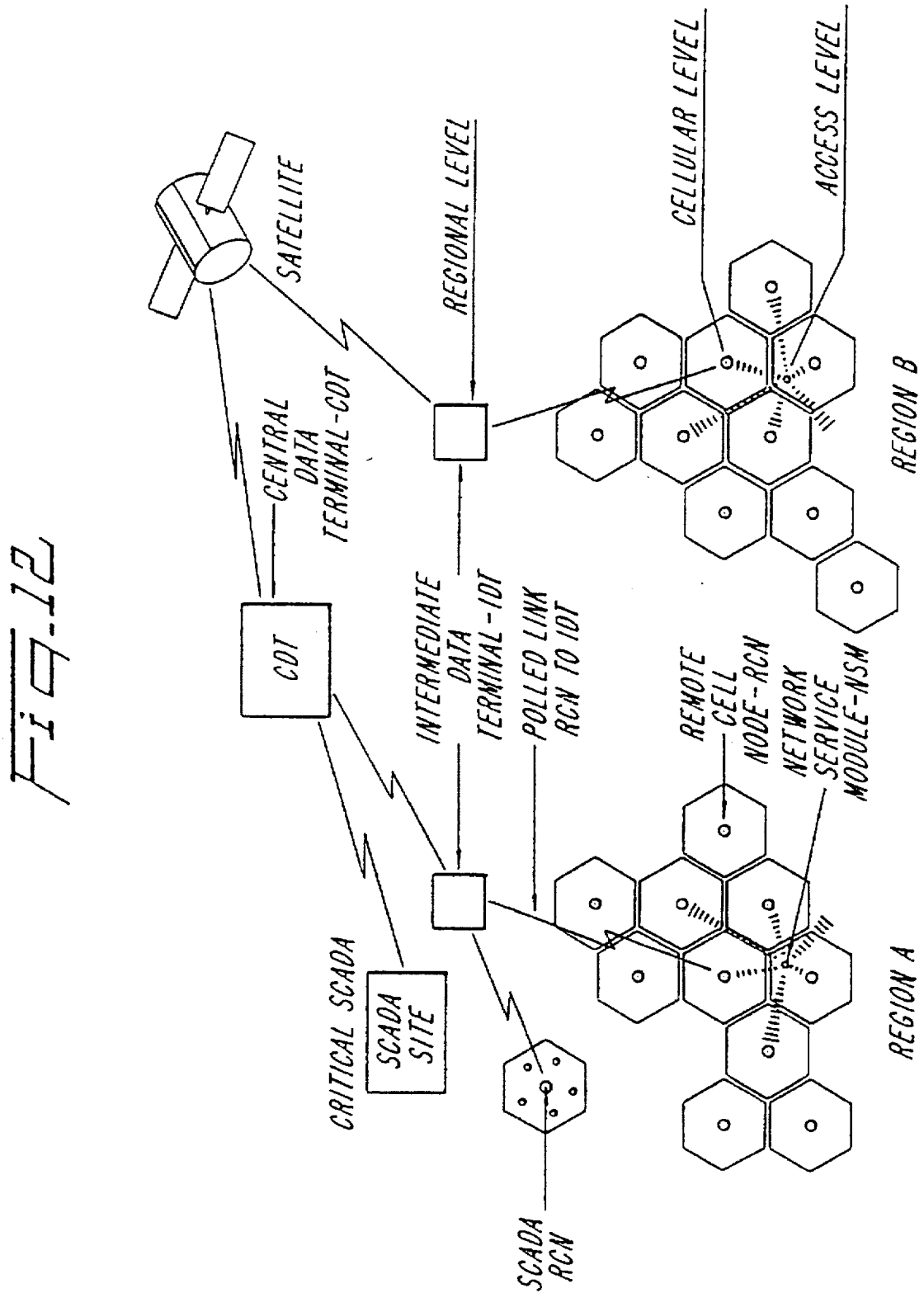
FIG. 12 shows the configuration of the communications network for serving widely separated geographic areas.

The hierarchical design of the wide area communications network allows the customer to service an arbitrarily large contiguous or non-contiguous geographic area, as shown in FIG. 12, containing many applications and a large number of end points.

FIG. 12 illustrates the configuration of the wide area communications network for serving widely separated geographic areas. This includes the provision of a wide area communications network for serving widely separated geographic areas, as well as isolated smaller communities via satellite, fibre optic, microwave or other back bone network. Due to the unique nature of the wide area communications network's single channel and micro cellular scattering propagation concept, the wide area communications network is ideal for many traditionally difficult environments as it is immune to traditional radio problems such as fading, nulls, multipath, and lack of line of sight typical of mountainous or high density urban settings. The hierarchical design of the wide area communications network allows non-contiguous areas to be serviced over a wide geographic area. Separate areas have their own intermediate data terminal communicating with the central data terminal. Data from non-contiguous areas would be transferred at the central data terminal.

The wide area communications network supports a broad range of monitoring, verifiable control, and fast response transaction applications. A number of these application needs are and continue to be identified by utilities. Due to the standardized network interface protocol and message packet configuration, the wide area communications network is able to readily augment its service offerings in either new hardware or software. The wide area communications network offers not only specialized network service modules for electric, gas and water meters but also provides a series of generic modules with industry standard input/output interfaces for contact closure, voltage or current sensing. This allows a variety of vendors to incorporate a wide area communications network communication interface into their own products, be they fuses, alarms, temperature sensors, vending machines, etc.

The wide area communications network can provide a single integrated data channel for other utility operational applications. Some of these applications are hardware oriented but many are application software oriented. They involve the generation of new value-added information reports or services. Although some are primarily for use by the utility, many could be offered for sale to the customer thus creating a new revenue stream for the utility.

The wide area communications network can readily and cost effectively expand to support new hardware and application software growth scenarios. The wide area communications network can be implemented in those regions of the user's service territory and for chose services which are most needed on an implementation plan which is not affected by geographic distribution.

The wide area communications network can support the expansion of SCADA due to its highly reliable wireless communication capabilities. Many utilities would like to add instrumental monitoring points to their SCADA, but the wiring costs and difficulties often associated with these points prohibits SCADA growth at a sub-station or other site. Generic network service modules could be used to solve these problems.

The key issues related to expansion are:
1. the size and arrangement of the geographic area;
2. the number of end points which can be serviced; and
3. the ease with which the number of applications can be increased.

As the number of end points increases, either due to an increase in the number of applications in a geographic area or due to an increase in the size of the geographic area being serviced, the network traffic increases. The amount of additional traffic created depends on the type of application being added. Traffic increases in the wide area communications network are dealt with by hardware expansion at the central data terminal and by installation of additional intermediate data terminals in the new area. FIG. 13 illustrates a typical communications network with gradual growth in the number of areas served.

As the number of end points increases, another issue of concern is the identification of the massage source. A wide area communications network provides over one trillion serial numbers for each type of service module, which allows unique module identification over the life of the system.

As the number of applications increases, the amount of traffic from a given square mile is assumed to also increase. Simulations to the present time have indicated that more than 20,000 end points can be serviced per square mile, with this maximum number depending on the details of remote cell node deployment, house density and message reporting frequency. A dense urban area with 35 ft. by 100 ft. lots contains approximately 5000 homes per square mile.

Centralized control of the wide area communications network is achieved by allowing the central data terminal to have access to network status data, which it uses to make decisions regarding network optimization. These decisions are downloaded to the intermediate data terminals and remote cell nodes as required.

Centralized traffic control is achieved at the remote cell node and intermediate data terminal levels by using priority tables, message storage instructions and alarm storage instructions. The structure of the priority tables is described as follows.

In each message than is transferred through the system, there is a set of identification tags stating the message type and the source. The priority tables in the remote cell nodes and intermediate data terminals contain a listing of all identification tags in the system; these tables are first installed at the time of deployment, but can be updated from the central data terminal as required. If, during the network operational period, there is a need to change message priorities, this change can then be effectuated with minimal impact on the network traffic.

Control of the alarm traffic within the network requires another table because alarm reporting generates higher traffic levels for a short period of time. This bursty traffic generation can lead to congestion problems, and so an alarm instruction table allows the central data terminal to clear alarm messages out of remote cell node and intermediate data terminal buffers at the end of the alarm. This priority table also allows the utility to tailor the alarm traffic delay suit its particular needs.

Both the priority tables and the alarm instructions are used by the message storage instruction module to properly manage traffic on the network. The message storage instructions maintain the message queue, ensure that response times are within specification, and transmit performance data to the central data terminal to be used for network control.

The network service modules transmit messages to the remote cell nodes, which then use the tables discussed above to organize the message queue. All messages reach the application switch with the specified delay. The central data terminal downloads data to the three control modules and tables as required.

Allocation of Bandwidth to Applications

Many issues should be considered when deciding how the limited available communications bandwidth is divided up and allocated to the various uses required by the wide area comunications network. The design of networks should balance operational and performance objectives with available resources. The wide area communications network meets objectives at several levels of abstraction, including:

low cost network service module design;

long life for battery powered network service modules;

high volume, but slow and steady, traffic on network; service module to remote cell node and remote cell node to intermediate data terminal links;

extra capacity on network service module to remote cell node link to account for contention access;

multiple copies of NSM messages relayed on remote cell node to intermediate data terminal links;

low volume traffic on remote cell node to network service module link;

wide range of delivery time requirements on remote cell node to network service module link; and ability to adapt to support future, yet unknown, services.

Bandwidth allocation affects protocol design criteria. Frames are subdivided into equal-sized channels, and channels are partitioned into slots associated with various links. Protocol design parameters include link slot size, channel size, number of channels per frame, and number of frames per cycle. Periods of system quiet time can easily be achieved by simply not assigning a channel or subchannel to any use. This quiet time can be useful in diagnosing communication problems or locating sources of interference.

Application services are granted access to link slots within specified channels of the network service module to remote cell node and remote cell node to network service module links. Access may be exclusive or shared with other services. The number of channels should be large enough to permit a reasonable number of services to co-exist without necessitating shared channel assignment. Total channel capacity on a particular link assigned to an application service can range from several channels to a single subchannel which is a $\frac{1}{2}$, $\frac{1}{4}$, $\frac{1}{8}$ or $\frac{1}{16}$ fraction of a channel, thus allowing flexible dynamic apportioning of a link to services. Furthermore, channel capacity is allocated in a wide range of units, from several whole channels down to a fraction, $\frac{1}{16}$, of a channel, in a way that is nearly optimal for both extremes. The smallest unit of channel allocation is one channel of one frame each cycle. However, if the number of channels per frame and frames per cycle is large, then the designator used to identify a subchannel requires many bits. Frame size should be small enough to ensure that successive slots of a given channel occur frequently enough such that a service using that channel, which needs to deliver a message within a given time interval, is able to do so. Services requiring larger amounts of bandwidth can be given a few whole channels; those requiring a small amount can be given a single subchannel of appropriate size. The smallest subchannel should correspond to a known service with low bandwidth needs. Beyond that, channel size should correspond to a known service with high volume, such that one or a small number of channels satisfies the service's requirements. In either case, a network service module need only deal with a small number of channel designators to orient itself. Allocation by channel has the added benefit of postponing or experimenting with the options of either having services share a large block of channels or giving each service exclusive access to its own channels.

Each link in the wide area communications network is allocated sufficient bandwidth to support the application services. Again, the channel concept can be used to gain a degree of flexibility. A link may be defined to exist, or have slots, in only certain particular channels. Therefore, all channels need not have the same slot structure. Slot order within a channel may also be constrained, e.g., an IDT-RCN slot containing a poll should come before an RCN-IDT slot for the response, and additionally, a delay is required from the end of one slot to the start of the next to allow the RCN time to formulate its response, or to switch the receiver off and turn the transmitter on. To reduce network service module complexity, however, remote cell node to network service module channels accessible to network service modules should have a common remote cell node to network service module slot structure. Basic slot size and structure are fixed at design time, and careful analysis can avoid problems. Dynamically resizing and/or repositioning slots within time channels is also possible by broadcasting appropriate parameters, but it is not worth the added complexity.

Additionally, many hardware design criteria impose constraints on the design parameters identified above, particularly link slot size. To assist in determining optimal values for the above parameters, it is useful to estimate traffic volume on the various links, as well as message delivery time requirements.

Physical Layer

The wide area communications network is a hierarchical network employing synchronous slotted two-way radio communications. Access to a single RF channel by all nodes is governed by a time division multiplexing (TDM) scheme. The physical layer is responsible for this scheme.

Throughout this disclosure, the following conventions have been employed to simplify the designation of particular links. Link names comprise three letters. The first letter designates the source node, the second letter designates the destination node, and the third letter designates the link type. Source and destination nodes are limited to intermediate data terminal (I), remote cell node (R), and network service module (N). Link types may be report (R), download (D), synchronization (S), header (H), request (Q), and special control (C). Using this convention, the remote cell node to network service module request link, for example, would be designated RNQ; the intermediate data terminal to remote cell node header link would be designated IRH, and so on.

Figure 14:
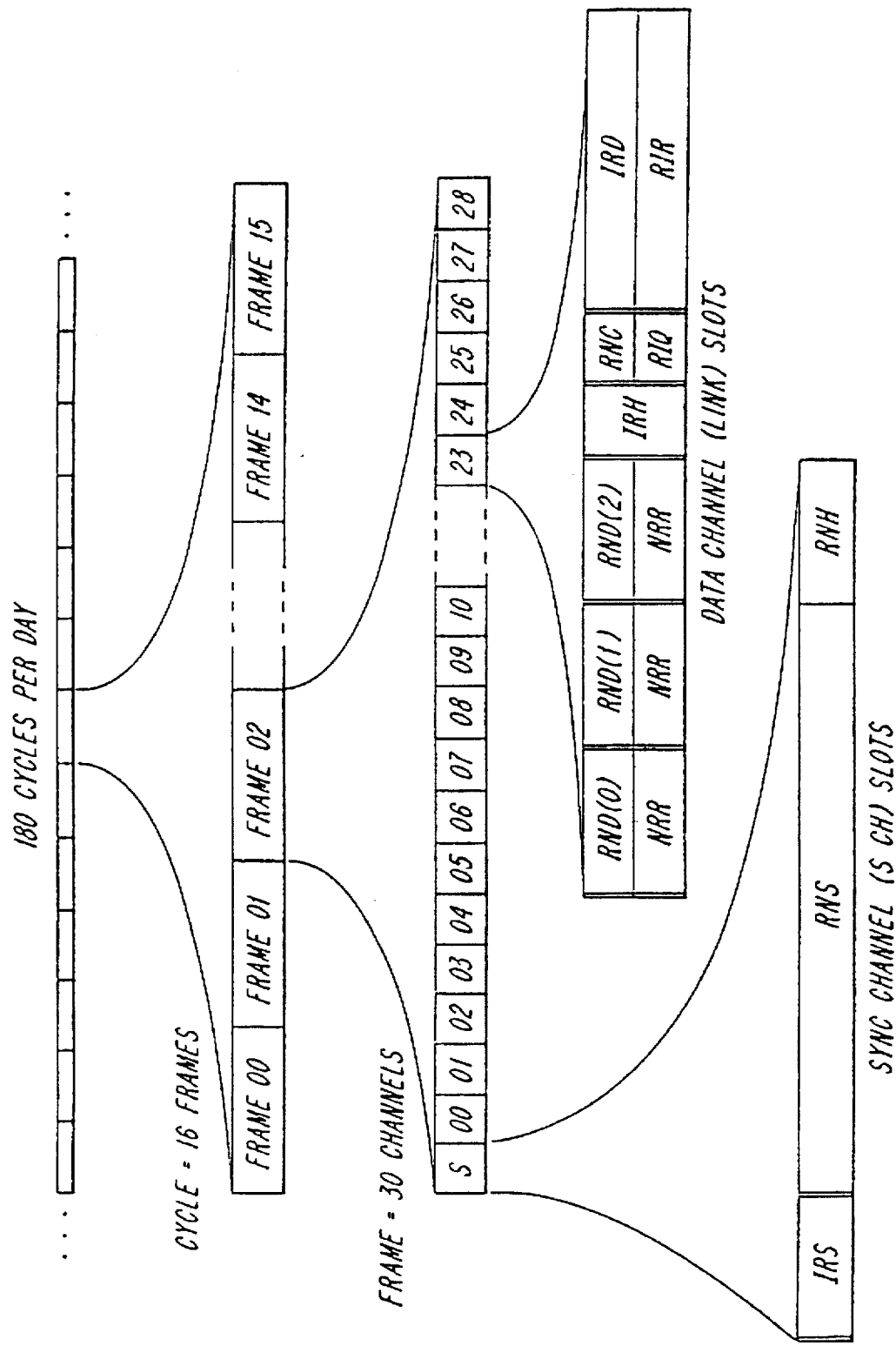
FIG. 14 illustrates a two-way frame structure for the wide area communications network.

FIG. 14 summarizes, by way of example, the TDM strategy. The primary unit of time division is a one second channel. The system has 30 such channels, numbered S, 0, 1, . . . , 28. A 30 second interval, called a frame, is thus divided into 30 one second channels. The one second channels are divided into slots, and each of the various links has its own predefined slot within each channel to use. Therefore, each of the various links may be considered as having 30 channels, although some of the channels may not exist for some of the links. In fact, the synchronization (S) channel is used entirely by the physical layer for node synchronization, and is unavailable for use on all the defined links. These links include:

RND—commands from remote cell node to network service module;

NRR—reports from network service module to remote cell node;

IHR—intermediate data terminal polling remote cell node, or announcing a download;

IRD—intermediate data terminal downloading to remote cell node;

RIR—remote cell node responding to intermediate data terminal's poll;

RIQ—remote cell node requesting intermediate data terminal to poll it; and

RNC remote cell node broadcasts special application control (SAC) to network service modules.

The slot structure shown in the FIG. 14 could apply to all channels from 0 to 28, or some of the channels might be defined by other structures. Nodes using the constituent links should be aware of such structures; in this regard, network service modules are aware of only the one structure shown, however, links between remote cell nodes and intermediate data terminals may evolve alternative structures at the expense of increased complexity. A channel may contain a group of three NRR or RND slots, but not both, and although such slot designations can be reassigned, the selected usage is static between channel assignment reconfigurations. Slots carry no explicit indication of their intended usage, rather the channel allocation table (CAT) reflects this in its entries. For example, if a slot belongs to the RND link, then a CAT entry exists telling some type of network service module to listen to that channel, and remote cell nodes also are told to use that channel to transmit certain types of messages to network service modules. The slot shown to be on either an IRD or RIR link also can be one of two at any given time, but usage is under direct dynamic control of the intermediate data terminal which indicates this in the previous IRH slot.

Although CAT distribution is a network layer function, the physical layer should know which channel to use for any receive/transmit operation the channel performs. The network service modules are permitted to transmit their reports in any of a set of full channels, and listen to specific subchannels for downstream commands. Different types of network service modules, or those belonging to different utilities sharing a common network, could easily co-exist and be assigned exclusive channels. A network service module's designated channels would not be permanently assigned, but a CAT entry would be broadcast on a dedicated subchannel so that network service modules could be kept informed of dynamic reconfigurations of channel assignments. Upon deployment, a network service module would be told where to look for its CAT entry. A CAT entry contains a network service module type, e.g., 8 bits, a bitmap of the allowed upstream channels the network service module may use, e.g., 28 bits, and two subchannels designated for downstream commands, e.g., 12 bits each. A multi-service network service module may need separate CAT entries for each type of service. Battery-powered network service modules, and those requiring fast response time, could be assigned a CAT distribution subchannel in such a way that they need only receive one packet to obtain their entry. CAT entries for line powered network service modules could be placed in a circulating list, sorted by network service module type and with some indication of the length of the list, in a subchannel shared by several types of network service modules. CAT entries would be obtained by receiving successive packets from the subchannel until the required entry is found.

Note that each slot can contain one data link packet, and that all such packets are prefixed by a fixed length preamble which is used by the physical layer to recognize the start of the packet. In addition, adjacent slots are separated by a guard time to allow for timing inconsistency across the network. This relaxes the need for network service modules to be perfectly synchronized. A packet can begin early or late, within limits, and still be correctly located and received.

TDM Subchannel Plan

A time domain channel may be subdivided into 16 subchannels allowing one to allocate small portions of total bandwidth, approximately 0.2%, to applications with low bandwidth requirements.

Figure 15A:
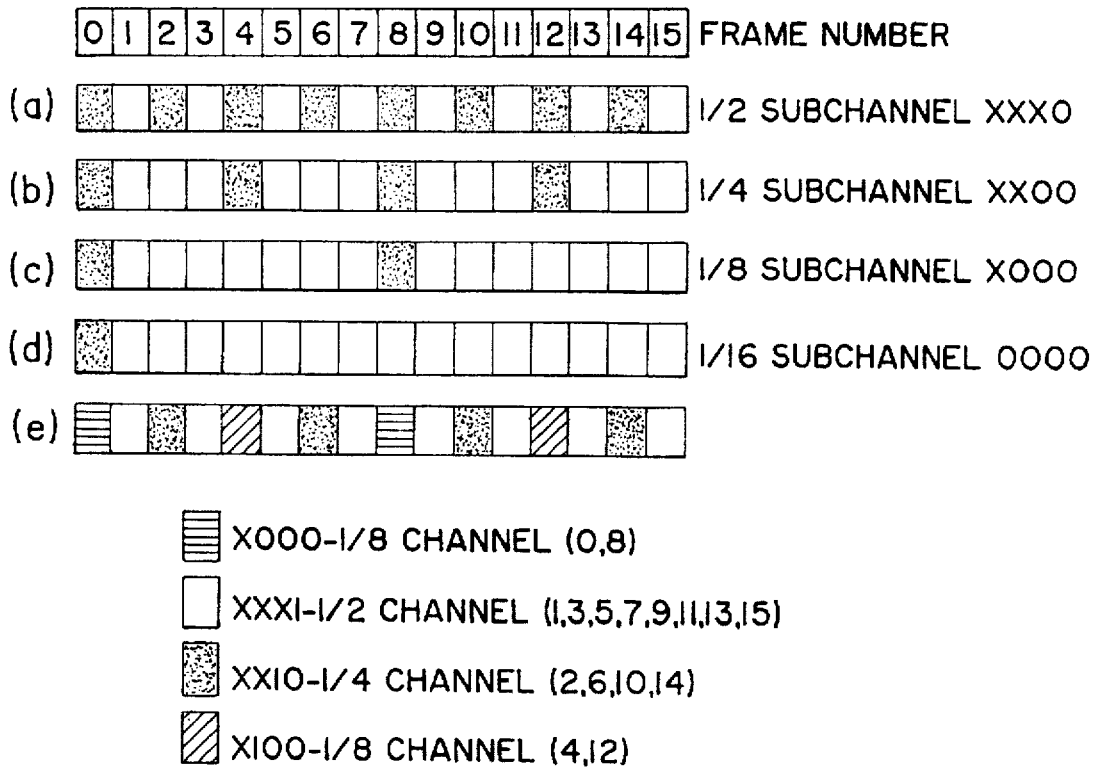
FIG. 15 shows examples of subchannel structure.
Figure 15B:
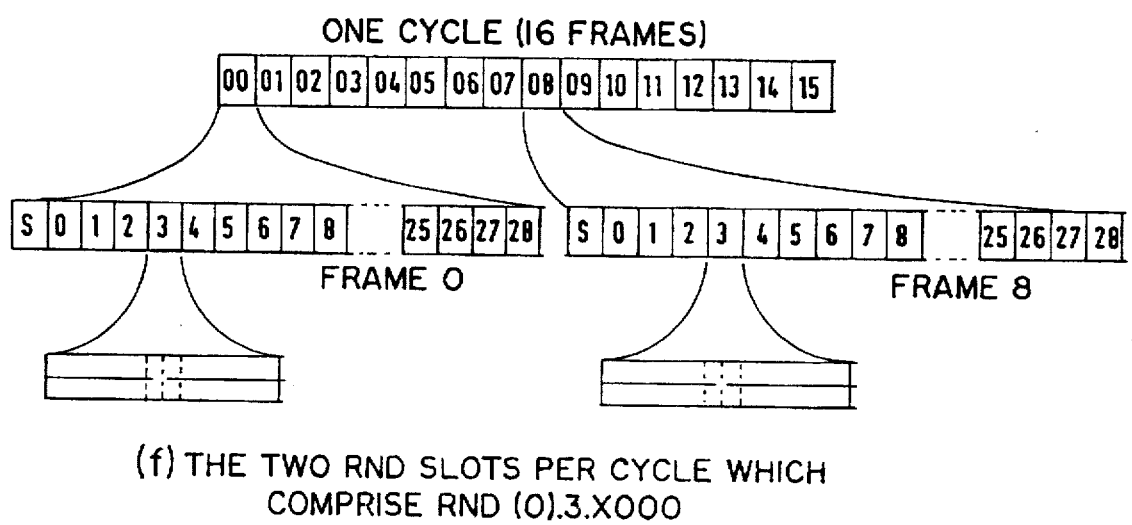

The purpose of cycles is to be able to subdivide a channel into smaller subchannels. Specifically, ½, ¼, ⅛ or 1/16 fractions-of-a-channel-size subchannels may be defined. For example, a ½ channel of channel three includes the channel three slot in every second frame, or alternatively, channel three in only those frames with an even frame number. This is illustrated in FIG. 15, where the dark frames are the ones which contain the specified subchannel (XXX0). FIG. 15 also illustrates ¼, ⅛ and 1/16 size subchannels, the partitioning of a single channel into several unequal sized subchannels, and the two RND{0} slots out of a cycle's 480 one second channel periods, which comprise the subchannel RND{0}.3.X000.

For example, RND{0}.3.XX10 denotes a ¼ sized subchannel of channel three on the RND{0 }link. The "XX10" specifies both the size of the subchannel and the exact subset of frames, from each cycle, which belong to that subchannel. Basically "XX10" is a binary number specifying that a frame whose number, in binary, matches the 0's and 1's represents a frame which contains a slot belonging to the subchannel. In this example, frames 2, 6, 10 and 14 contain slots belonging to subchannel RND{0}.3.XX10. Note than this subchannel specification scheme does not exclude the possibility of a subchannel with non-uniformly spaced slots, such as RND{0}.3.00XX, or of overlapping subchannels, such as RND{0}.3.XXX0 and RND{0}.3.X010. Situations may exist in which both of these properties are desired. The following convention is adopted: All subchannels with which network service modules deal are of the form: XXXY, XXYY, XYYY or YYYY, where the Y's represent 0's or 1's. Furthermore, only channels zero to seven are used to create subchannels visible to network service modules.

The three downstream RND slots can represent distinct remote cell node to network service module links, while the three upstream NRR slots per channel are simply part of a single link. Network service modules permitted to transmit in a given channel can do so in any of the three NRR slots.

Periods of system quiet time can easily be achieved by simply not assigning a channel or subchannel to any use.

Physical Layer Data Packets and Slots

The physical layer uses a common conceptual model for time slots, where each slot carries a single data link packet of certain fixed or maximum size.

The wide area communications network physical layer is defined to provide slotted packet delivery service to the data link layer. This is an extension of the usual scope of the physical layer, which provides a mechanism for transmitting and receiving streams of binary values from which the data link layer constructs its packet structure. The time division multiplexing is the jurisdiction of the physical layer, and since the notion of finite sized, labeled, sloes are visible to the data link layer, a packet delivery service is an obvious consequence. Additionally, network nodes generally do not continually monitor the radio channel, and the network nodes generally do not have sufficiently accurate local clocks to remain in constant synchronization with the TDM structure. The physical layer identifies slot boundaries by transmitting and recognizing certain signal patterns prefixed to the data link layer packets. The exact nature of such preamble fields depends on the performance of transceiver hardware.

Data channel slots are characterized by the four fields shown in FIG. 16. The leading guard field of eight milliseconds separates consecutive slots and permits remote cell nodes to wake up from power conserving states and enter either a transmit or receive state. The guard field also gives network nodes time to reconfigure their transceivers between slots. The preamble is used to establish slot and bit synchronization. The data link layer packet carries an arbitrary sequence of bits formatted as determined by the data link layer. Network nodes attempting to receive the packet in a slot should begin listening a few bits away from the start of the preamble, therefore problems are unlikely should packet data contents look like the preamble. A short trailing guard field allows for network service module time drift within a frame, permits the data link layer packet to be completely transmitted and received before the start of the next slot, and lets a transmitter hold the final data bit an extra half to a full bit time to prevent sampling receivers from experiencing a glitch on the last sample of the last bit. Data link layer packets are either of fixed length, or have an explicit length field, therefore the trailing guard is not needed to act as a "stop" field.

FIG. 17 describes the slot characteristics of the seven different types of data channel slots. Different bit rates are used on the various links, and the values shown in the figure reflect this. A data link packet's opening flag field may also be used by the physical layer to recognize the start of the packet.

Services Provided to Data Link Layer

The physical layer provides data transfer and time reference services to higher layers. The physical layer at the network service module provides a number of services to the data link and network layers. These services include: obtaining network synchronization, as explicitly requested by a higher layer; maintaining current time, between synchronizations, and returning it upon request; checking for and, if present, receiving a packet of specified length, or receiving bytes until told otherwise, from a specified channel or subchannel; locating the start of a specified slot within a specified channel and transmitting a specified preamble followed by a series of bytes of a data link packet passed to it; and detecting abnormal conditions and aborting its action with an appropriate status return code upon detection of such abnormal conditions.

In addition to these network service module services, the physical layer at the remote cell nodes also provides additional services. These services include returning operational status flags and counters upon request; returning a received signal as a digitized analog waveform; obtaining the IRS slots from the intermediate data terminal for every frame; generating the RNS and RNH slots to the network service modules for every frame; listening, at least for so long as required to conclude no packet is present, to all network service module to remote cell node slots in a prespecified set of channels, but not necessarily all channels, and making the ensuing packets available to higher layers; and receiving and passing on to a higher layer, all packets arriving in the IRH slot.

The physical layer at the intermediate data terminal also provides additional services. These services include returning operational status flags and counters upon request; returning a received signal as a digitized analog waveform; generating the IRS slot every frame; and listening to the RIQ slot in every channel, which has an RIQ slot, and passing on any received packets to higher layers.

Should alternative slot structures be defined for some channels, the remote cell node and intermediate data terminal physical layers should be aware of these and should be able to, generally: (a) receive or transmit in a particular slot on demand, (b) continuously listen to specified slots, and (c) transmit some fixed, or simply derived sequence, repeatedly in specified slots. This capability would thus support remote cell node-to-remote cell node and intermediate data terminal-to-intermediate data terminal interactions, except, perhaps for intermediate data terminal synchronization. It is not required that the remote cell node and intermediate data terminal physical layers be field reprogrammable in this regard, but rather that the above mentioned capabilities at some future time become part of their required operation.

High Level Physical Layer Synchronizatin Philosophy—IRS Slot

The synchronization (S) channel, illustrated in FIG. 18, is dedicated to the physical layer, and is used to achieve frequency, slot and time synchronization across the network. Intermediate data terminals maintain accurate frequency and time references and distribute reference signals to remote cell nodes, which in turn relay these to network service modules.

IDT-RCN Synchronization

Intermediate data terminals have accurate radio frequency and time clocks to which the rest of the network synchronizes. The primary vehicle for synchronization distribution is the synchronization (S) channel. Remote cell nodes receive synchronization messages from the IRS slot transmitted by the intermediate data terminals. Remote cell nodes in turn transmit synchronization messages to network service modules in the RNS and RNH slots.

The S channel IRS slot, illustrated in FIG. 19, is transmitted by intermediate data terminals to remote cell nodes and contains the following fields:

time synchronization and frequency reference patterns, 112 bits;

flag preceding the data packet, 8 bits;

a data packet containing time and frame information, 40 bits total, including 8 spare;

day-of-week, 0..6, 3 bits;

hour, 0..23, 5 bits;

minutes divided by 4, 0..14, 4 bits;

frame number, 0..15, 4 bits,—note that frame number also provides the least significant 2 bits of minutes, and indicates seconds as being either :00 or :30;

flags for today and tomorrow, indicating whether day light savings time is in effect; and CRC, 16 bits.

Every 30 seconds, intermediate data terminals perform an internal synchronization procedure which, since the synchronization procedure involves the use of the intermediate data terminals' RF receiver and transmitter, can be performed during RND/NRR slots. Ideally the synchronization procedure should occur just before the IRS slot in the S channel and, therefore the synchronization procedure is scheduled to occur during the first half of channel 28. Although time information could be delivered to remote cell nodes in some other fashion, since the frame number is needed and must also be protected, i.e., with a CRC, having at least as many data bits in the packet as there are bits in the CRC is not a drawback.

Remote cell nodes are able to search for and recognize the time synchronization and frequency reference patterns, to obtain frequency, frame and time synchronization. A remote cell node which is totally disoriented does not transmit; however, once in synchronization the remote cell node may be able to operate properly even if an occasional one or two IRS slots are missed. Special attention is given to ensure that the remote cell nodes synchronize their clocks with the IRS slot.

IDT-IDT Synchronization

Maintaining synchronization among intermediate data terminals is a significant problem. The framing structure initially provides a special subchannel dedicated to support this endeavor. In the case of paired RF channels, intermediate data terminals can synchronize using the master RF channel while remote cell nodes and network service modules use the other RF channel. Subchannel IIS.0.0000, i.e., a 1/16 subchannel of channel 0 on the IDT-to-IDT link, illustrated in FIG. 20, can be used to synchronize all intermediate data terminals relative a designated master intermediate data terminal. Another slot or another subchannel may be required if some intermediate data terminals have to relay this synchronization on to those intermediate data terminals which cannot hear the master intermediate data terminal. The IIS slot is similar to the IRS slot.

NSM Synchronization—RNS Slot

The RNS slot of the S channel is intended to be a large, easily recognized start of frame marker which network service modules can find without much effort. Once located, the RNS slot provides both a radio frequency reference and subsecond time synchronization to the start of frame.

The RNS slot is used for two purposes. The first is to provide a frame synchronization pattern which is easy to find, easy to recognize, and not easily confused by normal data packets. The second is to provide a frequency reference. To achieve the first objective, the slot is as large as possible and is filled, illustrated in FIGS. 21-22, with a repeated series of 46 of the following 18-bit RNS fields:

a synchronization pattern (011111111110) which is an easy pattern to recognize and doubles as a frequency reference, e.g., 12 bits;

a count of the number of RNS fields remaining up to the RNH slot (6); and a final field just before the RNH slot, containing:

22 1's used to verify frequency sync; and a 4-bit RNS closing flag, or RNH opening flag.

The RNS slot fields need not be CRC protected. The synchronization is fixed, and successive count fields are sequential values and are inherently redundant.

Network service modules obtain synchronization from the RNS slot under two different circumstances. The first arises when the network service module needs to re-synchronize before receiving or transmitting, but while the network service module is still reasonably in synchronization with the network. In this case, the network service module pops up more-or-less where the RNS slot is located, and begins its search from there. The expectation is that the RNS slot is located within the first or second probe. The second circumstance when synchronization is necessary is when the network service module is totally lost and needs to find synchronization. In this circumstance, the network service module begins its search at an arbitrary point in time. Regardless of the circumstances, once the network service module begins its search for the RNS slot, the network service module follows the same steps, specifically: (a) the network service module listens, or probes, for a while to see if the network service module hears the synchronization pattern; (b) if no, the network service module turns off the network service module receiver, waits and then tries again; (c) when the pattern is found, the network service module scans the pattern and receives the count to the start of RNH field, with the count being in units of RNS fields; (d) the network service module may then either check the next count field to confirm synchronization, or may simply delay until the start of the RNH field; and (e) receive the RNH field.

Time Distribution to NSM-RNH Slot

The RNH slot in the S channel, illustrated in FIG. 23, is used by the remote cell nodes to deliver frame identification and current time of day to the network service modules. The RNH slot contains time, frame and protocol information passed from the remote cell node to the network service modules, and includes:

day-of-week, 0..6, 3 bits;

hour, 0..23, 5 bits;

minutes divided by 4, 0..14, 4 bits—note that frame number also provides the least significant 2 bits of minutes, and indicates seconds as being either :00 or :30;

frame number, 0..15, 4 bits;

day-light savings time flags, today, tomorrow, 2 bits total;

active CAT ID, 0..3, 2 bits,—four channel allocation tables may be defined at any one time, but only one can be active at any given time. If network service modules can record their entries from more than one of these tables, then the wide area communications network can instantly, or at least on a frame boundary, switch to another table that may be set up to handle certain exceptional circumstances which may appear quickly and last for a short while; these circumstances may require a sudden redistribution of bandwidth to allow an impending surge of messages, e.g., alarms, to get through. Not all network service modules need to maintain four CAT entries; for those which can only handle one, when the system shifts to another table, that network service module is not allowed to transmit or receive. Alternatively, there may be some commonality between the tables such that the "dumber" network service modules go on as usual; or, for example, channels 0-15 may only have one CAT entry while channels 15-28 may have dual entries, with the "dumber" network service modules being limited to using only channels 0-15.

CAT version sequence number, 0..15, 4 bits,—this field tells the network service module when the channel assignments have changed and a new CAT entry is obtained;

spare bits reserved for future definition, e.g., 8 bits; and CRC, e.g., 16 bits.

The fields included in the RNH slot have been chosen to minimize total network service module receive time. Since the network service module must periodically look for frame and frequency synchronization, it might as well pick up time information at the same time rather than going to a separate subchannel to pick it up. The CAT version number field allows the network service module to obtain its CAT entry only when necessary, rather than periodically picking it up.

Data Link Layer Definition

The intermediate data terminal-remote cell node data link is more conventional than the remote cell node-network service module link. The data link layer is typically concerned with the encapsulating of network layer messages into packets, and the reliable transfer of packets across a physical link with the necessary synchronization, error and flow control. Data link protocols are generally concerned with the use of a single physical link directly connecting two network nodes.

RCN-NSM Link

The wide area communications network data link layer does not require or support many of the capabilities found in more conventional communications networks. The link is connectionless. Alternatively, one may consider all connections as being fixed and permanent. Either way, a requirement does not exist for opening/closing connections dynamically. Network service modules are not polled, since they transmit autonomously. Message delivery is not guaranteed, although most are transmitted more than once to improve the chance of success. Individual packets are not acknowledged, although higher layers may obtain direct or indirect confirmation of reception. The data link layer does not ensure received packets are provided to the higher layers in the same order as transmitted, although higher layer messages are either self-contained or explicitly numbered if broken up into multiple packets. Flow control generally does not exist between individual network service modules and remote cell nodes. Network service modules normally only generate a handful of messages per day, and receive messages even less often.

The data link layer does perform data link address recognition, including global broadcasts. It also provides error control by including, in all packets, a CRC check field that is verified upon reception. Packets failing CRC verification are usually counted and discarded. Remote cell nodes also provide the option of capturing a packet as a digitized analog signal.

IDT-RCN Link

The intermediate data terminal—remote cell node link is a more conventional master/slave polled access link or, in HDLC parlance, an unbalanced normal response mode. As master, the intermediate date terminal is responsible for protocol integrity; initiating all dialogues, determining when retransmission, in either direction, is necessary, and taking corrective actions when the dialogue gets out of synchronization. Data link address recognition and CRC error detection are conventional. Packets sequence numbers; acknowledgements, by returning the sequence number of the last packet successfully received; and packet retransmission are employed. Separate sequence numbers are used for individually addressed and broadcast streams of packets. Flow control is exercised inasmuch as each packet must be acknowledged before the next one can be sent, except for intermediate data terminal to remote cell node broadcasts and RIQs.

Since confirming that all remote cell nodes have received a broadcast can take a relative long period of time, several packets may be sent before requiring acknowledgement; this may be by sliding window, selective reject ARQ protocol. The global nature of such broadcasts requires that the CDT be responsible for coordinating the IDTs to ensure that all transmit in unison, and for determining when retransmission is necessary.

A remote cell node can asynchronously send a packet on the RIQ link, like HDLC's unbalanced asynchronous response mode or ARM, requesting that the remote cell node be polled.

Data Link Layer Definition

Several terms are used to define the data link layer and are defined herein.

Flow Control: Flow control is a technique for assuring that a transmitting station does not overwhelm a receiving station with data.

Stop-and-Wait Flow Control: Stop-and-wait flow control is a technique than prevents a source node from transmitting another packet until the destination node has acknowledged the current packet.

Sliding-Window Flow Control: Under sliding-window flow control, each packet is labeled with a k-bit sequence number, and up to $n=2^k-1$ packets may be transmitted before the source node must stop and wait for acknowledgement. The destination node acknowledges one or more packets by sending to the source node a packet indicating the sequence number the destination node expects to receive next.

Error Control: Error control refers to the mechanisms for detecting and correcting errors that occur in the transmission of packets. Packets may be lost when interfering circumstances affect the destination node to the extent that the destination node is not aware that a packet has been transmitted. A damaged packet is one which is received but has bits in error. These mechanisms are referred to as automatic repeat request (ARQ), and the following error control techniques are commonly employed:

Error Detection: typically a CRC is used.

Positive Acknowledgement: receiver sends back an ACK for successfully received, error free packets.

Retransmission after timeout: source node retransmits a packet that has not been acknowledged after a predetermined amount of time.

Negative Acknowledgement: destination node sends back a NAK for packets in which an error is detected; on broadcast links, node can only NAK when next successfully received packet indicates that one or more intervening ones were not received.

Stop-and-Wait ARQ: Stop-and-wait ARQ is based on stop-and-wait flow control. The destination node sends back ACK or NAK for each packet received, and the source node must use timeout in case either original packet or acknowledgement of the original packet is lost. Packets are sequence numbered, typically 1-bit minimum, in case the source retransmits due to lost ACK. When this technique is adapted to sliding-window flow control, the technique is referred to as continuous ARQ.

Go-back-N ARQ: Go-back-N ARQ is a continuous ARQ variant based on sliding-window flow control. If multiple packets are transmitted, and one is lost, i.e., source node times out waiting for ACK/NAK, or is damaged, i.e., destination node sends back a NAK, then that packet and all those which came after it are retransmitted. If an ACK is lost or damaged, but a subsequent ACK is sent before the source node times out, then the later ACK is cumulative and no retransmissions are required. Packets must be sequence numbered, and up to $n=2^k-1$ ACKs may be outstanding.

Selective-reject ARQ: Using selective-reject ARQ, the only frames retransmitted are those that receive a NAK or which time out. Both source and destination nodes are more complex as they must be able to store and handle packets out of sequence. The destination node uses sequence numbers no determine if a packet has been lost, and can go on receiving subsequent packets. A window size of $n \leq 2^{k-1}$ is required to ensure there is no overlap between source and destination windows.

Attaining Reliable Data TranSport Over the RCN-NSM Links

A data link with contention multiple access and packet error detection, but never any acknowledgements, relies on other techniques to attain a high probability of message delivery.

Packet radio transmissions occasionally are subject to loss or corruption due to noise, interference or collisions. Network nodes which fail their built-in self-test stop radio transmission. The system performs error control at several levels of abstraction.

Error Detection and Correction

Received signals match particular physical synchronization patterns which prefix the message before being considered as packets, thus filtering out noise and some corrupted messages. Bit patterns used to create the frame/channel structure also are selected to prevent misinterpretation, either due to noise or because some part of a legitimate message looks the same. In general, a two level scheme may be employed where two patterns, separated by a fixed time interval, match. All packets are further protected by encoding them using a cyclic code, 16-bit CRC, which affords a degree of information redundancy. Although not required, an error correcting code can be used to recover from certain types of error, e.g., to achieve single error correction with a Hamming code. Single error correction could also be achieved with just the CRC, at considerable computational cost, using a brute force search method.

Path Redundancy and Collision Avoidance

Another form of redundancy exists in the system, namely multipath redundancy. On the NRR link, several remote cell nodes potentially may be able to hear the same network service module's transmission, and since different propagation paths are taken, and in the case of collisions, different capture ratios will exist, some of the remote cell nodes may successfully receive the message. On the RND link, several remote cell nodes are transmitting simultaneously, thus a temporarily blocked path between a particular network service module and remote cell node need not prevent the network service module from hearing the message from another remote cell node. In the case of packet collisions on contention access links, e.g., NRR and RIQ, random temporal distribution algorithms tend to spread messages over time to help avoid such collisions, and the stronger of the two colliding messages may in fact be received correctly due to the capture effect.

Message Redundancy and Self-sufficiency

Figure 24:
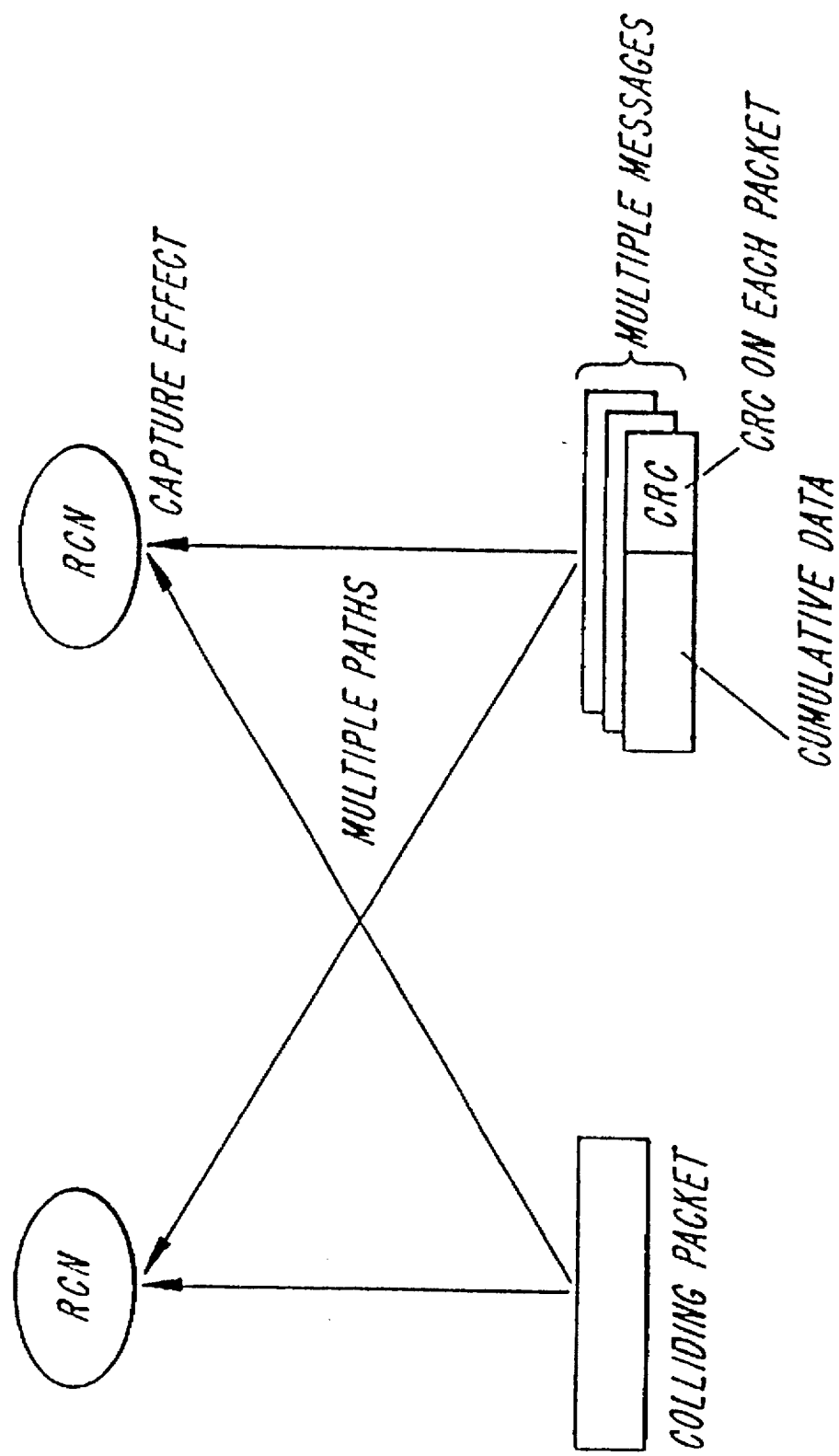
FIG. 24 illustrates various forms of redundancy.

The application layer for AMR services employs message redundancy as another measure to help ensure the reliable transport of data. FIG. 24 illustrates various forms of redundancy. Most data are reported several times over an extended time period, and are reported in a cumulative fashion to further reduce the impact of any lost messages. Downstream commands to network service modules are also repeated multiple times. These commands are generally absolute in nature; commands which "toggle" a network service module parameter are avoided.

General Data Link Packet Structure

The design of data link packets used on the links within the wide area communications network is loosely modeled on the HDLC standard. A primary consideration is efficient usage of the relatively low data rate channels, i.e., small time slots.

FIG. 25 depicts the structure of a well-known standard data link packet, the HDLC frame format. Using this structure, flag fields demark the start and end of the packet, and implicitly define the length of the variable length information field. The source or destination address is specified in an expanding, in byte units, address field. An 8-bit, or 16-bit, if larger sequence numbers are desired, control field identifies the type of the packet, e.g., information, supervisory or unnumbered, and contains send and receive sequence numbers. Several kinds of supervisory functions are defined to manage flow control and request packet retransmissions. The unnumbered type packets are used to negotiate operational modes and carry other sorts of data link related status. The structure is designed for a bi-directional point-to-point connection where all packets are acknowledged and where a station may have multiple transmitted packets with acknowledgements outstanding.

Each of the various wide area communications network links has a data link packet structure which is loosely modeled on the HDLC format, but optimized to the special needs and purposes of the particular link. When designing data link packets generally, a physical layer preamble precedes the packet; this preamble is required to recognize the start of a slot. The bit values of a received preamble may or may not be made available, and packets end at the final bit of the CRC. However, the physical layer requires that a transmitter transmit at least one bit having an arbitrary value after the final bit of the CRC. A flag pattern marks the start of a data link packet. This flag pattern is considered part of the data link packet, but the physical layer also uses the flag pattern to recognize the start of the slot and then makes this field available to the data link layer.

When designing data link packets of a specific type, packets except for IRD and RIR are a fixed length, and packets sizes are byte multiples, except RND and RNC. An IRD link packet is special in that it is always paired with the previous IRH packet, as shown in FIG. 26. RND link packets are special in that their structure depends on CAT subchannel assignment. Additionally, each link has associated with it an intrinsic form of addressing: NRR, RIR and RIQ packets contain source node address fields; IRH packets contain destination node address fields which may be broadcast address; IRD packets implicitly refer to the same destination address as the prior IRH packet; RND addressing depends on subchannel use designated by the CAT; and RNC is implicitly a broadcast-only link. Finally, the data link layer shares a control field with the network layer, all packets are protected by a 16-bit CRC check field, and cardinal numbers are transmitted most significant byte and, bit within byte, first. FIGS. 27-30 illustrate RIR date link packet structure, IRH data link packet structure, NRR data link packet structure, and RIQ data link packet structure, respectively.

Data Link Packet Structure—RND and BNC Links

The RND link is used to deliver commands and operating tables to network service modules. Various methods of delivery and addressing are employed, and each has its own data link packet structure. The CAT designates what types of application messages can be carried in a particular subchannel, and indirectly specifies the data link packet format; all packets sent in than subchannel must have the same method of delivery, and hence the same structure.

The wide area communications network data link layer uses three delivery mechanisms for messages on the RND link. The first, broadcast to class address, is used for messages which are supposed to be received by all network service modules belonging to a particular class, usually based on network service module type. FIG. 31 illustrates an RND broadcast to class address data link packet structure. The second, broadcast to individual address, is used for messages intended for one individual network service module; the message is periodically transmitted and the network service module is expected to eventually hear the message. The third, reverse poll, is also used for messages intended for one individual network service module, but a message is not transmitted until the network service module sends a message explicitly requesting the reverse poll. FIG. 32 illustrates an RED broadcast to individual address and reverse poll data link packet structure. One delivery mechanism is used on any particular subchannel, and a network service module listening to that subchannel knows which mechanism is being used.

Generally the data link layer address on a data link packet also is considered to be the network layer address for the network message carried in the data link packet. However, this does not preclude the network layer from having an explicit network layer address subfield of the network message field as well. In fact, tiered addressing, for load management network service modules, is supported in this fashion, with the data link layer employing broadcast to class address for these messages, and the network layer having additional address fields.

RNC Link

The RNC and RIQ links share a common slot in every data channel. The intermediate data terminal can issue a special application control command, in an IRH packet, which is echoed by the remote cell nodes in the immediately following RNC/RIQ slot. FIG. 33 illustrates an RNC broadcast special application control data link packet structure.

Operational Measurements

Data link layer modules keep account of normal and exception data link events. These statistics are used for system tuning and fault diagnosis.

Each layer of the communications network, at each node, collects a statistical summary of network operation. These quantities help the network manager decide if the system is operating properly, determine values for tunable parameters, and locate the cause of failures. Statistics kept include:

number of packets transmitted number of packet retransmissions number of packets received with valid CRCs number of packets with CRC errors number of protocol violations Additionally, higher layers can ask the data link layer to relay packets with CRC errors or packets introduced with a bad preamble along with CRC validated packets, in decoded binary form, or for any packet as a digitized analog signal.

Interactions with Network and Physical Layers

Figure 34:
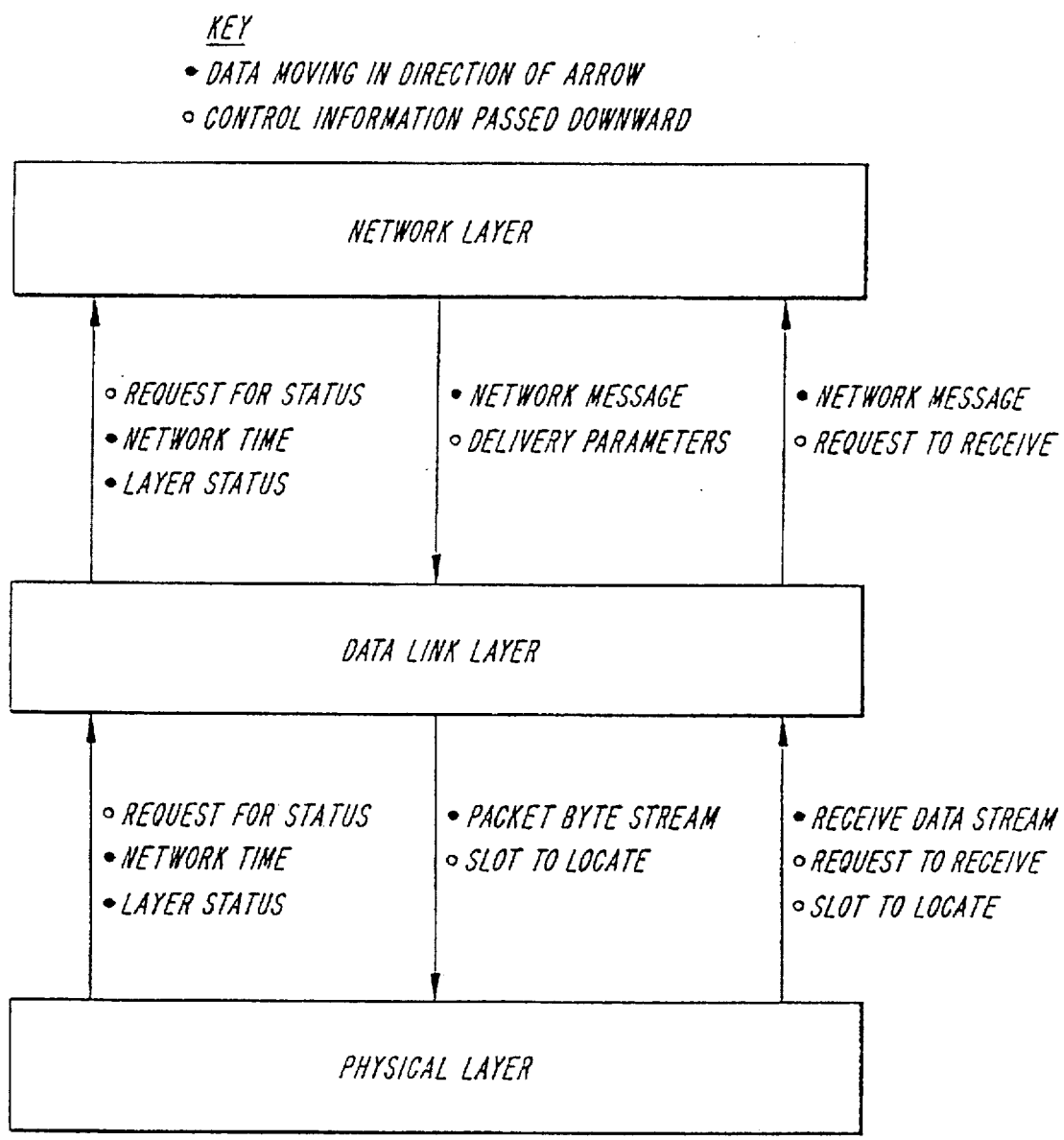
FIG. 34 shows interactions with network and physical layers.

The data link layer 97 of FIG. 34 uses the services of the physical layer 98 while providing services to the network layer 96. The physical layer 98 services used include waiting for the beginning of a particular slot of a particular channel or subchannel; selecting frequency; transmitting a stream of bytes; receiving a stream of raw decoded data bytes; receiving a stream of digitized samples of the analog signal, along with decoded values; aborting an operation in progress; obtaining an accurate value for current time; obtaining physical layer status and operational measurements; and explicity requesting that the physical layer synchronize with network.

Services provided to the network layer 96 include encapsulating a network message in a packet and transmitting the network message in a particular slot; receiving packets from pre-specified sloes, verifying CRCs, extracting and buffering the network message fields, and returning them upon request; returning current time; and returning status and operational measurements, including those from the physical layer 98.

Overview of the Network Layer

The network layer in the OSI model has the responsibility for message delivery from source to destination across a single network, possibly passing through one or more intermediate network nodes. The network layer 96, illustrated in FIG. 34, of the wide area communications network performs several functions not found in conventional communication networks.

The purpose of the network layer 96 is to provide a generalized communication mechanism to support application layer requirements. Control of the entire network is considered to reside in the network layer. As claimed by the present invention, the network layer 96 encompasses end-to-end transport issues associated with OSI transport and network layers. The network layer 96 isolates higher layers from the data transmission and switching technologies used to establish, maintain and terminate end-to-end connections between systems, which may include a number of data link connections in tandem if the systems are not directly connected. The network layer 96 provides a message delivery service to higher layers and also carries application layer messages.

The wide area communications network is designed to primarily support connectionless data communication on a hierarchical network architecture. With this design goal in mind, the network layer functions may be considered to provide:

node addressing routing strategy for polling remote cell nodes by intermediate data terminals packet format, related to network control packet priority—message delay related channel allocation table (CAT)—message throughput related upstream message (report) delivery downstream message, e.g., command delivery
        broadcast to class or tier address
        broadcast to individual address
        reverse poll eavesdropping, a form of redundant message reduction network control, downloads to remote cell nodes operational measurements Since message sizes are quite small, in order to maximize the amount of information which is carried, network, data link, and in some cases even application layer message fields are sometimes shared across layers, rather than including a strict encapsulation of higher layer messages within lower layer packets/frames. Indeed, at times it appears that lower layer fields are visible to higher layer entities.

Addressing Within the Wide Area Communications Network

Network nodes within the wide area communications network have unique network addresses, but each type of node has a separate address space. A node's identification (ID) serves as the node's network, data link and physical layer address. In some circumstances, a node may have a different application layer identification known only at the central data terminal, or the node may have a second class or tier address to which the node responds.

Individual Node Addresses

Addresses can be considered data link addresses relative to the links used, i.e., NSM addresses on NRR/RND links, and RCN addresses on IRD/RIR. links, but may also be considered as network addresses as there are no individual physical point-to-point links between nodes. Nodes are uniquely identified with binary integer addresses. FIG. 35 summarizes the address space for each node type. FIG. 36 is an example of tier address specification and selected/non-selected network service modules. Address space size is considerably larger than any network conceivable. Network service module addresses need only be unique within each network service module type, thus if an 8-bit field specifies NSM type, then the NSM address space is potentially 256 times that shown in FIG. 35.

Upstream messages are implicitly marked for delivery to the central data terminal, whereupon they are redirected to appropriate application processes on the basis of content, i.e. NSM and message type, primarily. Generally, downstream messages contain only destination addresses, upstream messages only source addresses. Remote cell nodes accept messages from network service modules that they hear. When polled, remote cell nodes relay upstream messages to anonymous intermediate data terminals, but intermediate data terminals hearing a remote cell node's response, or an RIQ, first identify the source remote cell node as being one under their control. Each intermediate data terminal may also have another address associated with the IDT-CDT network.

Broadcast Addressing

Several variations of broadcast addressing are employed. Due to the broadcast nature of the radio medium, messages are broadcast, even if there is only one intended recipient. For remote cell nodes, and intermediate data terminals should they exist on a multicast medium, the all 1's address is reserved to indicate a broadcast to all. The set of remote cell nodes to which such broadcasts apply depends on which intermediate data terminals transmit the message. If all intermediate data terminals broadcast the message simultaneously, then all remote cell nodes have the opportunity to hear the message. If only a single intermediate data terminal transmits, then the message may be considered to be directed to only those remote cell nodes within hearing range of that intermediate data terminal. The contents of a message may be defined so as to further restrict the message to a particular group of remote cell nodes.

For network service modules, broadcast addressing arises in several different circumstances, and is handled differently for each. Some information is intended for all network service modules, and is identified only by the slot/subchannel the information occupies; no address is specified. Some information is intended for only one type of network service module. The information may be identified either by subchannel only or by using the network service module type as the address. Some information is intended for only one network service module, and network service module type and address are required; alternatively, type may be omitted if implied by subchannel. Finally, some information is intended only for a subset, or tier, of the network service modules of a particular type. In this case, all network service modules which recognize a tiered address have, in addition to their normal ID, a 24-bit tier address assigned to them. A tiered address, on a transmitted packet, includes two parts, the first is a 24-bit pattern and the second is a 24-bit mask selecting which of the pattern bits must match corresponding bits of a network service module's assigned tier address for that network service module to be addressed. The type of network service module addressing employed is predetermined for each type of message delivered, and network service modules know this. Within a given subchannel, only one NSM addressing mechanism is used.

Routing Within the Wide Area Communications Network

Message routing in a hierarchical network is straightforward considering that all routes are direct. But the multicast nature of downstream delivery introduces another level of network wide synchronization, namely that between the intermediate data terminals or that between the remote cell nodes. Reverse poll delivery to network service modules is a type of network traffic which requires the making of significant routing decisions.

In the upstream direction, network service modules transmit to no remote cell nodes in particular, and any remote cell nodes hearing the message relays it to any intermediate data terminal which polls it, and the intermediate data terminal will relay it to the central data terminal when polled. In this regard, the only decision to be made is which intermediate data terminal should poll any given remote cell node.

In the downstream direction, messages destined for an individual intermediate data terminal or remote cell node have a direct path from the central data terminal, assuming each remote cell node is assigned to a single intermediate data terminal. Broadcast messages directed towards remote cell nodes would be transmitted in unison by all intermediate data terminals. One fundamental concept permeating the entire design is that downstream communication is performed mostly by several network nodes transmitting the same information in unison. One consequence of this involves intermediate data terminals broadcasting to remote cell nodes. Since the central data terminal-to-intermediate data terminal link most likely is not a multicast medium, the central data terminal is not able to talk to all intermediate data terminals simultaneously. Therefore, as the central data terminal talks to each intermediate data terminal separately, the central data terminal schedules the intermediate data terminals to begin their broadcasts to remote cell nodes at a common future time. Intermediate data terminals similarly schedule remote cell nodes, since all remote cell nodes transmit in unison most messages destined for network service modules.

The opportunity to make any real routing decisions comes with reverse poll delivered messages. Such messages are downloaded to only those remote cell nodes, say up to four, likely to hear the reverse poll of the target network service module. Compared to having all messages go to all remote cell nodes, remote cell node memory requirements are reduced and message throughput is increased when network service module reverse poll messages are delivered to individual remote cell nodes, but at the expense of performing this delivery to each candidate relay remote cell node separately. The routing table, at the central data terminal, is also an expense, in that for each network service module it becomes necessary to record which remote cell nodes normally hear the routing table.

The complete route includes:

Central data terminal—source of delivery

Intermediate data terminal(s)—which are in charge of the remote cell nodes best able to execute final delivery Remote cell node(s)—which normally hear the target network service module, and are chosen to perform final delivery Network service module—target of delivery For the route to be effective, some sort of reciprocity should exist between a network service module and the remote cell nodes which hear it, as a remote cell node can deliver a reverse poll message only if it hears the network service module's reverse poll.

One possible alternative to individualized delivery of reverse poll messages to remote cell nodes is to broadcast all messages to all remote cell nodes. A second alternative would require than each remote cell node keep a list of the network service modules the remote cell node normally hears, and although all reverse poll messages would be broadcast to all remote cell nodes, only those remote cell nodes which hear from a target network service module would store the message for delivery later. For low traffic systems, all messages could be broadcast to all remote cell nodes.

Still another approach might be to correlate network service module visibility to intermediate data terminals which poll those remote cell nodes which hear the network service module. In this way, the central data terminal would route the reverse poll messages only to the intermediate data terminal(s) associated with the target network service module, and only the remote cell nodes which can hear that intermediate data terminal would get the NSM message. It may now be beneficial to consider letting the remote cell nodes know which intermediate data terminal they are talking to so that those remote cell nodes which can hear an intermediate data terminal, but which are not polled by the intermediate data terminal, know not to act on the download. The argument against telling remote cell nodes which intermediate data terminal is polling, is that if an intermediate data terminal fails, other intermediate data terminals can take over its remote cell nodes without the remote cell nodes being aware, other than perhaps noting a sequence number discontinuity. However, intermediate data terminals could be set up to "impersonate" the failed intermediate data terminal. The best apparent compromise is to have intermediate data terminals give their IDs to remote cell nodes under their charge so that downloads could be targeted to only those RCNs belonging to a particular intermediate data terminal. The intermediate data terminal ID would only be used to initially configure or re-configure a remote cell node and for specific types of downloads, such as reverse poll messages.

RCN Polling Strategy Used by IDTs

The remote cell node polling strategy used by the intermediate data terminals includes the order in which an intermediate data terminal polls its remote cell nodes, the way the intermediate data terminal reacts to RIQs, the manner in which downloads and polls for status are interspersed with polls for messages, and the coordination of adjacent intermediate data terminals so that only one uses the RF channel at a time.

The intermediate data terminal polls its remote cell nodes according to a set of rules designed to guarantee minimum polling raze for individual remote cell nodes; dynamically adjust attention proportional to need; respond to RIQs in a timely manner; provide appropriate attention to μRTUs; apportion the half-duplex links (IRD & RIR) appropriately; and periodically collect remote cell node (μRTU) status reports. To expand upon the need to dynamically adjust attention proportional to need, if one remote cell node has 20 messages and another has 200, clearly the latter should be polled more frequently, until both remote cell nodes have similar buffer sizes. Similar concerns arise in the context of high priority messages.

An objective of the system is to be able to have intermediate data terminals in different parts of the network poll their remote cell nodes concurrently. If intermediate data terminals are near each other, or if a remote cell node is within range of multiple intermediate data terminals, then the polling strategy also provides for methods which avoid concurrent polls/responses from interfering with each other. One approach is no allow intermediate data terminals access to the IR link in only centrally assigned channels. Another approach involves the use of directional antennae at the intermediate data terminal, with auto-configuration providing information as to which antenna to use for each remote cell node. A third approach gives the central data terminal complete control over all intermediate data terminal operations. All approaches have ramifications on the polling strategy employed.

Alternative approaches to the remote cell node polling problem include having the central data terminal construct and deliver polling schedules no all intermediate data terminals. Under this alternative, intermediate data terminals are not permitted to deviate from the schedule, but inform the central dana terminal of all pertinent polling status, including RIQs, and the central data terminal periodically adjusts the polling schedules accordingly. The polling schedules are designed to accommodate incremental updates, and hence avoid wholesale redistribution for every. little change.

A second alternative requires. that the central data terminal instruct intermediate data terminals as to which channels each can use and when, avoiding co-channel interference both during the intermediate data terminals' polls/ downloads and during the RCNs' responses. Under this alternative, the intermediate data terminals make all other decisions as no which remote cell node no poll and when no poll that remote cell node. Simultaneous broadcasts from all intermediate data terminals to all remote cell nodes would still be under direct control of the central data terminal.

Delivery of Broadcast Messages to NSMs

Under a broadcast message delivery strategy, remote cell nodes repeatedly transmit lists of messages, and network service modules periodically listen to see if any of those messages are for them. This method is used when messages are delivered to multiple network service modules at the same time, or when messages are delivered with minimal delay. FIG. 37 lists common fields of broadcast messages.

Broadcast to Class Address

Broadcasting to class addresses delivers the same information to a large group of network service modules. FIG. 38 illustrates an example of time of use timetable and schedule broadcast to class address. The method is used both for small-sized commands requiring rapid reception, and large amounts of relatively static or slowly changing information; as an example of the latter, network service modules may take up to a week to acquire updated information. Delivery delay is a function of the circulation period and how often network service modules listen to the remote cell node.

FIG. 37 lists the kinds of fields that comprise such messages. The actual message formats may vary from one message type to another, and network service modules know the structures of all message types that they intend to receive. Remote cell nodes repeatedly circulate a series of such messages in consecutive slots of a subchannel designated for that purpose. Generally, each message applies to only one type of network service module, and so one unique subchannel is assigned to each network service module type and only messages pertaining to the same network service module type appear in than subchannel. In this case, the same message type codes may be used for different types of messages appearing in different subchannels. This does not preclude having a single subchannel carry messages for multiple network service module types, however the message type codes used must be unambiguous, or the network service module type is included as part of the message. The message type field itself may be omitted if it is the only type carried in the subchannel. The number of different subchannels required is anticipated to be small, and the number of messages in each list also is anticipated to be small. Small sized subchannels can be used.

Any particular message may have additional content fields that further restrict the delivery to a specific subset of recipient network service modules. The network service modules of the specified type receive such messages, but only those satisfying the selection criteria actually accept delivery and act upon the message. In this fashion, tiered addressing is a specialization of the general category of broadcast to class addressing.

Broadcast to Individual Address

Broadcasting to individual addresses delivers single packet messages to individual network service modules, and for accomplishing this with minimal delay, i.e., under 15 minutes 90% of the time. This is another specialization of the general broadcast delivery mechanism. All messages contain the address, and possibly the network service module type, of a single destination network service module. The list of messages circulated in a subchannel may be sorted by address to permit a network service module to exit early from a futile search. The number of subchannels required is expected to be small, but lists may be quite long so larger size subchannels may be necessary. A particular message would only circulate for a limited length of time, long enough to give a dedicated listener several opportunities to hear it. To achieve minimal delivery delay, target network service modules must listen often, or perhaps continuously, to the subchannel. FIG. 39A and 39B illustrates an example of service reconnect broadcast to individual address.

Delivery of NSM Broadcast Messages to RCNS

Batches of messages destined for network service modules via broadcast delivery are delivered to all remote cell nodes along with parameters specifying when to begin and how long to transmit the messages so that all remote cell nodes operate in a coordinated fashion.

Distribution of network service module broadcast messages to remote cell nodes should achieve the following objectives:

1) the broadcast delivery mechanism should be capable of delivering some messages with relatively short delay from time of original dispatch at the central data terminal;
2) messages have a finite life time during which they are transmitted a certain number of times;
3) message life times range from minutes to weeks;
4) remote cell nodes circulate lists of messages;
5) messages may be added to or removed from the list, or new entries may replace current ones, at arbitrary times; while it is possible to have all messages expire at the same time, this is not required and, since the new list may have many messages in common with the old one, it would be desirable to avoid downloading the entire list for every change;
6) all remote cell nodes should broadcast the same messages at the same time and, when the set of messages changes, having some remote cell nodes broadcast the old set while others broadcast the new set must be avoided.

Although the fifth objective may be satisfied by allowing lists to grow and shrink in size as required, circulating the list as often as possible, such an approach would make attaining the sixth objective quite difficult. One way to satisfy the sixth objective is illustrated as Algorithm A. Algorithm A takes a variable length of time, perhaps minutes, to confirm that all remote cell nodes have received the changes to the network service module broadcast list. If fixed length lists are tolerable, then the simpler distribution strategy shown as Algorithm B can be used. A fixed number of slots are used to circulate the list of messages; slots can be empty. Each network service module message is transmitted by the remote cell nodes only within an explicitly specified time interval. The central data terminal is responsible for keeping track of when slots become available for new messages. The central data terminal may choose to divide the list into equal sized blocks, batch up network service module messages, and then dispatch them one block at a time at regular intervals. For example, considering that there are six RND slots per minute in a full channel, a list of 48 messages can be transmitted in eight minutes. If the list is divided into four blocks of twelve messages, and each block has a 32-minute life span, the central data terminal could stagger the start of each block by eight minutes so that it feeds the network twelve new messages every eight minutes, but all messages still are circulated for the full 32 minutes. At this rate, the central data terminal can transfer 2,160 messages over the course of an entire day. However, keeping messages sorted by destination address would be difficult, if even possible. Message delivery rates and life spans can be varied dynamically by the central data terminal, but changes to list size requires the same degree of coordination as Algorithm A. Maximum list length is constrained by remote cell node memory size.

Algorithm A i. intermediate data terminals broadcast changes to all remote cell nodes, perhaps multiple times, along with switch-over time ii. remote cell nodes hearing the broadcast continue transmitting the old list until switch-over time iii. intermediate data terminals confirm that each RCN has heard the broadcast; re-deliver if necessary iv. remote cell nodes still transmitting after switch-over time stop immediately upon hearing broadcast v. once all remote cell nodes confirm receipt, as determined by central data terminal, intermediate data terminals broadcast switch-over command vi. if a remote cell node hears the switch-over command before the switch-over time, it switches from old to new list at the switch-over time without any interruption of delivery vii. if a remote cell node does not hear the switch-over command by the time of switch-over, it stops transmitting list at the switch-over time viii. if a remote cell node only hears the switch-over command after the switch-over time, it starts transmitting the new list, but must begin at the point in the list where it would have been if it had begun at the switch-over time ix. intermediate data terminals confirm that all remote cell nodes have heard the switch-over command; re-deliver if necessary.

Algorithm B i. intermediate data terminals broadcast to all remote cell nodes the NSM message list, or portion thereof, along with start of broadcast and total life times; start time follows or coincides with end of life of previous contents ii. remote cell nodes hearing the broadcast begin and end transmission at specified times iii. remote cell nodes not hearing the broadcast go silent at end of current list life iv. intermediate data terminals confirm that each remote cell node has heard the broadcast; re-deliver if necessary v. if remote cell node only hears broadcast after start time, it begins transmitting the new list at the point in the list where it would have been if it had started on time.

In general, since all remote cell nodes must broadcast in unison, some or all of the following parameters will accompany each NSM message handed to the remote cell node for final delivery:

subchannel in which to deliver message;

when to transmit for the first time, required by both algorithms;

message expiration time, for Algorithm B—a special code could be defined to indicate that the message be circulated indefinitely, e.g., TOU timetables, however this can only work if some mechanism similar to Algorithm A exists to eventually replace such messages;

position in list, Algorithm B;

ordering criteria, Algorithm A—messages could be sorted by NSM address.

Delivery of Reverse Poll Messages to NSMs

The reverse poll method is intended for the delivery of messages for which fast delivery is not required. It is designed to conserve energy at both the network service module and the remote cell node, while using channel bandwidth more efficiently that the broadcast to individual address delivery mechanism. The circulation of long lists of addressable messages is avoided at the expense of storing messages at the remote cell node end delaying delivery until the network service module polls the remote cell node, which may be hours or even days. In general, when an network service module transmits a report, the network service module has the option of asking the remote cell node if there are any messages for the network service module.

Delivery of reverse poll messages is illustrated in FIG. 40. Each network service module which can potentially receive a command via reverse poll delivery has a polling schedule, e.g., once every ten reports, so that periodically one of the network service modules report packets requests a reverse poll. If a remote cell node which receives this report has a command for that network service module, based on NSM type and address, then the remote cell node transmits the command at a mutually agreed upon future time. The network service module listens at that time. Both the network service module and the remote cell node compute the delivery time using a common hashing function which can be based on NSM address, time of the original report, slot used for the original report, and/or an arbitrary field in the report. The delay until delivery should be long enough to permit a battery-powered network service module to recharge; for line-powered network service modules, the minimal delay could be shorter. The delay is a relatively easy to compute function, and the command is delivered in a specific subchannel. The network service module knows which subchannel based on its CAT entry, while the remote cell node is explicitly told by the central data terminal; the delivery subchannels are bundled with the commands downloaded to the remote cell node. In the event of a hashing collision, which occurs when two or more reverse poll messages happen to be scheduled for delivery in the same slot, either one message can be picked and delivered, or one message can be delivered in the selected slot and the second one can be delivered in the next successive slot in the same subchannel. Collisions of an order greater than two are expected to be extremely rare. A network service module hearing someone else's command could then listen in the next slot. In either case, priority, i.e., whether to be the first or the only delivery, should be given to battery-powered network service modules.

Possible alternatives and/or additions to the above scheme include removing a specific message from the remote cell node's list once the remote cell node has delivered that message n times; removing any messages a remote cell node may have for a specific network service module if the remote cell node has non been contacted by that network service module in any way for m hours; giving every message an expiration time regardless of the number of times in has been transmitted or whether there has been contact from the network service module; giving messages that have been delivered at least once eligibility for early removal under the direction of the central data terminal; including the amount of space left in the remote cell node's message buffer in the status report provided to the central data terminal; allowing the remote cell node to store in its buffer only one message per network service module, resulting in new messages superseding old messages; allowing the remote cell node to store in its buffer multiple messages per network service module, resulting in the remote cell node delivering the next message each time the network service module does a reverse poll while also indicating to the network service module whether the remote cell node has more undelivered messages for the same network service module; including a network service module's acknowledgement of receipt of a message in the network service module's next report; and allowing the central data terminal to specify additional criteria which is satisfied by the upstream messages containing a network service module's reverse poll before the corresponding downstream message will be delivered.

Delivery of Network Service Module Reverse Poll Messages to Remote Cell Nodes Messages slated for reverse poll delivery to network service modules are downloaded to remote cell nodes most likely to perform successful delivery, along with parameters specifying delivery subchannel and message disposition under various circumstances.

NSM reverse poll messages can be distributed to remote cell nodes in one of at least two ways:

α) broadcast all messages to all remote cell nodes.

β) deliver only those messages supposed to be handled by a remote cell node to each remote cell node individually.

Several factors are considered in evaluating the above alternatives. These include the length of time any given message remains in a remote cell node's memory, the average rate for messages actually delivered by any one remote cell node, the size of the remote cell node's message buffer, the average system-wide message delivery rate, and the amount of intermediate data terminal-remote cell node traffic required to distribute the messages to the remote cell nodes.

Evaluation of the first factor, how long a given message stays in a remote cell node's memory, is as follows. If a network service module performs a reverse poll on average every a hours, then an average delay of a/2 hours exists from the time the remote cell node gets a message until the first opportunity to deliver the message. Furthermore, if the remote cell node delivers the message more than one time before discarding the message, then the message stays in the remote cell node's memory for a total of (n−1) a hours, with the delay for the last delivery being on the average a/2 hours. For a=8 and n=3, the average storage life of a reverse poll message is 16 hours.

The second factor, average rate for messages actually delivered by any one remote cell node, can be evaluated as follows: If a network of r remote cell nodes has N messages to deliver per day, and k remote cell nodes hear each network service module, then on average each remote cell node delivers kN/r messages. For r=2500, N=5000 and k=4, each remote cell node actually will deliver around 8 messages per day.

The third factor, size of the remote cell node's message buffer, varies greatly between the alpha and beta alternatives. Under the alpha, if the network has to deliver N messages per 24 hour day, and each message is stored for (n−1) a hours, then in the best case a buffer of size M=Na (n−1)÷24 is required. For the amounts reached in the discussion of the first and second factors, this works out to be the value 3334. Under the beta, a buffer size two or three times larger than the average found in the discussion of the second factor should suffice to handle the messages actually delivered by a remote cell node.

The fourth factor, the average system-wide message delivery rate, also varies greatly between the alpha and beta alternatives. Under the alpha, if the maximum number of reverse poll messages a remote cell node can store, M, is fixed then the equation from the discussion of the third factor can be used to determine a maximum value for N and hence the maximum average system-wide delivery rate. For M=1000, a race of 1500 messages per day is obtained. Under the beta, if the formula from the discussion of the second factor represents a half (or third) of M, solving for N with M=1000 yields a rate of 312,500 (or 208,333) messages per day.

Finally, the fifth factor, intermediate data terminal-remote cell node traffic required, can be evaluated for the alpha alternative as follows: In the best case, each of the N messages must be broadcast only once to the remote cell nodes—several message may be blocked together in a single download. Once the remote cell nodes' buffers become full, the central data terminal explicitly indicates which old messages to overwrite, since remote cell nodes have no way of knowing which messages were delivered by the others. The beta alternative, by contrast, can be evaluated as follows: Each message is delivered to each of the k remote cell nodes slated to perform final delivery, nominally taking k times longer than broadcasting to all. If several, distant, intermediate data terminals can poll/download to their own remote cell nodes concurrently, then several different network service module messages can be distributed at the same time. Generally, because the k remote cell nodes chosen to deliver a particular message must all be "close" to the target network service module, the remote cell nodes are likely to be under the control of the same innermediate data terminal, and instead of sending each network service module message to each remote cell node separately, k remote cell node addresses can be attached to the network service module message and the network service module message need be sent only once. These two techniques may combine so that this alternative may actually take less time to distribute the N messages than simply broadcasting.

Summarizing the evaluation of these factors indicates that alternative β is superior for the following reasons. RCN buffer requirements are much smaller and higher system-wide message throughput can be achieved; RCN message buffer size is the limiting factor for the alpha alternative where the buffer would have to be almost as large as the number of messages desired to be delivered system-wide in a day. From the remote cell node's perspective, the distribution process is simpler because the remote cell node does not have to be told to discard/replace anything already in the RCN buffer. The distribution process is more complex for the central data terminal because the central data terminal has to decide to which remote cell nodes the central data terminal should send each message. Finally, if several intermediate data terminals can transmit different packets at the same time distribution bandwidth requirements may even be less than broadcasting to all remote cell nodes.

An intermediate data terminal, or perhaps several concurrently, broadcasts a download containing a list of remote cell node IDs associated with each NSM message. All remote cell nodes hearing this broadcast receive the NSM message, but only those identified in the download actually store the NSM message. A message is removed from a remote cell node's buffer after it has been delivered the required number of times or if its specified expiration time has passed. Depending on message and packet sizes, two or three such NSM messages may be blocked in a single download, however, unless NSM messages at the central data terminal or intermediate data terminal are held until all such blocks are filled, NSM messages are likely distributed one-at-a-time as they become available.

The following parameter items accompany NSM messages to the remote cell node, but are not delivered to the network service module:

- subchannel used for final delivery;
- indication of what algorithm, e.g., hashing, to use to determine the delivery slot;
- number of times to deliver message before discarding it;
- time before message expiration in the event of non-delivery; up to 31 hours, or days;
- hashing collision priority, i.e., messages for battery-powered network service modules get higher priority;
- in the event of a hashing collision, whether chaining is permitted or not;
- additional criteria the corresponding upstream message with reverse poll bit set must satisfy before delivery can occur, such as matching a service disconnect password.

Remote Cell Node Contention Access Request for Intermediate Date Terminal's Attention Remote cell nodes can use the RIQ link to transmit a request for service from the intermediate data terminal. All remote cell nodes contend for access to this link.

Under certain conditions, a remote cell node may decide that the remote cell node needs to be polled by the intermediate data terminal sooner than the intermediate data terminal's next normally scheduled time. The RIQ link is a contention access link which can be used by any remote cell node to transmit an RIQ message requesting attention from the intermediate data terminal. The RIQ message identifies the remote cell node and contains an indication of why the request is being issued, in the form of remote cell node status fields. The two main reasons why a remote cell node might transmit an RIQ are because its message buffers are getting full, or because it has high priority messages (alarms) to relay. With adequate remote cell node polling, the former should not occur very often, and the latter is also not expected often either, except that during a large area power outage many remote cell nodes have high priority alarms to relay, and activity may be considered on the RIQ link. A field could be added to the IRH message which would allow intermediate data terminals to broadcast special instructions regarding the use of the RIQ slot during power outages, perhaps directing remote cell nodes to increase the time delay, lower the priority of power outage messages, or discard such messages. In the case of filling buffers, the threshold should be tuned so that the intermediate data terminal's reaction to the RIQ need not be very fast. In the case of high priority messages, delay in responding to the RIQ is dependent on the requirements of the application originating the message.

Once the intermediate data terminal receives an RIQ message, the intermediate data terminal decides whether or not the remote cell node should be serviced by an early poll, or if the next regularly scheduled poll will be soon enough. Once the decision to perform an early poll is made, the intermediate data terminal determines the next available opportunity to do so, given that actions of all intermediate data terminals must be coordinated. Clearly, until the remote cell node is polled, the remote cell node has no assurance that its RIQ was even heard by the intermediate data terminal, and after a suitable timeout waiting to be polled, the remote cell node re-issues the after a randomized back-off interval in case the first RIQ collided with an RIQ message from another remote cell node.

If polling cycles turn out to be short, or if polling is constrained to a very rigidly coordinated sequence, as may be necessary to avoid inter-intermediate data terminal and/or inter-remote cell node interference, then the concept of a remote cell node requesting "immediate" attention may not be viable, and the RIQ link may be ineffectual.

Message Redundancy Reduction

The existence of multiple paths from one network service module to several remote cell nodes markedly enhances the chance that any particular NSM message will be heard by at least one remote cell node, but at the expense of increased traffic arising from relaying multiple copies of the same message when several remote cell nodes successfully receive it. Remote cell nodes eavesdropping on each other's uploads is a technique which may be employed to reduce redundant messages. Other techniques considered are also documented.

Message redundancy is a fundamental feature of the wide area comunications network contributing to the system's ability to achieve a high probability of reception of NSM messages. However, relaying multiple copies of the same message, heard by multiple remote cell nodes, is undesirable, and may not even be possible if a large number of remote cell nodes hear each network service module. The number of remote cell nodes which receive a given NSM message, formerly called overlap, is estimated to be three or four, but could be higher.

To emphasize the need for redundancy reduction, consider an intermediate data terminal servicing 25 remote cell nodes, polling each remote cell node every 50 seconds (this is optimistic), and collecting five NSM messages per poll, resulting in a maximum out-flow of six msgs/min. One estimate of remote cell node in-flow (dependent on a number of assumptions) is 9,000 messages/day, or 6.25 messages/min. Perfect redundancy reduction would mean that the remote cell node would be required to relay only one or none of these.

With eavesdropping, remote cell nodes listen to the reports neighboring remote cell nodes transmit to the intermediate data terminal, and discard NSM messages that a neighbor has already relayed. Eavesdropping remote cell nodes need not confirm reception at the intermediate data terminal as that is the responsibility of the polled remote cell node. RIR messages are structured so than the eavesdropping remote cell node need not receive the entire report to determine if it has any of the reported NSM messages, thus reducing the energy required to perform this function. NSM messages are uniquely identified by: nsmtyp, nsmadr, msgtype, and msgno fields. The message priority is useful in localizing the search to the appropriate queue.

While redundancy reduction is needed, message redundancy reduction does have an undesirable side-effect, namely the destruction of information allowing the central data terminal to determine which remote cell nodes hear a particular network service module. However, just the random variation of which remote cell nodes relay messages from a particular network service module may be sufficient to identify the remote cell nodes. Alternatively, designating a particular message type, such as CSTAT which is transmitred, once per day, as being non-discarded is another way to identify which remote cell nodes hear the network service module. However, more detailed analysis of hearing patterns would require that eavesdropping be temporarily disabled. Remote cell nodes would keep a count of the number of NSM messages discarded due to eavesdropping.

Performance of any redundancy reduction technique may be evaluated based on several criteria. These criteria include amount of reduction achieved; cost in terms of electrical energy, RAM, and communication overhead; sensitivity to level of redundancy, which is a function of propagation conditions; computational complexity and network management required to support the endeavor; and the risk of completely discarding an NSM message.

Eavesdropping is expected to eliminate at least half of the redundant messages, require 10-20% of the remote cell node's power budget, need no additional RAM, require a significant amount of computation to determine neighbor tables for each RCN, and require a small amount of communications to distribute these tables. Alternatively, eavesdropping can be carried out on the basis of signal strength of the reporting remote cell node alone. The technique is applicable to any degree of redundancy. There is no risk of completely discarding an NSM message, but there is the potential for being unfair or unbalanced in that some remote cell nodes may relay more messages than others.

Alternatives to eavesdropping which would also provide message redundancy reduction include edge-gather and partial poll, wider-gather and partial poll, table based message acceptance, random discard, random discard based on signal strength, and signal strength with exception list. Each will be discussed in the paragraphs that follow.

Edge-Gather and Partial Poll

Edge-gather and partial poll requires a remote cell node to poll one or more edge neighbors, search for redundant messages in its local buffer, and then wait to be polled by the intermediate data terminal. An edge neighbor is one that could not be polled directly by the intermediate data terminal. Some remote cell nodes would poll neighbors, ochers would not. This method has an impact on polling strategy as well.

Wider-Gather and Partial Poll

Wider-gather and partial poll requires remote cell nodes to poll their neighbors in some manner. The messages from 25 remote cell nodes may end up in only four remote cell nodes. This method has impact on polling strategy as well.

Table Based Message Acceptance

Using this alternative, if an NSM address is in a remote cell node's table, then the remote cell node stores it. About three remote cell nodes would have to have an network service module's address on their lists.

Random Discard

Under random discard, some percentage of NSM messages, with the exception of alarms and CSTAT, is discarded on a random basis. Perhaps half of the messages could just be discarded. If six remote cell nodes hear an NSM message, then there is a 98.4% probability of still getting the message through to the central data terminal.

Random Discard Based on Signal Strength

When employing random discard based on signal strength, if the received signal strength exceeds some threshold, the remote cell node keeps the message; if the received signal strength is in a grey area, then the remote cell node discards the message on a random basis.

Signal Strength with Exception List

Using signal strength with exception list, if the received signal strength exceeds some threshold, the remote cell node keeps the message. For those NSM messages which have low signal strength at all remote cell nodes hearing them, the ID of the broadcasting network service module would be downloaded to several remote cell nodes, and any of those remote cell nodes hearing that network service module would keep the message regardless of signal strength.

General Network Message Structure

Network messages are encapsulated within data link packets and the address and control fields are generally common to both layers. The network layer distinguishes between messages which carry, using various delivery mechanisms, application layer messages, and those messages used to control the operation of the network itself. The network layer of the wide area communications network message structure is not based on any particular standard.

Different sets of network messages are defined for each type of network link. A message may contain an explicit message type subfield of the control field, or the message type may be implicitly determined by the channel or subchannel over which it is transmitted, with that channel only carrying a single type of message. If present, a message type field may in fact be inherited from the application layer message, just as address and control fields, which are defined to belong to the data link layer, may be considered as being inherited from the network layer.

Network messages used to transport application layer messages also contain control information instructing nodes how or when to perform final delivery. The network layer does not know how to interpret the content of such application layer messages. Other network messages used to control network operation are fully defined within the network layer and carry no application message.

As an application message is relayed from node to node by the network layer, different forms of network messages may be used on each successive link, fields may be rearranged, and fields containing message attributes may be attached to or removed from the original message.

Discussion now turns to the description of network messages in terms of the content of the "control" and "network message" fields of corresponding data link packets for each link.

Network Service Module Report Messages

Figure 41:
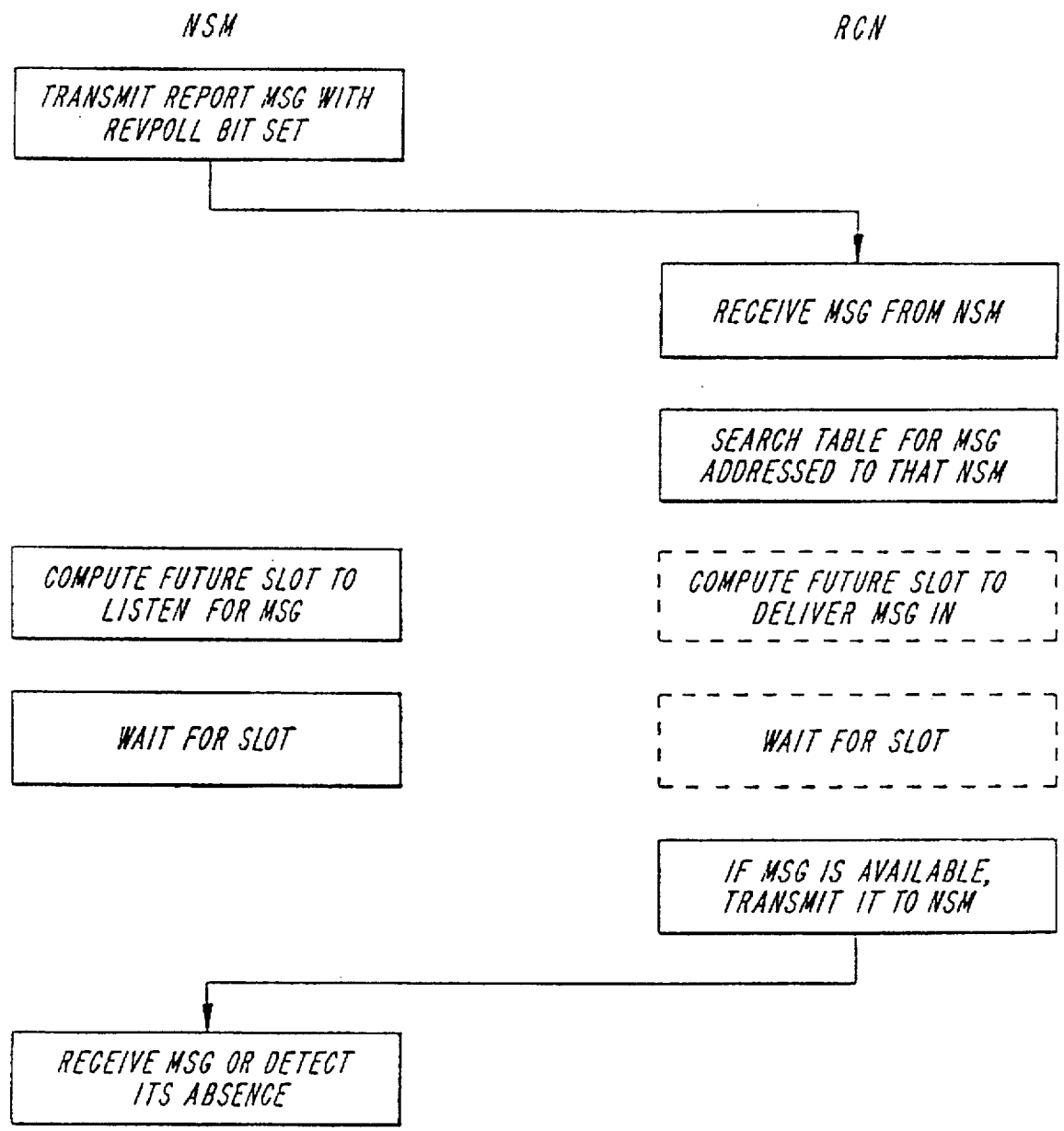
FIG. 41 shows an NRR network message structure in the context of a data link packet.

An NRR message (NRRM) contains a network service module application layer report and is encapsulated in a data link packet. Subfields of the control field exist for application message type, and for application specific use such as sequence numbering, which is not used for ARQ. The "network message" field is identical to the application message. FIG. 41 illustrates an NRR network message structure in the context of a data link packet.

Control Fields

Description:

msgtype—application message type. The network layer does not interpret msgtype, but uses this field to derive message priority and, along which msgno, to identify individual messages for the purpose of eavesdropping.

msgno—message sequence number. Increments modulo 16 with each message transmitted by a network service module, independent of msgtype. Used by the network layer to help identify and count lost messages and, along with msgtype, for eavesdropping; msgno is not used for message acknowledgement or retransmission.

revpoll—reverse poll. Considered within the jurisdiction of data link layer and used to request delivery of reverse poll commands, if there are any.

protocol status—can be used to report simple indication of command reception, perhaps one bit each set if the network service module has recently successfully received a broadcast (class or individual) or reverse poll command—used by head-end to estimate delivery delays. Reverse poll indicator could be used as an ACK to free up RCN command buffer space. Indicators for broadcasts could persist a fixed time or number of messages; indicator for reverse poll could persist until next reverse poll request.

priority—message priority as defined in the later section entitled, "Summary of Message Priorities."

Network Message Field

This field contains application report data (RDATA) as defined for msgtype within NSM type. It should be noted that the data link and network layers are closely related, sharing the address and control fields in common. When a remote cell node relays a network service module's report in an RIR message to an intermediate data terminal, it is broken into two parts, NRRMa and NRRMb, to facilitate eavesdropping.

Messages for Network Service Modules—RND

An RND message contains an network service module application layer command and is encapsulated in a data link packet. Subfields of the control field exist for application message (command) type, and for application specific use such as sequence numbering; which is not used for ARQ. The "network message" field is identical to the application command, except for CAT distribution.

Broadcast to Class Address Messages

FIG. 42 illustrates an RND broadcast to class network message format in the context of a data link packet. A complete message includes: optional address (nsmtyp—Data Link packet field), message (cofftend) type, application specific control subfield and an application message. The address may only be omitted, and "network message" field enlarged by 8 bits, if the delivery subchannel is dedicated to a single network service module type. Each application is responsible for any message sequencing performed.

Delivery to Individually Addressed Network Service Modules

Delivery to individually addressed network service modules is identical in principle to the broadcast to class address except the nsmadr portion of the data link address field must be present, resulting in a "network message" field which is 32 bits smaller. This message structure is used both for broadcast to individual address and for reverse poll delivery mechanisms. FIG. 43 illustrates an RND broadcast to individual address and reverse poll network message format in the context of a data link packet.

CAT Distribution

CAT distribution is just a special case of broadcast to class address, where the "network message" field contains only network layer, i.e., no application, data. CAT distribution is in a dedicated subchannel, so msgtyp is omitted. FIG. 44 illustrates network message format used to distribute CAT entries, in the context if a data link packet. The CAT distribution message fields include:

nsmtyp—NSM type.

appltyp—application subtype within NSM type; permits delivery of multiple CAT entries to a single network service module, each intended for a specific functional subprocess of the network service module, e.g., TOU or load survey; while the invention as disclosed gives each NSM type a single CAT entry, applcyp is included now to provide for future extension.

CAT ID—permits rapid switching from one CAT to another.

CAT version—CAT version number. This is used to identify old vs. new versions of the CAT.

NRR channel bitmap—bitmap with one bit corresponding to each of the channels 1 through 28 in which the network service module is allowed to transmit its report on the NRR link. Any NRR slot with the specified channels may be used.

RND broadcast subchannel—identifies the channel, subchannel, slot and subchannel size the NSM is supposed to listen to for broadcast to class address commands directed towards it, or for broadcast to individual address commands for individual network service modules. The network service module knows whether the network service module is supposed to expect class or individual address command delivery.

RND reverse poll subchannel—as above, except for reverse poll commands for individual network service modules.

Due to the relatively small RND packet size, the network layer structure of messages going down the RND link is highly application dependent, allowing optimization of the use of available bits. FIG. 45 illustrates the format of a subchannel designator.

Remote Cell Node Report Messages

An intermediate data terminal can poll a remote cell node to have the remote cell node either relay NSM messages, or report various kinds of internal status. NSM messages are rearranged in an RIR report to facilitate the eavesdropping method of redundancy control.

Remote cell nodes respond to polls for messages by sending a block of up to five messages at a time. These RCN report messages are structured to minimize receiver energy of neighboring remote cell nodes who are using eavesdropping to perform message redundancy control. The fields from the NSM message which uniquely identify it are placed first in the RCN report, followed by an intermediate CRC. Eavesdropping remote cell nodes can stop listening once they receive this CRC. The rest of the NSM message content comes after that. Remote cell node transmit energy is further minimized by making these report messages variable length. The maximum number of NSM messages which fit in the report depends on how many additional tag fields are requested by the intermediate data terminal, and the report message size varies because an integer number of tagged NSM messages may be smaller than the maximum size of the network message field of an RIR data link packet. Remote cell nodes which only have fewer than this number of NSM messages to relay, transmit a shorter report message. FIGS. 46–49 illustrate RIR network message format used to relay NSM messages in the context of a data line packet, RIR network message subfields comprising the data link control field, subfields comprising the RCN status field, and the maximum number of NSM messages per RIR, respectively.

As shown in FIG. 46, RCN reports carrying NSM messages use the RIR data link packet structure in a specialized fashion:

control—field of data link packet
  msgtype—also implies a certain type of item contained in the message (8 bits)
  nitems—the number of items (0≦n≦15)
  seqref—poll/response reference number (4 bits)
  seqbcst—broadcast sequence number (incorporates selective ACK/NAK) (4)
  seqind—message sequence number (per individual RCN) (4)
length—length in bytes of network message field of data link packet
NSM msg IDs
  NRRMa$_{1...n}$—list of n NSM message IDs
intermediate CRC—from start of data link packet
RCN status
  msgs.s—indication of number of NSM messages in RCN buffer (4)
  alms.s—indication of number of NSM alarm messages in RCN buffer (4)
  RCNST—RCN sensor status (8)
  msgfmt—NSM message format (indicates tags attached) (4)
  priority—highest actual priority of NSM messages contained (4)
NSM msg contents (msgfmt indicates which tags are present)
  NRRMb$_{1...n}$—list of n NSM msgs corresponding to IDs above, each with attached tags:
    ptag—NSM message priority (4 bits)
    vtag—NSM message value (4)
    dtag—indication of date of message reception (day of week only) (3)
    etag—indicates message received with CRC error (1)
    ttag—indication of time of message reception (16)
    ftag—measured frequency of NSM message (8)
    stag—measured signal strength of NSM message (8)
    crc—original CRC received with NSM message (16)
    ctag—measured correlation coefficient on preamble (8)
    mtag—measured figure of merit on preamble (?)

RCN Report Messages—RCN Status

An intermediate data terminal can poll a remote cell node for the remote cell node to either relay NSM messages, or for the remote cell node to report various kinds of internal status. Status report messages contain remote cell node internal status information.

The remote cell node status report is expected to closely follow the form of the one-way RIST message. New fields which may be introduced for new operational measurements, whether at the physical, data link or network layers, include:
  NSM command buffer space available;
  number of reverse poll messages delivered;
  number of NSM messages discarded due to wide area power outage;
  number of NSM messages discarded due to eavesdropping (per neighbor or otherwise);
  number of packets discarded due to below threshold preamble correlation.

RCN Poll Messages

An intermediate data terminal can use the IRH slot to either poll remote cell nodes for messages or to announce a subsequent download. The IRH therefore directly indicates whether the RIR/IRD slot is to be used as an RIR slot or as an IRD slot. The IRH also can be used to deliver special application control commands to remote cell nodes, which are immediately relayed to network service modules.

Figure 50:
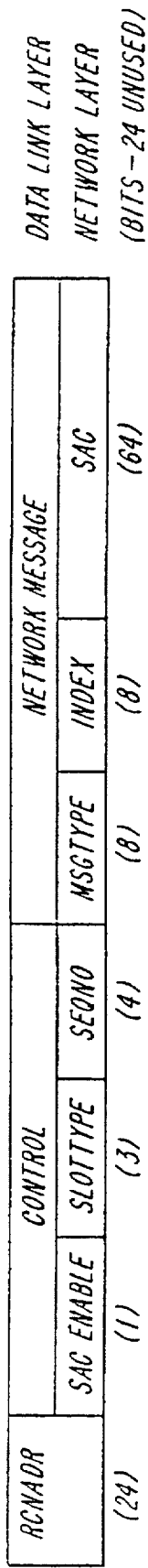
FIG. 50 illustrates the IRH network message format in the context of a data link packet.
Figure 51:
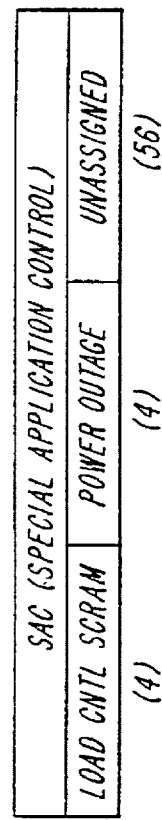
FIG. 51 illustrates the subfields comprising the SAC field.

Intermediate data terminals control the dialogue with remote cell nodes by either polling individual remote cell nodes for specific information, or by downloading to one or all remote cell nodes at a time. Intermediate data terminals indicate the desired operation in an IRH message, and the following shared RIR/IRD slot is used appropriately for either the remote cell node's response to poll, or the intermediate data terminal's download. The IPH message is carried in an IRH//RIQ data link packet, and contains the following fields:
  slottype—indicates usage of RIR/IRD slot: RIR, IRD, or unused (3 bits)
  seqno—sequence number; interpretation depends on context, one of:
    seqref—poll/response reference number if polling an individual remote cell node
    seqind—sequence number if downloading to an individual remote cell node
    seqbcst—sequence number if broadcasting to all remote cell nodes
  msgtype—type of data being polled for or downloaded
  index—array index when downloading/uploading a portion of a large table
  special application control (SAC)—includes load control SCRAM command
  SAC enable—indicates whether remote cell nodes are to relay SAC field FIG. 50 illustrates an IRH network message format in the context of a data link packet. The SAC field may be used to deliver special application control commands to participating network service modules. When a remote cell node receives an IPH with a SAC command enabled, the remote cell node relays the command in the following RIQ slot, overriding any RIQ it might be attempting to transmit. Network service modules capable of receiving such special application commands must continuously monitor the RIQ link. If the SAC enable bit is clear, then the SAC field is omitted. FIG. 51 illustrates the subfields comprising the SAC field.

Polls, responses to polls, and downloads to individual remote cell nodes all operate under a stop-and-wait ARQ strategy, hence a single bit sequence number field for error control is sufficient. However, a 4-bit field is used, with the provision than successive messages need not have consecutive, modulo 16, sequence numbers. Any sequence number differing from the last one transmitted represents a new message which is acknowledged with the same sequence number value before the next message can be sent.

For broadcast, due to the long delay to acquire acknowledgements, a sliding window flow control strategy is proposed, using the selective reject ARQ technique for error control. A 4-bit sequence number allows up to eight outstanding messages to be unambiguously ACKed or NAKed selectively. An ACK-n acknowledges all outstanding messages with sequence numbers less than n, up to eight, and says nothing about message n, while a NAK-n also acknowledges messages less than n but explicitly requests a retransmission of message with sequence number n.

RCN Download Messages—Broadcast to NSM Delivery Messages

Download information from an intermediate data terminal to a remote cell node generally consists of either messages to be relayed onto network service modules or instructions regarding the operation of the remote cell node itself. The delivery of messages to network service modules can be characterized as being performed either by coordinated simultaneous broadcast by all remote cell nodes or by the reverse poll mechanism.

Figure 52:
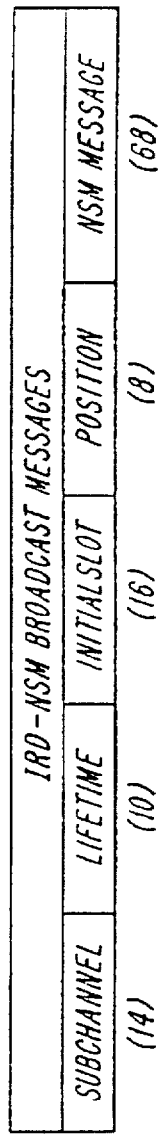
FIG. 52 illustrates the RID network message format for delivering NSM broadcast messages to remote cell nodes.

FIG. 52 illustrates an IRD network message form an for delivery network service module broadcast messages to remote cell nodes. FIG. 53 illustrates the subfields comprising various IRD fields. A list of messages is associated with a particular subchannel. Different subchannel may each have their own lists. A mechanism is required which permits the intermediate data terminal to change the lengths of message lists associated with subchannels. This has to be coordinated across all remote cell nodes. The main objective is to avoid having different remote cell nodes broadcasting different messages at the same time. To avoid this, an IRD message with a new list length could be sent for each subchannel in use, and all remote cell nodes could be required to acknowledge this new list length before it goes into effect. Remote cell nodes coming on line for the first time either after installation or after a RESET also need to be synchronized with the rest of the remote cell nodes already in operation.

The delivery of NSM broadcast messages to remote cell nodes was discussed earlier and described the general mechanism for delivering NSM messages to remote cell nodes for subsequent broadcast delivery. Regardless of the method of addressing used, which may be broadcast to all, some or one network service module, each NSM message is delivered to the remote cell nodes and subsequently transmitted to the network service module in a common manner. Remote cell nodes maintain a fixed length list of NSM messages to be delivered on a given subchannel, and repeatedly transmit the entire list of messages. Parameters describe when and where the NSM message is to be broadcast, specifically:

subchan—delivery subchannel initialSlot—day, cycle and frame number of first list element for first transmission lifetime—number of times, frames, message is broadcast before discarding position—position in list occupied by NSM message The central data terminal, from which all NSM messages originate, specifies that at most one message be delivered in any given slot. This requires that the initial slot of a new message in a list position does not occur before the lifetime of the message it supersedes has expired.

Remote cell nodes are expected to maintain a list of NSM commands in slot order so that when the required slot turns up, the message is ready for transmission. Generally, the intermediate data terminals deliver new commands for network service modules in advance of the old ones expiring, so remote cell nodes are able to store the new commands until needed.

Intermediate data terminals may use Algorithm A to configure the length of the message list associated with any subchannel. The central data terminal should ensure that the switch-over time coincides with the start of the message list. Remote cell nodes stop transmitting messages past the end of a shortened list, and remain silent for list positions which are "empty".

Under this arrangement, remote cell nodes need not be aware of CAT assignments for individual NSM types. However, there are serious implications involved in switching from one CAT ID to another, such that it may be necessary to declare that only upstream traffic may be subject to multiple CATs.

This mechanism for message delivery is intended for a regular scheduled message delivery pattern, and does not allow for preemptive replacement of actively circulating messages. If desired, "holes" may be left in the list so that urgent messages can be inserted at arbitrary times. However, all messages currently under consideration can be suitably scheduled and delivered using this mechanism.

Keeping a list of messages sorted, when messages are directly placed an particular positions, may be a challenge, but may potentially be solved by replacing the entire list at once. Otherwise, unordered lists may have to be tolerated.

RCN Download Messages—NSM reverse Poll Delivery Messages

Distribution to remote cell nodes of reverse poll delivery messages for network service modules requires a different format IRD than for broadcast delivery NSM messages. FIG. 54 illustrates an IRD network message form an for delivering NSM reverse poll messages to remote cell nodes. FIG. 55 illustrates the subfield, comprising "parms" field of IRD message in FIG. 54.

NSM reverse poll deliverable messages are broadcast to all remote cell nodes within hearing of a single intermediate data terminal, but the IDs of only those four remote cell nodes slated to perform final delivery are attached to each NSM message. The global RCN address can also be used, if desired. Parameters are used to describe additional delivery details, not passed on to network service modules, specifically:

subchan—delivery subchannel repetitions—number of times message is delivered before discarding lifetime—time before message expiration in the event of non-delivery hashParms—hashing algorithm, priority, and chaining option criteria—optional criteria NSM reverse poll message must satisfy Because these IRDs are generally directed to only remote cell nodes controlled by a single intermediate data terminal, another form of remote cell node addressing may be more efficient than using broadcast to all remote cell nodes. For example, the rcnadr field of the IRD could be composed of eight 1's followed by the intermediate data terminal's 16-bit ID. This would result in the selection of all remote cell nodes polled by that intermediate data terminal. Widely separated intermediate data terminals may be able to broadcast to their own sets of remote cell nodes simultaneously. A separate sliding window selective reject ARQ sequence number would be required for each remote cell node.

The criteria field must match the first 16-bits of the NSM message with the reverse poll bit set in order for the command to be delivered. This mechanism is primarily intended as an added measure of security when requesting service disconnection, i.e., when the criteria is an encoded password.

RCN Download Messages—Other Messages

Other IRD message types carry network control information to remote cell nodes. Intermediate data terminals download to remote cell nodes, either globally or individually addressed, various other kinds of control information. This information can include a list of neighboring remote cell nodes, remote cell node CAT entries, priorities assigned to NSM messages by msgtype, and other operational commands and parameters.

RIQ Message

A remote cell node transmits an RIQ message to request service from the intermediate data terminal. The content of this message basically identifies the remote cell node and provides an indication of the reason for the request. FIG. 56 illustrates the RIQ network message format used to request service from the intermediate data terminal in the context of a data packet.

The fields of an RIQ are a subset of the RIR network message. There are two main reasons why an RCN might transmit an RIQ. First, the remote cell node's message buffers are getting full, and second, the remote cell node has high priority messages, e.g. alarms, to relay. If necessary, the intermediate data terminal can deduce which is the case by looking at the msgs.s and alms.s subfields of the remote cell node status field.

RNC Message

Whenever a remote cell node receives an IRH network message which contains a special application control (SAC) command to relay to network service modules, the remote cell node does so in the immediately following RNC/RIQ slot. The remote cell node simply relays the SAC without interpretation.

The RNC slot is intended for very occasional use to deliver a very limited amount of command information to network service modules with a very short delay. Network service modules are expected to be listening to every RNC slot. The remote cell node simply takes the SAC field from the IRH, surrounds it with an opening flag and CRC, and transmits.

Summary of Message Priorities

Messages from all levels of the network have an associated priority, with higher priority messages being transferred before Those with lower priority. Consequently, higher priority messages will cross the network with less delay than those which lower priority. In general, priority level is encoded as a 4-bit integer with 0 representing the lowest priority and 15 representing the highest priority. There are two priority levels for messages transmitted by network service modules: low (0) and high (12); the latter corresponds only to electric network service module power outage alarms. NSM messages do not necessarily carry their actual priority in the priority field. Rather, actual priority is a function of the priority field as shown in FIG. 57. The actual numeric priority levels assigned to "NSM-low" and "NSM-high" are parameters under central data terminal control. NSM messages may be tagged with absolute priorities, in the range 1 . . . 14, but this is intended for only special circumstances.

As NSM messages are received by the remote cell node, they are appended to the end of the appropriate priority queue. Message priorities are partitioned into two groups, normal messages and alarms, for the purpose of determining when a remote cell node should transmit an RIQ. The priority level defining these two groups is a parameter under central data terminal control.

Actual priority is an explicit field of all messages originating from the remote cell node level on up the network. This allows µRTUs and RCN or IDT status messages to be assigned priorities if appropriate, and ensures a common criteria governing which messages are to be relayed first. In the case of RIR messages relaying NSM reports, the RIR's priority is that of the highest actual priority NSM message contained.

Priorization of downstream traffic arises only as a side-effect of the polling strategy, and command delivery. Generally, it is conceived that an application layer process on the central data terminal decides when to issue a download, and the intermediate data terminals and remote cell nodes relay the messages as soon as they receive the messages, or at explicitly scheduled times.

CDT Network Control Tasks

The network layer controller resides in the central data terminal, and is concerned with network layer control issues including fault management, performance management, operating tables, configuration management, downstream scheduling, and the process of developing a specification.

Fault Management

Faults may occur either at the node level, i.e., improper transmit frequency, low battery voltage, etc., or at the network level, i.e., non-functioning polling system, downloads that consistently do not work. The intent of the fault management function is to offer fault identification and recovery functions to the system while being Transparent to the network users. A detailed listing of fault definitions is required before fault management can be designed into the wide area communications network. In order to perform fault management, the proper parameters need to be measured. The steps in the fault management procedure are fault recognition, fault isolation, system or node reconfignration, and fault recovery.

Performance Management

Even if the network or nodes are not faulty, the performance of the wide area communications network may not meet the specifications for a variety of reasons, such as improper or untuned deployment, untuned operating tables, or improper network algorithms for the type of environment in which the system is operating. The purpose of the performance management system is to allow the central data terminal to correct the performance of the network while maintaining user transparency. Involvement of the user in performance management details can result in improvement in the routines.

Three key functions of the performance management system are to describe the performance of the system in a few calculable parameters, compare the performance of the system with the specified performance limits, and initiate corrective action in those cases where performance is out of specification. Calculable parameters can include eavesdropping efficiency, polling efficiency, average message delay, and download efficiency. Specified performance limits may also be in the form of the calculable parameters, and set upper and lower bounds to the performance parameters.

Network performance is managed through changes to the control cables. These tables are controlled by the central data terminal and downloaded to the target node or nodes.

Operating Tables

Operating tables that can and should be constructed at the central data terminal, and which are related to performance management, include polling tables for the central data terminal; polling tables for the intermediate data terminal; neighbor tables for the remote cell nodes, if eavesdropping is used; priority tables for the intermediate data terminals and the upload direction of the remote cell nodes; and IRLMAP for the intermediate data terminals.

Configuration Management

The configuration listing for the system is a listing of all nodes and their locations and present operating status. The configuration management section can also include tags to indicate the type of messages currently being received and the probability of receiving messages of the various types. Downstream Scheduling at the Central Data Terminal, Intermediate Data Terminal and Remote cell nodes Within the central data terminal, a download scheduler downloads messages into the network at a rate and at times dictated both by message priority in the download direction and the need for efficient usage of the intermediate data terminal-central data terminal links. For messages targeted to network service modules or remote cell nodes, the network controller assigns control bytes which designate the subchannel or channel in which the message is to be transmitted and the start/stop/other control information which is required before the destination node can execute its transmission. The intermediate data terminal and remote cell node then download the messages within the specified sub-channel or channels. The intermediate data terminal and remote cell node do not make decisions regarding the type of channel or sub-channel which gets a certain message; even in the case of reverse poll, the remote cell node chooses the exact time of the download, but the type of sub-channel used is dictated by the central data terminal. Upstream scheduling is taken care of by the polling schedule, which is either designed at the central data terminal or which is partially or fully dynamic at the intermediate data terminal.

Specification Process

Before beginning the specification of these management tasks it is necessary to provide a more detailed description of the tasks required in each management system; a listing of all network data which is available to the central data terminal; and an assumption about the data items stored in the databases. The listing of network data available to the central data terminal would be a subset of the data dictionary, and would include only those data items transmitted up the system. These network data items include much of the operational measurements which are performed at each layer. Using these documents, a specification could be written in which specific operations of RF available data items can be outlined.

The network layer controller will require a fault management database, a performance management database and a configuration management database. These databases may be integrated into one or may be separate, depending on future design decisions.

Network Layer Control Tables

For the network layer, control tables are required for the RF network to operate properly. The network service module, remote cell node and the intermediate data terminal operate from These tables, and use them to dictate the type of operations they will perform. Each node contains both control tables and operating tables.

IDT Control Tables

The IDT network control tables include Received Message Priority, Delivery, Generator, IDT-RCN Link Map, Download Table, and Channel Allocation Table. There may be two copies of every table, one that is currently being used and one that is currently being downloaded for future use.

RXPRI—Received Message Priority (Upstream)

For each RCN message which is received, the intermediate data terminal checks the message for priority by using the RXPRI. The priority of the message is used to place the message in memory using the memory management routine, and generate an ICQ if requested. Higher priority messages should be easily accessible to the intermediate data terminal, in order that the intermediate data terminal can quickly forward the messages to the central data terminal. An ICQ is an intermediate data terminal to central data terminal request for poll. The use of an ICQ will depend on the type of intermediate data terminal-central data terminal network that is being used.

Delivery

This table is downloaded into the intermediate data terminal from the central data terminal, and is common to all intermediate data terminals in the network. This table must include μRTU message priorities as well.

Generator

This table is generated by the central data terminal.

IRLMAP—IDT-RCN Link Map

All entries in the CATTBL which are not quiet can be used by the IRLMAP. This map is indexed using frame and channel numbers, and dictates the operation to be performed in this frame and channel. Possible operations include polling; downloading by node addressable methods, to a single remote cell node; and downloading by broadcast, to all remote cell nodes. If polling were allowed, then the intermediate data terminal uses the polling table to specify which poll will occur in this channel. If downloading were allowed, then the intermediate data terminal uses the download table to specify which download should occur in this channel. During quiet times, the intermediate data terminal does not perform any transmit/receive functions on the RF channel. This map should remain constant for long periods of time.

DWNTBL—Download Table

For each frame and channel type, the download table contains the messages that are being downloaded at the present time. A given message may be downloaded in only one frame and channel, for example, in which case it would be sent once every eight minutes.

CATTBL—Channel Allocation Table

The Channel Allocation Table for the intermediate data terminals specifies which IRL channels are to be used and which ones should contain quiet time.

RCN Control Tables

The RCN control tables at the network layer include received message priority, neighbor table, download table, channel allocation table, operating node, and CONFIG. There may be two copies of every table, one that is currently being used and one that is currently being downloaded for future use.

RXPRI—Received Message Priority

The received message priority table is the same table as the IDT.RXPRI except that it does not have μRTU messages given.

NTBL—Neighbor Table

The neighbor table is initially constructed at the central data terminal based on geographical distance. The neighbor table can also be constructed at the remote cell node itself over the first few days of installation based on signal strength. The signal strengths from up to eight other remote cell nodes are maintained using running averages from the start of network operation.

DWNTBL—Download Table

The messages to be downloaded by the remote cell node to the network service module are listed here, along with the control information which is passed down from the central data terminal. The control information is destroyed when the message is destroyed.

CATTBL—Channel Allocation Table

The channel allocation table for the remote cell nodes specifies . . . .

OPMOD—Operating Mode

The operating mode of the remote cell node is set by the central data terminal using basic download methods.

CONFIG

The configuration of an remote cell node is downloaded to the remote cell node by the central data terminal.

NSM Control Tables

The network service module interfaces to the network through the use of the CATTBL. This is the only control table in the network service module.

CATTBL

Each network service module receives a CAT table which is specific to its operation, according to nsmtyp. The use of the CAT table is described elsewhere within this section.

Operational Measurements and Tables

Both the remote cell nodes and the intermediate data terminals perform operational measurements to allow the central data terminal to have some visibility into the network.

IDT Operational Measurements and Tables

The network layer at the intermediate data terminal measures polling and downstream delivery performance. Measurements taken include MSGHD.PLL, MSGHD.RIQ, MSGHD.UIQ, RCNSS, NPOLLA, and NSPLL.

MSGHD.PLL

This measurement represents the number of messages heard since power-up. This value rolls over and it is up to the central data terminal to request the MSGHD field often enough co maintain consistency. This field is incremented once for every ten messages that are received by the intermediate data terminal from polls. It is used to provide an indication of the average number of messages per poll.

MSGHD.RIO

This measurement is the number of remote cell node messages heard in one RIQ slot. This value rolls over and this buffer is incremented once for every message received from a remote cell node in the RIQ slot.

MSGHD.UIO

This measurement is the number of uRTU messages heard in one RIQ slot. This value rolls over and this buffer is incremented once for every message received from a uRTU in the RIQ slot.

RCNSS

The intermediate data terminal should obtain one RSSI value each time the intermediate data terminal receives an RIR message. This RSSI value is inserted into the appropriate RCN address location of RCNSS, using a running average technique. The averaging should be taken over 256 measurements, after which She signal strength can be zeroed. The central data terminal should request the remote cell node signal strength data as needed for configuration evaluation during the central data terminal's performance management routine.

NPOLLA

This measurement is the number of poll attempts. This table records the number of poll attempts per remote cell node since power-up. All values roll-over. This data is used by the central data terminal's performance management routine, and should be picked up every few hours.

NSPLL

This measurement is the number of successful polls. This table records the number of poll attempts which resulted in the correct remote cell node responding. This data should be picked up by the central data terminal's performance management routine every few hours.

RCN Operational Measurements and Tables

The network layer at the remote cell node produces tables that monitor remote cell node operation in the upstream and downstream direction. These tables include MSGHD, MSGDIS, NPOLL, NACKs, and Average Delay for High-Priority Messages.

NSPLL

This table measures the number of messages heard since power-up and rolls over at the top.

NSPLL

This table measures the number of messages discarded due to eavesdropping since power-up and rolls over at the top.

NSPLL

This table measures the number of polls made to a specific remote cell node. Every time a remote cell node is polled, this is incremented. If the remote cell node does not respond with an RIR, NPOLL is still incremented.

NSPLL

This table measures the number of NACKed RIR messages. In those cases in which the remote cell node cannot hear an intermediate data terminal for whatever reason, the remote cell node will not get the poll or the NACK. These conditions must be counted by the intermediate data terminal.

Average Delay for High-Priority Messages from Central Data Terminal to Remote Cell Node Delivery These numbers are used to monitor the high-priority delivery system of the wide area communications network. The values that are measured aid in identifying areas of improvements for the system, and aid in fault and performance analysis. This value is maintained as a running average. For every download into an remote cell node, whether specific or broadcast, the download looks at the timetag and stores the difference between the entry time and the remote cell node reception time.

NSM Operational Measurements and Table

The network service module measures the downstream delivery quality. This is done by counting the number of successful receptions it obtains.

RNHSUC

After getting frequency synchronization, the network service module attempts to receive RNH. Every attempt is either successful or not successful. The number of unsuccessful RNH attempts and the total number of RNH attempts will both come up through the network; each should be one byte or "nibble". As there are only 16 attempts between roll-over it must come up about every two days. Both nibbles are forced to roll-over at the same time as soon as the number of attempts reaches 16.

RXSUC

Other than receiving RNH, the network service module may sometimes attempt to receive messages which are scheduled on its CAT table. Every receive attempt and every unsuccessful attempt will be counted using one nibble each and will be sent up to the central data terminal. This takes one byte. Both nibbles are forced to roll-over at the same time as soon as the number of attempts reaches 16.

RVPLLSUC

For all messages which must be received using reverse poll, the network service module counts the number of reverse poll attempts and the number of unsuccessful attempts. A reverse poll attempt is defined as any time the network service module does a reverse poll routine. An unsuccessful attempt is defined as a message in the slot which is for somebody else. Both nibbles are zeroed at the same time as soon as the number of attempts reaches 16.

Services Provided to the Application Layer

The philosophy adopted regarding the network-application layer interface is that application processes, especially at the central data terminal, receive and present application messages, addressed to network service modules, to the network layer, which is responsible for scheduling and coordinating actual delivery.

The primary locations at which a significant interaction between the network and application layers exist are at the network service module and at the central data terminal. The former has limited capabilities, and in reality it is likely that the data link, network and application layers will be tightly intertwined. At the central data terminal, upstream message flow is relatively straightforward. Messages arriving at the central data terminal pass through a message routing process which directs them to awaiting pre-registered application processes.

Downstream messages emanating from application processes on the central data terminal are another matter. The network layer insulates application processes from the details of scheduling and coordinating message delivery. The application process simply passes the message it wants delivered, perhaps along with instructions such as how many times to broadcast the message or an expiration time, to the network layer. The network layer decides how and when to perform delivery, perhaps patching up several related messages and then beginning a coordinated delivery to intermediate data terminals and subsequently to remote cell nodes and finally to network service modules.

Network to Application Interface

The interface between the network layer and the application layer only exists in the network service module, μRTU and central data terminal. The interface at each node is exactly the same. The philosophy used in the layered approach to systems' design is than the messages at each layer are not modified by the layers below, but are delivered in pristine form.

Downstream Direction—Central Data Terminal to μRTU and Central Data Terminal to Network Service Module When the application layer passes the network layer a message, the destination of the packet appears at the front of the message, and is used to route the message to the appropriate node. Selection of which slot to transfer the message in is performed by the network layer.

When the message arrives at the destination, the network layer passes up the same packet it received at the application layer. If the network layer were in charge of packetizing a given message due to length or security reasons, it is the job of the network layer at the other end to recompile the proper message before passing it to the application layer at the destination node.

Structural differences do not exist between downloads to the μRTU and network service module.

Upstream Direction—μRTU to Central Data Terminal and Network Service Module to Central Data Terminal The application layer responds to a message according to the protocol in operation for that message type. The same message which is inserted into the μRTU network layer surfaces at the central data terminal application-network interface.

All tags, whether physical, data link or network, are stripped off at the network controller so that only the correct message appears to the application layer.

Network Layer Databases

The network layer contains databases for configuration control, performance management, and fault management. According to the network layer database access philosophy, the network layer database is accessed by the network layer controller and the network operator. The common users on the network do not have access to this database and cannot read or write to the database. All of the data which common users want is located elsewhere. The network operator participates in the installation entry, but does not have access to write to some of the data items, such as node status, node performance, or time of installation.

Configuration Control Database Items

The configuration control database has a potential size of ten million customers (PG&E); if 41 bytes are used per customer+an extra 9 bytes for overhead, the result is 10M*50=500 Mbytes.

Performance Management Database Items

The performance management database includes entries designed for supporting performance management at both the node and network level. Node performance data includes battery level and other relevant data. Network performance data includes the number of messages heard from each network service module, the remote cell nodes which are receiving messages from each network service module, the average of the last specified number of frequency tags from that network service module, average of the last specified number of signal strength tags from the network service module and the average of the last specified number of time tag errors. Ten million CMEs requires about 20,000 remote cell nodes and about 800 intermediate data terminals.

Fault Management Database Items

The fault management database includes a listing of those nodes which are currently in fault conditions. The insertion of nodes into this database is controlled by the fault identification modules. The ability of the network to respond rapidly to fault conditions and events is the duty of the fault response modules, which recalculate configurations for the intermediate data terminals and remote cell nodes. The fault management database is, therefore, quite small and will usually have no entries.

Database Access Times and Network Layer Processor Sizing

For each message received by the network layer at the central data terminal from the lower layers, some database insertion operation needs to be done. For each received message, a search is assumed to be performed to find the CME address, and that about 15 update operations are performed, using about 20 instructions per update operation. Therefore, assuming a binary search of IM addresses takes about 20 jumps=20*4 ops.=80 ops, about 80 jump ops.+ 15*20=380 network layer operations per message. Assuming a 10 MHz clock, each message requires 380*0.2 μsec.= 0.76 msec.

Network Layer Design—Network Controller Data Flow Diagram

Figure 58A:
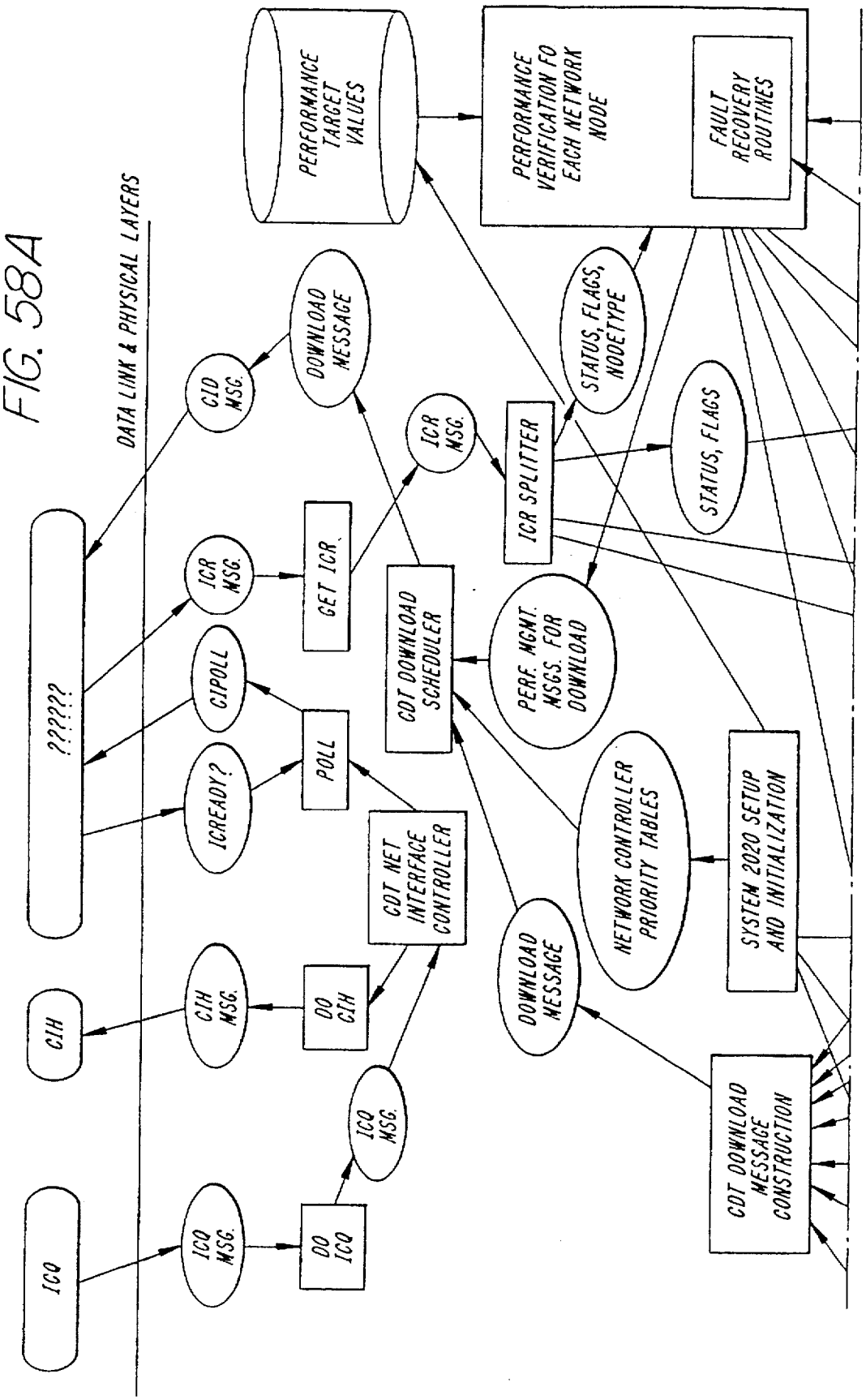
FIGS. 58A and 58B illustrate illustrates a preliminary data-flow diagram for the central data terminal network controller.
Figure 58B:
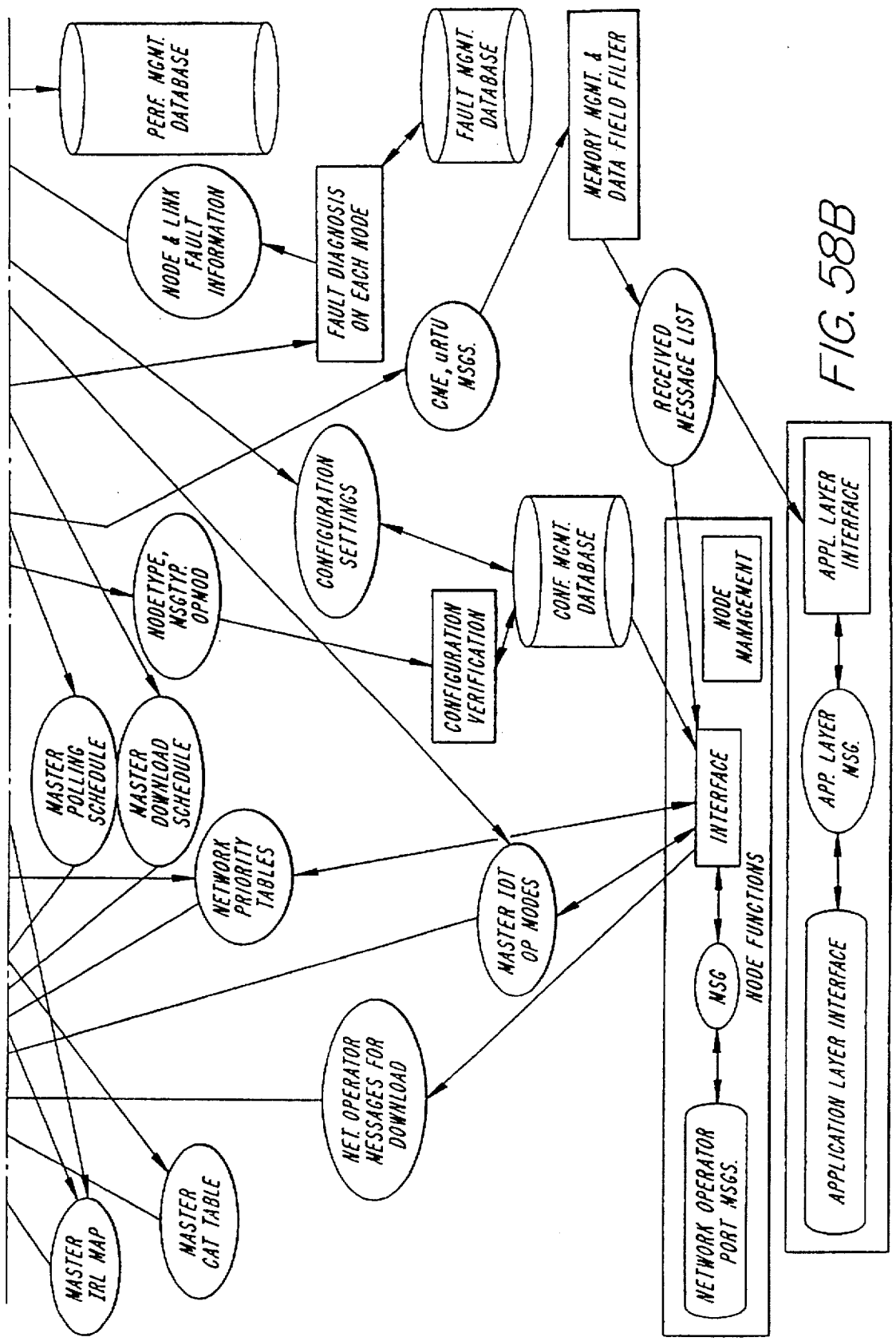

A preliminary data-flow diagram for the central data terminal network controller is shown in FIG. 58A and FIG. 58B. The interaction of the modules is shown, along with a brief description of the software modules required.

Distribution Automation Channel

Distribution automation (DA) services, involving remote control and polled data acquisition, require two-way communication with faster response and greater reliability than automatic meter reading services.

Basic data collection and control services such as meter reading and direct load control can function effectively with indirect acknowledgements and, with the exception of SCRAM commands, message delivery delays of minutes to hours. This is not the case for distribution automation (DA) applications where a human operator is involved. For distribution automation, response to commands should be rapid and deterministic. Generally 10 second response times are the maximum desirable but 15 to 30 seconds might be acceptable for some applications which are routine but infrequent, e.g. capacitor bank switching once or twice per day. Moreover, the probability of lost messages must be lower for distribution automation applications. The ability to co-ordinate IDT transmissions is reduced because of the need for short transmission delays.

FIG. 59 illustrates a command message format that is compatible with a specific protocol.

FIG. 60 illustrates a possible message traffic scenario associated with three different services within a single neighborhood network. In general, the daily DA traffic is substantially lower than basic service traffic, but this could change for short time periods during power outages where peak distribution automation traffic could be substantial. For this reason it is desirable to dynamically reallocate bandwidth to distribution automation on a frame by frame basis, or allocate enough channels to accommodate daily traffic within a one hour period.

An isolated neighborhood network, for example, has a theoretical traffic capacity of 17,400 messages per hour, but this capacity is reduced by imperfect eavesdropping to roughly half that value. A further reduction in capacity may arise from IDT polling algorithms which minimize interference between adjacent neighborhoods.

The traffic capacity of an isolated neighborhood network is limited by the IRD/RIR slot which can carry about five NSM report messages in each active channel, of which there can be up to 29 per frame. This gives an hourly message capacity of:

$$I = 5\, \frac{\text{messages}}{\text{channel}} \times 29\, \frac{\text{channels}}{\text{frame}} \times 120\, \frac{\text{frames}}{\text{hour}} = 17,400\ \text{messages/hr.}$$

or 417,600 messages per day.

If the eavesdropping efficiency, $\epsilon_E$, were 57% and if polling efficiency, $\epsilon_p$, were 100% then the non-redundant message capacity is roughly 10,000 messages/hour, or 240,000 messages/day.

This capacity in round numbers of 10,000 messages per hour represents a maximum capacity which is reduced by practical considerations related to polling efficiency. FIG. 61 illustrates, as an example, a reasonable level of traffic associated with a neighborhood network which represents roughly 16% of theoretical capacity. The following section discusses practical network capacity of 45,000 to 175,000 messages per day depending on polling protocols and allocation of bandwidth for distribution automation applications.

Network Polling Protocols for DA/DSM

The requirements of distribution automation impose additional criteria for selection of network polling protocols.

FIGS. 62–66 illustrates four different IDT polling protocols, each designed to prevent interference between different messages delivered to, or received from, remote cell nodes and network service modules along neighborhood boundaries where path loss to two intermediate data terminals may be roughly equal. Each protocol employs some method of multiplexing transmissions so as to preclude mutual interference.

Figures 62, 63, 64, 65:
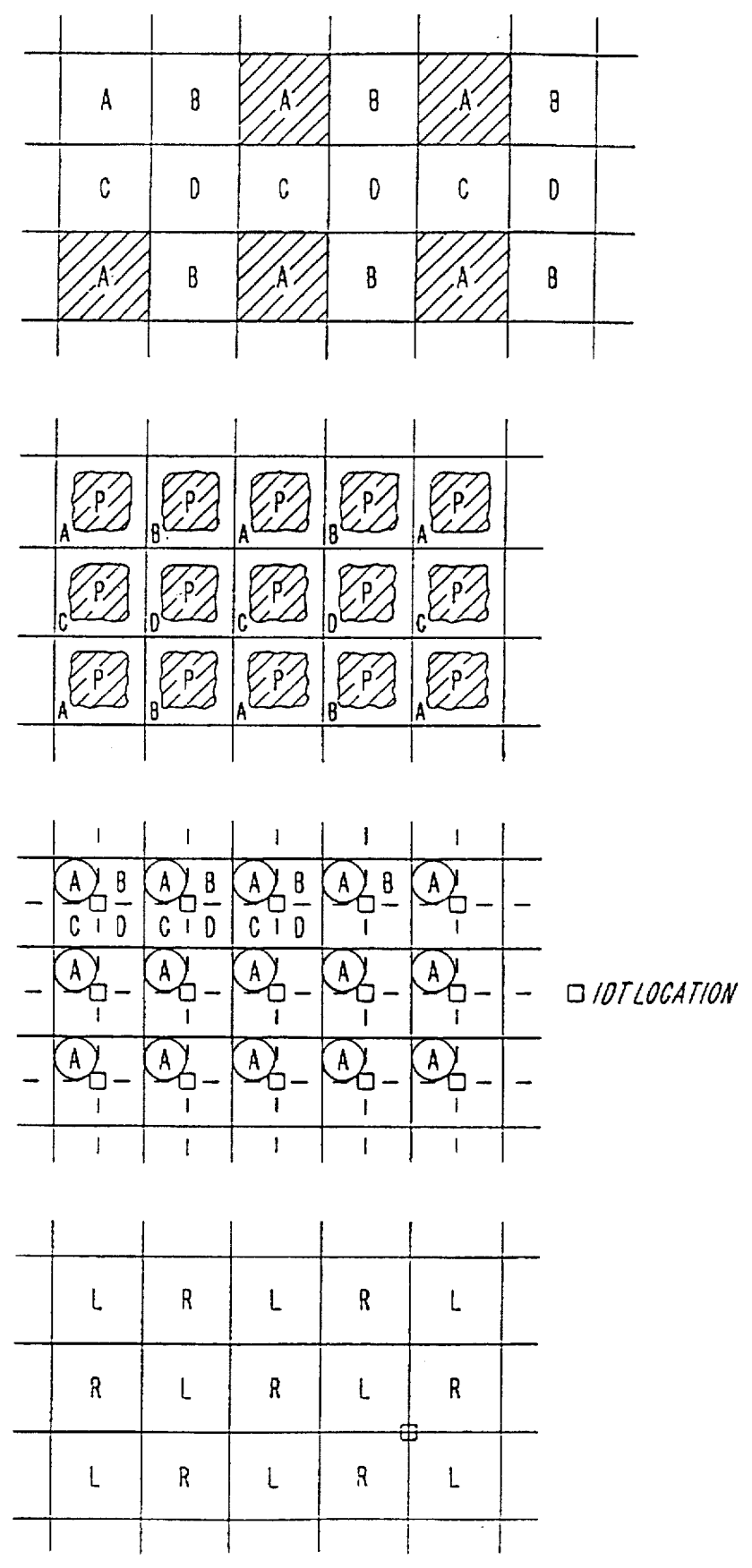
Figure 66:
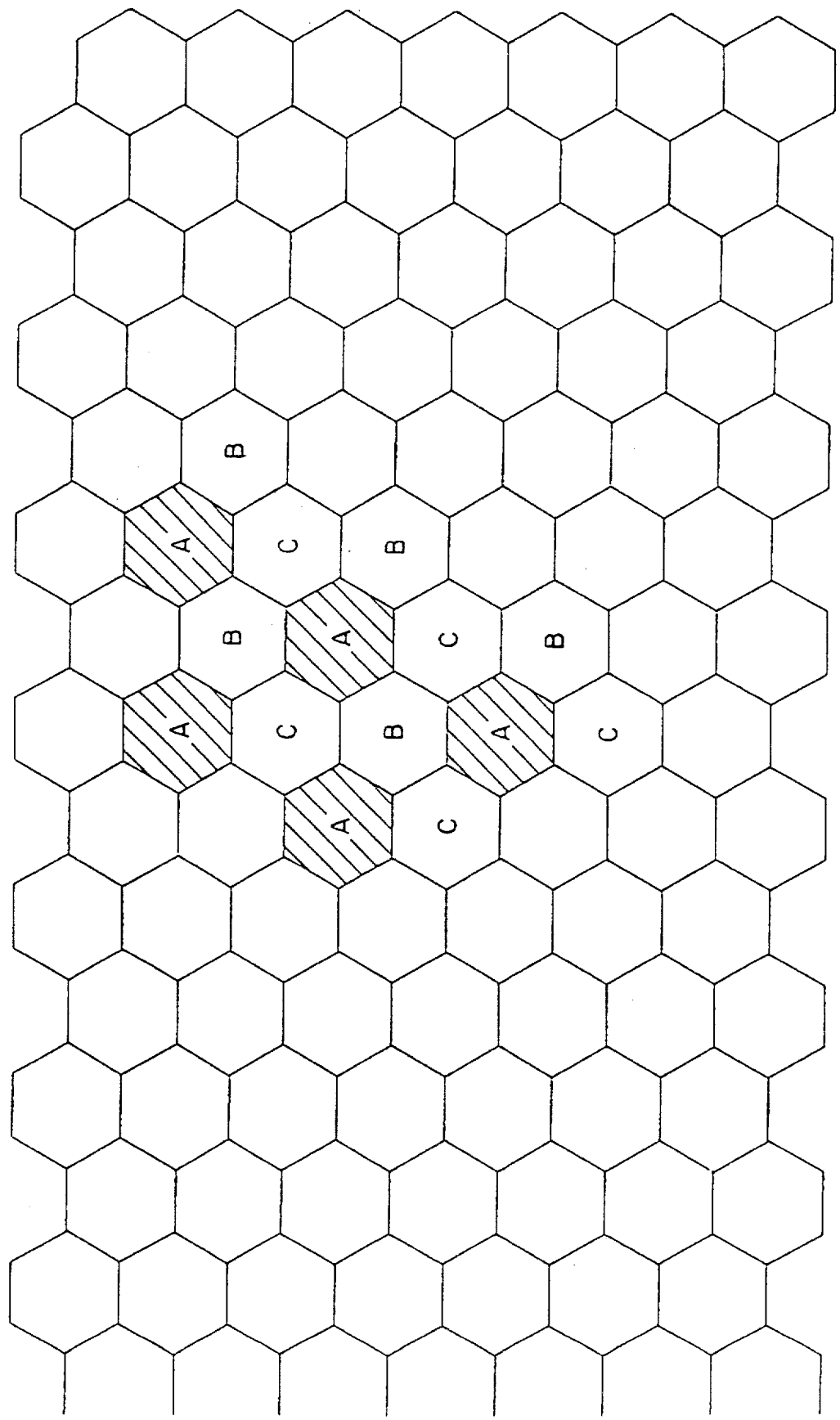
FIG. 66 illustrates of SDMP using hexagonal cells.

Space Division Multiplexing Protocol (SDMP), illustrated in FIG. 62, avoids interference by partitioning large networks into four groups of neighborhood networks designated A, B, C, D. Groups are arranged as shown in FIGS. 62 and 66 so that no member of a single group is adjacent to any other members of the same group, and polling by intermediate data terminals takes place in only one group at a time. Since group members are separated by at least one neighborhood network, roughly two miles, the possibility of message interference along neighborhood boundaries is very small. A major advantage of SDMP is that no co-ordination is required between intermediate data terminals and downstream addressing is very simple. In the event of an IDT failure, adjacent neighborhood intermediate data terminals can poll parts of the area through overlapping coverage, but some co-ordination of intermediate data terminals within adjacent groups may be required to avoid interference in the center of the failed area. However, despite its advantages of simplicity and minimal co-ordination by the central data terminal, space division multiplexing has the disadvantage of low efficiency since only one quarter of the network is active at a time.

Amplitude Division Multiplexing Protocol (ADMP) improves the efficiency of space division multiplexing by managing IDT-RCN communications so that adjacent intermediate data terminals can talk to remote cell nodes concurrently. This is achieved by partitioning the network as shown in FIG. 63 into four groups of neighborhood networks wish the central zones of each area designated as concurrent polling zones. Within these zones signal strengths from the central IDT transmissions exceed those from adjacent intermediate data terminals by an amount greater than the capture ratio of RCN receivers. Providing the remote cell nodes respond with equal power, the received signal strength at the intermediate data terminals also is exceed the capture ratio so that independent communication can take place within these zones. The areas outside the zones of concurrency (P) are polled using SDMP so that efficiency is reduced, but the concurrency zones may encompass 21 of 25 remote cell nodes in a typical neighborhood network leaving only four to be polled by the SDMP. This gives an overall polling efficiency of 0.67.

Directional Division Multiplexing Protocol (DDMP) further improves the efficiency of polling. In one of its simpler embodiments DDMP employs a directional antenna on every intermediate data terminal, providing coverage in 90° increments so that polling can be accomplished sequentially in four quadrants of a neighborhood network. FIG. 64 illustrates the sequential coverage pattern A, B, C, D which is executed synchronously by all intermediate data terminals. Since coverage areas are widely separated, interference is minimal even with all intermediate data terminals polling together. The efficiency of this protocol can approach 100% providing corresponding quadrants have comparable levels of traffic because the dwell time must be the same for each quadrant.

Polarization Division Multiplexing Protocol (PDMP), as illustrated in FIG. 5, operates in a manner similar to ADMP but with adjacent intermediate data terminals operating concurrently with opposite antenna polarizations. The corner areas of each IDT coverage zone, however, may experience interference so some type of SDMP may be required. Moreover, remote cell nodes also require more expensive polarized antennas, and two types have to be stocked.

Comparison of Polling Protocols

There are significant differences in cost, performance, and communication reliability among the three different polling protocols.

FIG. 67 compares polling protocols on specific issues associated with cost, performance, and reliability.

Communication reliability involves several issues such as interference from adjacent intermediate data terminals which can occur along neighborhood network boundaries, immunity to weather conditions which might affect antenna patterns, ability to provide backup coverage in the event of an IDT failure and topological flexibility which characterizes ability to add a new intermediate data terminal within an existing network to improve coverage in a problem area. DDMP rates high in all categories although SDMP provides the highest resistance to interference from adjacent intermediate data terminals and can overcome shortcomings in topological flexibility by reducing polling efficiency from 25% to 20%.

The protocols can provide deterministic response times which are essential for distribution automation applications. Overall, however, the performance winner is DDMP which exhibits the highest polling efficiency despite possible delays in alarm reporting.

Cost involves four components: hardware, installation, maintenance and development, the later being closely related to complexity.

A preferred choice is SDMP which has the simplest hardware in terms of IDT antenna, and IDT/RCN memory, and also has the simplest firmware. Although ADMP has only marginally higher hardware cost because of extra memory required for polling tables and polling algorithms, its complexity is greater than SDMP, requiring more research and development effort for both intermediate data terminal and central data terminal. DDMP is substantially higher in cost because of the need for a steerable antenna array which could increase the cost of an intermediate data terminal by several hundred dollars. Moreover, the need to carefully observe intermediate data terminal orientation during installation will increase costs and maintenance costs.

Communication Channel Configuration for Distribution Automation

Distribution automation requires two-way communication with faster response and greater reliability than automatic meter reading services. To meet this requirement channels will have to be specially configured for distribution automation services.

The basic communication granularity is the 100 millisecond message slot. In order to maintain compliance with the single radio channel compatibility goal, each hop in the hierarchy will require one slot. Thus, if an acknowledged message were sent to the NSM level, then at least four slots are required.

IDT to RCN—1 slot@ 2 kb/s

RCN to NSM—1 or 2 slots@ 1 kb/s

NSM to RCN—1 slot@ 2 kb/s

RCN to IDT—1 slot@ 2 kb/s

Possibly a double slot on the RCN to NSM link might be required to provide broader compatibility with some existing utility protocols such as the PG&E protocol working to the NSM level. However, network service modules supporting distribution automation functions are limited in functionality and therefore typically required no more than two or three bytes of information in the data field, which fit within a single slot.

Because of more stringent requirements on distribution automation message loss races, and response times, the directional or space division methods of communication provides the simplest, fastest and most reliable approach for IDT and RCN communication, as well as for NSM to RCN communication. Intermediate data terminals are partitioned into four non-adjacent groups and communication only occurs within one group at a time which avoids any need for IDT co-ordination by the central data terminal. However, because only one group at a time communicates, a total of 16 slots are allocated within a frame to provide a single independent "DA channel" for each of a intermediate data terminal groups. The maximum response time ($T_R$) is equal to $$T_R = \frac{16}{\#DA\ slots/frame} \times 30\ seconds$$

At least two approaches to supporting fast response communication are compatible with the two-way frame structure. One is to allocate a single slot (say NRR1) within each channel for distribution automation as shown in FIG. 68. This would provide a response time of $$\frac{16}{29} \times 30 = 16.55 \text{ seconds}$$

for each command message with a capacity of 217 messages per hour.

Figures 69, 70:
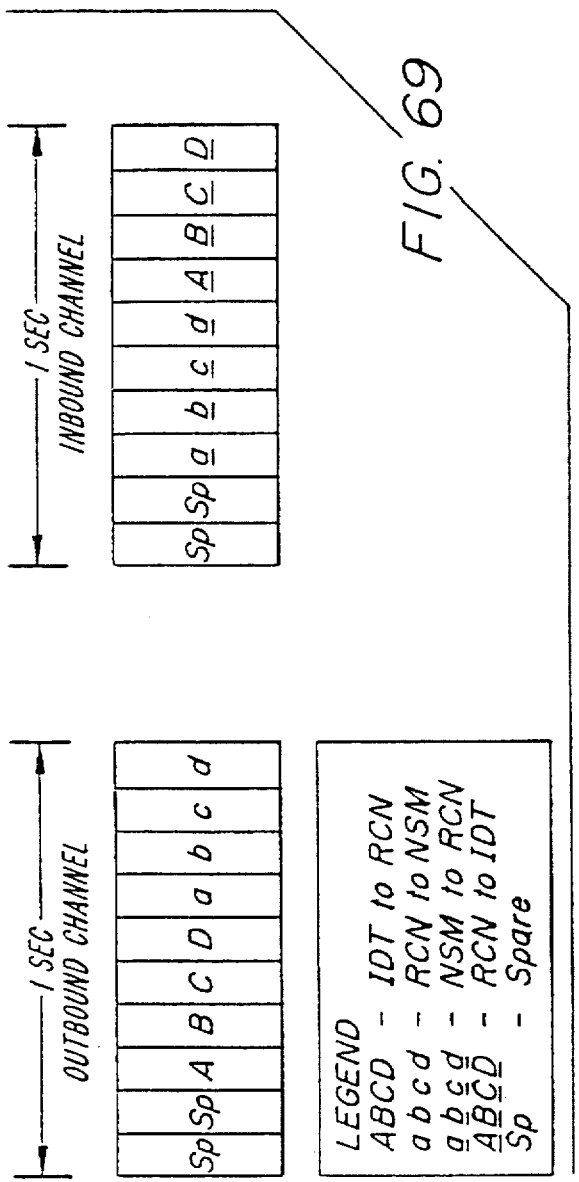
FIG. 69 shows configuration of real-time channels which are employed in pairs to support deterministic communication to the NSM level and in the case of directional multiplexing, the four quadrants of the neighborhood are covered sequentially.
FIG. 70 shows performance comparison of different channel/frame structures for DA applications.

A second approach is to designate a new type of channel called a real-time channel or R channel comprising ten slots allocated as shown in FIG. 69. At least two channels would be required to support distribution automation and they could be organized as shown with two spare slots/channel. The spare slots could be employed as contention access slots for DA information gathering or they could be used to indicate the type of channel so that other channel configurations could be supported.

Channel Frame Structure for Distribution Automation

Of the two fast-response communication approaches, allocated DA slots in designated channels; or special DA channels called R-channels, the R-channel approach appears to be sufficiently flexible in that variable amounts of bandwidth can be allocated to DA functions through the CAT distribution process with minimal impact on existing NSM firmware. Adding new channel configurations independent of old ones at the NSM level is possible whereas changing slot assignments in future would require additional NSM firmware to support both slot and channel assignments.

FIG. 71 shows a possible frame configuration employing the modified amplitude multiplexing (ADMP) plus two real time channel pairs to provide a neighborhood network capacity of 120,000 report/control messages per day plus 120 DA messages/hr (2880/day) with a maximum response time of 15 seconds. This exceeds the projected requirements of 150 DA control messages/day for a neighborhood network.

When Directional Multiplexing (DDMP) is employed, 2R channel pairs per frame would have to be allocated to give 15 second response time. Since each of the four ABCD slots can be used to send a message within a neighborhood, one to each quadrant, the theoretical DA message capacity is four times greater with DDMP than with ADMP, but if a human operator were involved, the practical limit would be one message per R channel pair, i.e. ¹⁄₁₅ seconds. However, DDMP would provide greater capacity for more automated control strategies. FIG. 70 compares different approaches.

FIG. 72 shows a frame configuration employing allocated D/A slots with modified ADMP to provide a capacity of 2880 DA messages/day with 30 second response time. Response times below 16 seconds would require allocation of more than one slot per channel which would reduce NSM to RCN report capacity.

It will be apparent to those skilled in the art that various modifications can be made to the communications network for collecting data from remote data generating stations of the instant invention without departing from the scope or spirit of the invention, and it is intended that the present invention cover modifications and variations of the communications network provided they come within the scope of the appended claims and their equivalents.

We claim:

1. A method for communicating between an intermediate data terminal (IDT), a plurality of remote cell nodes (RCN), and a plurality of network service modules (NSM), using a plurality of frames with each frame having a plurality of channels, comprising the steps, during each frame, of:

transmitting, in a first channel of the frame, from the intermediate data terminal to the plurality of remote cell nodes, an IDT-synchronization signal;

transmitting, synchronized to the IDT-synchronization signal in a second channel of the frame, from the intermediate data terminal to a first remote cell node, a first polling signal;

receiving, at each of the plurality of remote cell nodes, the IDT-synchronization signal;

synchronizing, at each of the plurality of remote cell nodes, responsive to receiving the IDT-synchronization signal, an RCN-timing circuit to the IDT-synchronization signal;

receiving, at the first remote cell node, the first polling signal;

transmitting, synchronized to the IDT-synchronization signal in a third channel of the frame, from the first remote cell node to the intermediate data terminal, responsive to the first polling signal, an RCN-packet signal;

transmitting, using radio waves, in a fourth channel of the frame, from each of the plurality of remote cell nodes to the plurality of network service modules, responsive to receiving and synchronizing to the IDT-sychronization signal, an RCN-synchronization signal;

receiving, at each of the plurality of network service modules, the RCN-synchronization signal;

synchronizing, at each of the plurality of network service modules, responsive to receiving the RCN-synchronization signal, a NSM-timing circuit to the RCN-synchronization signal;

collecting, at a first network service module, data from a first physical device; and transmitting, using radio waves, responsive to receiving and synchronizing to the RCN-synchronization signal synchronized to the IDT-synchronization signal, in a fifth channel of the frame, from the first network service module to at least one of the plurality of remote cell nodes, a first NSM-packet signal containing the data from the first physical device.

2. The method as set forth in claim 1, further including the steps of:

transmitting, synchronized to the IDT-synchronization signal, in a sixth channel of the frame, from the first remote cell node to a second network service module, a command signal; and transmitting, using radio waves, synchronized to the RCN-synchronization signal and responsive to the command signal, in a seventh channel of the frame, from the second network service module to the first remote cell node, a second NSM-packet signal.

3. A method for communicating between an intermediate data terminal (IDT), a plurality of remote cell nodes (RCN), and a plurality of network service modules (NSM), using a plurality of frames with each frame having a plurality of channels, comprising the steps, during each frame, of:

transmitting, in a first channel of the frame, from the intermediate data terminal to the plurality of remote cell nodes, an IDT-synchronization signal;

receiving, at each of the plurality of remote cell nodes, the IDT-synchronization signal;

synchronizing, at each of the plurality of remote cell nodes, responsive to receiving the IDT-synchronization signal, an RCN-timing circuit to the IDT-synchronization signal;

transmitting, using radio waves, in a fourth channel of the frame, from each of the plurality of remote cell nodes to the plurality of network service modules, responsive to receiving and synchronizing to the IDT-synchronization signal, an RCN-synchronization signal;

receiving, at each of the plurality of network service modules, the RCN-synchronization signal;

synchronizing, at each of the plurality of network service modules, responsive to receiving the RCN-synchronization signal, an NSM-timing circuit to the RCN-synchronization signal;

collecting, at a first network service module, data from a first physical device;

transmitting, using radio waves, responsive to receiving and synchronizing to the RCN-synchronization signal synchronized to the IDT-synchronization signal, in a fifth channel of the frame, from the first network service module to a first remote cell node, a first NSM-packet signal containing the data from the first physical device;

receiving, at the first remote cell node, the NSM-packet signal;

storing, at the first remote cell node, the NSM-packet signal;

transmitting, synchronized to the IDT-synchronization signal, in a second channel of the frame, from the intermediate data terminal to the first remote cell node, a first polling signal;

receiving, at the first remote cell node, the first polling signal; and transmitting, synchronized to the IDT-synchronization signal and responsive to the first polling signal, in a third channel of the frame, from the first remote cell node to the intermediate data terminal, a plurality of stored NSM-packet signals as an RCN-packet signal.

4. The method as set forth in claim 3, further including the steps of:

transmitting, using radio waves, synchronized to the IDT-synchronization signal, in a sixth channel of the frame, from the first remote cell node to a second network service module, a command signal; and transmitting, using radio waves, synchronized to the RCN-synchronization signal and responsive to the command signal, in a seventh channel of the frame, from the second network service module to the first remote cell node, a second NSM-packet signal.

5. A method for communicating between an intermediate data terminal (IDT), a plurality of remote cell nodes (RCN), and a plurality of network service modules (NSM), using a plurality of frames with each frame having a plurality of channels, comprising the steps, during each frame, of:

transmitting, in a first channel of the frame, from the intermediate data terminal to the plurality of remote cell nodes, an IDT-synchronization signal;

receiving, at each of the plurality of remote cell nodes, the IDT-synchronization signal;

synchronizing, at each of the plurality of remote cell nodes, responsive to receiving the IDT-synchronization signal, an RCN-timing circuit to the IDT-synchronization signal;

transmitting, using radio waves, in a fourth channel of the frame, from each of the plurality of remote cell nodes to the plurality of network service modules, responsive to receiving and synchronizing to the IDT-synchronization signal, an RCN-synchronization signal;

receiving, at each of the plurality of network service modules, the RCN-synchronization signal;

synchronizing, at each of the plurality of network service modules, responsive to receiving the RCN-synchronization signal, an NSM-timing circuit to the RCN-synchronization signal;

collecting, at a first network service module, data from a first physical device;

transmitting, using radio waves, at a pseudorandom time within a predetermined time period, responsive to receiving and synchronizing to the RCN-synchronization signal synchronized to the IDT-synchronization signal, in a fifth channel of the frame, from the first network service module, an NSM-packet signal containing the data from the first physical device, to a multiplicity of remote cell nodes, said multiplicity of remote cell nodes being a subset of the plurality of remote cell nodes and said multiplicity of remote cell nodes including a first remote cell node;

receiving, at the multiplicity of remote cell nodes, the NSM-packet signal;

storing, at the multiplicity of remote cell nodes, the NSM-packet signal;

transmitting, synchronized to the IDT-synchronization signal in a second channel of the frame, from the intermediate data terminal to the first remote cell node, a first polling signal;

receiving, at the first remote cell node, the first polling signal; and transmitting, synchronized to the IDT-synchronization signal, in a third channel of the frame, from the first remote cell node to the intermediate data terminal, responsive to the first polling signal, a first plurality of NSM-packet signals as a first RCN-packet signal.

6. The method as set forth in claim 5, further including the steps of:

receiving, at the intermediate data terminal, the first RCN-packet signal; and transmitting, in a sixth channel of the frame, from the intermediate data terminal to the first remote cell node, responsive to receiving the first RCN-packet signal, an acknowledgement signal.

7. The method as set forth in claim 5, further including the steps of:

transmitting, in a real-time request channel of the frame, from the intermediate data terminal to the first network service module, an IDT-request for a set of requested data;

receiving, at the first network service module, the IDT-request; and transmitting, responsive to the IDT-request and in real-time, from the first network service module to the intermediate data terminal, the set of requested data.

8. The method as set forth in claim 6, further including the steps of:

eavesdropping, by a second remote cell node, said second remote cell node being within the multiplicity of remote cell nodes, to the first polling signal;

eavesdropping, by the second remote cell node, to the transmission of the first plurality of NSM-packet signals;

comparing, by the second remote cell node, the first plurality of NSM-packet signals to a second plurality of NSM-packet signals, said second plurality of NSM-packet signals being stored by the second remote tell node in a memory; and identifying a third plurality of NSM-packet signals common to both the first plurality of NSM-packet signals and the second plurality of NSM-packet signals.

9. The method as set forth in claim 8, further including the step of:

deleting the third plurality of NSM-packet signals from the memory.

10. The method as set forth in claim 8, further including the step of:

overwriting the third plurality of NSM-packet signals.

11. The method as set forth in claim 8, further including the step of:

transmitting, synchronized to the IDT-synchronization signal in a seventh channel of the frame, from the intermediate data terminal to the second remote cell node, a second polling signal;

receiving, at the second remote cell node, the second polling signal; and transmitting, synchronized to the IDT-synchronization signal, in a eighth channel of the frame, from the second remote cell node to the intermediate data terminal, responsive to the second polling signal, the second plurality of stored NSM-packet signals, but not including the third plurality of NSM-packet signals, as a second RCN-packet signal.

12. The method as set forth in claim 11, further including the steps of:

receiving, at the intermediate data terminal, the second RCN-packet signal; and transmitting, in an ninth channel of the frame, from the intermediate data terminal to the second remote cell node, responsive to receiving the second RCN-packet signal, an acknowledgement signal.

13. The method as set forth in claim 5, further including the steps of:

receiving, at the intermediate data terminal from a second remote cell node, a second plurality of NSM-packet signals as a second RCN-packet signal;

comparing, at the intermediate data terminal, the second plurality of NSM-packet signals to the first plurality of NSM-packet signals; and identifying a third plurality of NSM-packet signals common to both the first plurality of NSM-packet signals and the second plurality of NSM-packet signals.

14. The method as set forth in claim 13, further including the step of:

deleting the third plurality of NSM-packet signals.

15. The method as set forth in claim 13, further including the step of:

overwriting the third plurality of NSM-packet signals.

16. The method as set forth in claim 7, further including the steps of:

detecting, at the first network service module, an alarm condition; and transmitting, responsive to detecting the alarm condition, in the real-time request channel of the frame, from the first network service module to the intermediate data terminal, the alarm condition.

17. A method for communicating between a central data terminal (CDT), a plurality of intermediate data terminals (IDT), a plurality of remote cell nodes (RCN), and a plurality of network service modules (NSM), using a plurality of frames with each frame having a plurality of channels, comprising the steps, during each frame, of:

transmitting, in a first channel of the frame, from the plurality of intermediate data terminals to the plurality of remote cell nodes, an IDT-synchronization signal;

receiving, at each of the plurality of remote cell nodes, the IDT-synchronization signal;

synchronizing, at each of the plurality of remote cell nodes, responsive to receiving the IDT-synchronization signal, an RCN-timing circuit to the IDT-synchronization signal;

transmitting, using radio waves, in a fourth channel of the frame, from each of the plurality of remote cell nodes to the plurality of network service modules, responsive to receiving and synchronizing to the IDT-synchronization signal, an RCN-synchronization signal;

receiving, at each of the plurality of network service modules, the RCN-synchronization signal;

synchronizing, at each of the plurality of network service modules, responsive to receiving the RCN-synchronization signal, an NSM-timing circuit no the RCN-synchronization signal;

collecting, at a first network service module, data from a first physical device;

transmitting, using radio waves, at a pseudorandom time within a predetermined time period, responsive to receiving and synchronizing to the RCN-synchronization signal synchronized to the IDT-synchronization signal, in a fifth channel of the frame, from the first network service module, an NSM-packet signal containing the data from the first physical device, to a multiplicity of remote cell nodes, said multiplicity of remote cell nodes being a subset of the plurality of remote cell nodes and said multiplicity of remote cell nodes including a first remote cell node;

receiving, at the multiplicity of remote cell nodes, the NSM-packet signal;

storing, at the multiplicity of remote cell nodes, the NSM-packet signal;

transmitting, synchronized to the IDT-synchronization signal, in a second channel of the frame, from a first intermediate data terminal to the first remote cell node, a first polling signal;

receiving, at the first remote cell node, the first polling signal;

transmitting, synchronized to the IDT-synchronization signal, in a third channel of the frame, from the first remote cell node to the first intermediate data terminal, responsive to the first polling signal, a first plurality of NSM-packet signals as a first RCN-packet signal;

transmitting, from the central data terminal to the first intermediate data terminal, in a sixth channel of the frame, a second polling signal;

receiving, at the first intermediate data terminal, the second polling signal; and transmitting, in a seventh channel of the frame, from the first intermediate data terminal to the central data terminal, responsive to the second polling signal, a first plurality of RCN-packet signals as a first IDT-packet signal.

18. The method as set forth in claim 17, further including the steps of:

receiving, at the central data terminal, the first IDT-packet signal; and transmitting, from the central data terminal to the first intermediate data terminal, responsive to receiving the first IDT-packet signal, an acknowledgement signal.

19. The method as set forth in claim 17, further including the step of:

transmitting, in a real-time request channel of the frame, from the central data terminal to the first network service module, a CDT-request for a set of requested data;

receiving, at the first network service module, the CDT-request; and transmitting, responsive to the CDT-request and in real-time, from the first network service module to the central data terminal, the set of requested data.

20. The method as set forth in claim 17, further including the steps of:

eavesdropping, by a second remote cell node, to the first polling signal;

eavesdropping, by the second remote cell node, to the transmission of the first plurality of NSM-packet signals;

comparing, by the second remote cell node, the first plurality of NSM-packet signals to a second plurality of NSM-packet signals, said second plurality of NSM-packet signals being stored by the second remote cell node in a memory; and identifying a third plurality of NSM-packet signals common to both the first plurality of NSM-packet signals and the second plurality of NSM-packet signals.

21. The method as set forth in claim 20, further including the step of:

deleting the third plurality of NSM-packet signals from the memory.

22. The method as set forth in claim 20, further including the step of:

overwriting the third plurality of NSM-packet signals.

23. The method as set forth in claim 20, further including the step of:

transmitting, synchronized to the IDT-synchronization signal in an eighth channel of the frame, from the first intermediate data terminal to the second remote cell node, a third polling signal;

receiving, at the second remote cell node, the third polling signal; and transmitting, synchronized to the IDT-synchronization signal, in a ninth channel of the frame, from the second remote cell node to the first intermediate data terminal, responsive to the third polling signal, the second plurality of stored NSM-packet signals, but not including the third plurality of NSM-packet signals, as a second RCN-packet signal.

24. The method as set forth in claim 17, further including the steps of:

eavesdropping, by a second intermediate data terminal, to the second polling signal;

eavesdropping, by the second intermediate data terminal, to the transmission of the first plurality of RCN-packet signals;

comparing, by the second intermediate data terminal, the first plurality of RCN-packet signals to a second plurality of RCN-packet signals, said second plurality of RCN-packet signals being stored by the second intermediate data terminal in a memory; and identifying a third plurality of RCN-packet signals common to both the first plurality of RCN-packet signals and the second plurality of RCN-packet signals.

25. The method as set forth in claim 24, further including the step of:

deleting the third plurality of RCN-packet signals from the memory.

26. The method as set forth in claim 24, further including the step of:

overwriting the third plurality of RCN-packet signals.

27. The method as set forth in claim 24, further including the step of:

transmitting, synchronized to the IDT-synchronization signal in an eighth channel of the frame, from the central data terminal to the second intermediate data terminal, a third polling signal;

receiving, at the second intermediate data terminal, the third polling signal; and transmitting, synchronized to the IDT-synchronization signal, in a ninth channel of the frame, from the second intermediate data terminal to the central data terminal, responsive to the third polling signal, the second plurality of stored RCN-packet signals, but not including the third plurality of RCN-packet signals, as a second IDT-packet signal.

28. The method as set forth in claim 17, further including the steps of:

transmitting, from the central data terminal to a second intermediate data terminal, in an eighth channel of the frame, a third polling signal;

receiving, at the second intermediate data terminal, the third polling signal; and transmitting, in a ninth channel of the frame, from the second intermediate data terminal to the central data terminal, responsive to the third polling signal, a second plurality of RCN-packet signals as a second IDT-packet signal.

29. The method as set forth in claim 28, further including the steps of:

receiving, at the central data terminal, the second IDT-packet signal; and transmitting, from the central data terminal to the second intermediate data terminal, responsive to receiving the second IDT-packet signal, an acknowledgement signal.

30. The method as set forth in claim 28, further including the steps of:

receiving, at the central data terminal from the second intermediate data terminal, the second plurality of RCN-packet signals;

comparing, at the central data terminal, the second plurality of RCN-packet signals to the first plurality of RCN-packet signals; and identifying a third plurality of RCN-packet signals common to both the first plurality of RCN-packet signals and the second plurality of RCN-packet signals.

31. The method as set forth in claim 30, further including the step of:

deleting the third plurality of RCN-packet signals.

32. The method as set forth in claim 30, further including the step of:

overwriting the third plurality of RCN-packet signals.

33. The method as set forth in claim 19, further including the steps of:

detecting, at the first network service module, an alarm condition; and transmitting, responsive to detecting the alarm condition, in the real-time request channel of the frame, from the first network service module to the central data terminal, the alarm condition.

34. A method for communicating between a central data terminal (CDT), a plurality of remote cell nodes (RCN), and a plurality of network service modules (NSM), using a plurality of frames with each frame having a plurality of channels, comprising the steps, during each frame, of:

transmitting, in a first channel of the frame, from the central data terminal to the plurality of remote cell nodes, a CDT-synchronization signal;

receiving, at each of the plurality of remote cell nodes, the CDT-synchronization signal;

synchronizing, at etch of the plurality of remote cell nodes, responsive to receiving the CDT-synchronization signal, an RCN-timing circuit to the CDT-synchronization signal;

transmitting, using radio waves, in a fourth channel of the frame, from each of the plurality of remote cell nodes to the plurality of network service modules, responsive to receiving and synchronizing to the CDT-synchronization signal, an RCN-synchronization signal;

receiving, at each of the plurality of network service modules, the RCN-synchronization signal;

synchronizing, at each of the plurality of network service modules, responsive to receiving the RCN-synchronization signal, an NSM-timing circuit to the RCN-synchronization signal;

collecting, at a first network service module, data from a first physical device;

transmitting, using radio waves, at a pseudorandom time within a predetermined time period, responsive to receiving and synchronizing to the RCN-synchronization signal synchronized to the CDT-synchronization signal, in a fifth channel of the frame, from the first network service module, an NSM-packet signal containing the data from the first physical device, to a multiplicity of remote cell nodes, said multiplicity of remote cell nodes being a subset of the plurality of remote cell nodes and said multiplicity of remote cell nodes including a first remote cell node;

receiving, at the multiplicity of remote cell nodes, the NSM-packet signal;

storing, at the multiplicity of remote cell nodes, the NSM-packet signal:

transmitting, synchronized to the CDT-synchronization signal in a second channel of the frame, from the central data terminal to the first remote cell node, a first polling signal;

receiving, at the first remote cell node, the first polling signal; and transmitting, synchronized to the CDT-synchronization signal, in a third channel of the frame, from the first remote cell node to the central data terminal, responsive to the first polling signal, a first plurality of NSM-packet signals as a first RCN-packet signal.

35. The method as set forth in claim 34, further including the steps of:

receiving, at the central data terminal, the first RCN-packet signal; and transmitting, in a sixth channel of the frame, from the central data terminal to the first remote cell node, responsive to receiving the first RNC-packet signal, an acknowledgement signal.

36. The method as set forth in claim 34, further including the step of:

transmitting, in a real-time request channel of the frame, from the central data terminal to the first network service module, a CDT-request for a set of requested data;

receiving, at the first network service module, the CDT-request; and transmitting, responsive to the CDT-request and in real-time, from the first network service module to the central data terminal, the set of requested data.

37. The method as set forth in claim 34, further including the steps of:

eavesdropping, by a second remote cell node, said second remote cell node being within the multiplicity of remote cell nodes, to the first polling signal;

eavesdropping, by the second remote cell node, to the transmission of the first plurality of NSM-packet signals;

comparing, by the second remote cell node, the first plurality of NSM-packet signals to a second plurality of NSM-packet signals, said second plurality of NSM-packet signals being stored by the second remote cell node in a memory; and identifying a third plurality of NSM-packet signals common to both the first plurality of NSM-packet signals and the second plurality of NSM-packet signals.

38. The method as set forth in claim 37, further including the step of:

deleting the third plurality of NSM-packet signals from the memory.

39. The method as set forth in claim 37, further including the step of:

overwriting the third plurality of NSM-packet signals.

40. The method as set forth in claim 37, further including the step of:

transmitting, synchronized to the CDT-synchronization signal in a seventh channel of the frame, from the central data terminal to the second remote cell node, a third polling signal;

receiving, at the second remote cell node, the third polling signal; and transmitting, synchronized to the CDT-synchronization signal, in a eighth channel of the frame, from the second remote cell node to the central data terminal, responsive to the third polling signal, the second plurality of stored NSM-packet signals, but not including the third plurality of NSM-packet signals, as a second RCN-packet signal.

41. The method as set forth in claim 40, further including the steps of:

receiving, at the central data terminal, the second RCN-packet signal; and transmitting, from the central data terminal to the second remote cell node, responsive to receiving the second packet signal, an acknowledgement signal.

42. The method as set forth in claim 34, further including the steps of:

receiving, at the central data terminal from a second remote cell node, a second plurality of NSM-packet signals as a second RCN-packet signal;

comparing, at the central data terminal, the second plurality of NSM-packet signals to the first plurality of NSM-packet signals; and identifying a third plurality of NSM-packet signals common to both the first plurality of NSM-packet signals and the second plurality of NSM-packet signals.

43. The method as set forth in claim 42, further including the step of:

deleting the third plurality of NSM-packet signals.

44. The method as set forth in claim 42, further including the step of:

overwriting the third plurality of NSM-packet signals.

45. The method as set forth in claim 36, further including the steps of:

detecting, at the first network service module, an alarm condition; and transmitting, responsive to detecting the alarm condition, in the real-time request channel of the frame, from the first network service module to the central data terminal, the alarm condition.

46. A method for communicating between an intermediate data terminal (IDT), a plurality of remote cell nodes (RCN), and a plurality of network service modules (NSM), using a plurality of frames with each frame having a plurality of channels, comprising the steps, during each frame, of:

transmitting, in a first channel of the frame, from the intermediate data terminal to the plurality of remote cell nodes, an IDT-synchronization signal;

transmitting, synchronized to the IDT-synchronization signal, in a second channel of the frame, from the intermediate data terminal to a first remote cell node, a first polling signal;

receiving, at each of the plurality of remote cell nodes, the IDT-synchronization signal;

synchronizing, at each of the plurality of remote cell nodes, responsive to receiving the IDT-synchronization signal, an RCN-timing circuit to the IDT-synchronization signal;

transmitting, using radio waves, in a third channel of the frame, from each of the plurality of remote cell nodes to the plurality of network service modules, responsive to receiving and synchronizing to the IDT-synchronization signal, an RCN-synchronization signal;

receiving, at each of the plurality of network service modules, the RCN-synchronization signal;

synchronizing, at each of the plurality of network service modules, responsive to receiving the RCN-synchronization signal, an NSM-timing circuit to the RCN-synchronization signal;

collecting, at the plurality of network service modules, data from a plurality of physical devices, respectively;

transmitting, using radio waves, in a fourth channel of the frame, from the first remote cell node to a first network service module, a command signal;

receiving, at the first network service module, the command signal;

transmitting, using radio waves, synchronized to the RCN-synchronization signal and responsive to the command signal, in a fifth channel of the frame, from the first network service module to the first remote cell node, data as an NSM-packet signal;

receiving, at the first remote cell node, the NSM-packet signal;

storing, at the first remote cell node, the NSM-packet signal;

receiving, at the first remote cell node, the first polling signal; and transmitting, synchronized to the IDT-synchronization signal and responsive to the first polling signal, in a sixth channel of the frame, from the first remote cell node to the intermediate data terminal, a first plurality of stored NSM-packet signals as a first RCN-packet signal.

47. The method as set forth in claim 46, further including the steps of:

receiving, at the intermediate data terminal, the first RCN-packet signal; and transmitting, in an seventh channel of the frame, from the intermediate data terminal to the first remote cell node, responsive to receiving the first RCN-packet signal, an acknowledgement signal.

48. The method as set forth in claim 46, further including the step of:

transmitting, in a real-time request channel of the frame, from the intermediate data terminal to the first network service module, an IDT-request for a set of requested data;

receiving, at the first network service module, the IDT-request; and transmitting, responsive to the IDT-request and in real-time, from the first network service module to the intermediate data terminal, the set of requested data.

49. The method as set forth in claim 46, further including the steps of:

eavesdropping, by a second remote cell node, to the first polling signal;

eavesdropping, by the second remote cell node, to the transmission of the first plurality of stored NSM-packet signals;

comparing, by the second remote cell node, the first plurality of stored NSM-packet signals to a second plurality of stored NSM-packet signals, said second plurality of stored NSM-packet signals being stored by the second remote cell node in a memory; and identifying a third plurality of NSM-packet signals common to both the first plurality of stored NSM-packet signals and the second plurality of stored NSM-packet signals.

50. The method as set forth in claim 49, further including the step of:

deleting the third plurality of NSM-packet signals from the memory.

51. The method as set forth in claim 49, further including the step of:

overwriting the third plurality of NSM-packet signals.

52. The method as set forth in claim 49, further including the step of:

transmitting, synchronized to the IDT-synchronization signal in an eighth channel of the frame, from the intermediate data terminal to the second remote cell node, a second polling signal;

receiving, at the second remote cell node, the second polling signal; and transmitting, synchronized to the IDT-synchronization signal, in a ninth channel of the frame, from the second remote cell node to the intermediate data terminal, responsive to the second polling signal, the second plurality of stored NSM-packet signals, but not including the third plurality of NSM-packet signals, as a second RCN-packet signal.

53. The method as set forth in claim 52, further including the steps of:

receiving, at the intermediate data terminal, the second RCN-packet signal; and transmitting, from the intermediate data terminal to the second remote cell node, responsive to receiving the second RCN-packet signal, an acknowledgement signal.

54. The method as set forth in claim 48, further including the steps of:

detecting, at the first network service module, an alarm condition; and transmitting, responsive to detecting the alarm condition, in the real-time request channel of the frame, from the first network service module to the intermediate data terminal, the alarm condition.

55. A method for communicating between a central data terminal (CDT), a plurality of intermediate data terminals (IDT), a plurality of remote cell nodes (RCN), and a plurality of network service modules (NSM), using a plurality of frames with each frame having a plurality of channels, comprising the steps, during each frame, of:

transmitting, in a first channel of the frame, from the plurality of intermediate data terminals to the plurality of remote cell nodes, an IDT-synchronization signal;

transmitting, synchronized to the IDT-synchronization signal, in a second channel of the frame, from a first intermediate data terminal to a first remote cell node, a first polling signal;

receiving, at each of the plurality of remote cell nodes, the IDT-synchronization signal;

synchronizing, at each of the plurality of remote cell nodes, responsive to receiving the IDT-synchronization signal, an RCN-timing circuit to the IDT-synchronization signal;

transmitting, using radio waves, in a third channel of the frame, from each of the plurality of remote cell nodes to the plurality of network service modules, responsive to receiving and synchronizing to the IDT-synchronization signal, an RCN-synchronization signal;

receiving, at each of the plurality of network service modules, the RCN-synchronization signal;

synchronizing, at each of the plurality of network service modules, responsive to receiving the RCN-synchronization signal, an NSM-timing circuit to the RCN-synchronization signal;

collecting, at the plurality of network service modules, data from a plurality of physical devices, respectively;

transmitting, using radio waves, in a fourth channel of the frame, from the first remote cell node to a first network service module, a command signal;

receiving, at the first network service module, the command signal;

transmitting, using radio waves, synchronized to the RCN-synchronization signal and responsive to the command signal, in a fifth channel, from the first network service module to the first remote cell node, data as an NSM-packet signal;

receiving, at the first remote cell node, the NSM-packet signal;

storing, at the first remote cell node, the NSM-packet signal;

receiving, at the first remote cell node, the first polling signal;

transmitting, synchronized to the IDT-synchronization signal and responsive to the first polling signal, in a sixth channel of the frame, from the first remote cell node to the first intermediate data terminal, a first plurality of stored NSM-packet signals as a first RCN-packet signal;

transmitting, in a seventh channel of the frame, from the central data terminal to the first intermediate data terminal, a second polling signal;

receiving, at the first intermediate data terminal, the second polling signal; and transmitting, responsive to the second polling signal, in an eighth channel of the frame, from the first intermediate data terminal to the central data terminal, a first plurality of RCN-packet signals as a first IDT-packet signal.

56. The method as set forth in claim 55, further including the steps of:

receiving, at the first intermediate data terminal, the first RCN-packet signal; and transmitting, from the first intermediate data terminal to the first remote cell node, responsive to receiving the first RCN-packet signal, an acknowledgement signal.

57. The method as set forth in claim 55, further including the step of:

transmitting, in a real-time request channel of the frame, from the central data terminal to the first network service module, a CDT-request for a set of requested data;

receiving, at the first network service module, the CDT-request; and transmitting, responsive to the CDT-request and in real-time, from the first network service module to the central data terminal, the set of requested data.

58. The method as set forth in claim 55, further including the steps of:

receiving, an the central data terminal, the first IDT-packet signal; and transmitting, from the central data terminal to the first intermediate data terminal, responsive to receiving the first IDT-packet signal, an acknowledgement signal.

59. The method as set forth in claim 55, further including the steps of:

eavesdropping, by a second remote cell node, to the first polling signal;

eavesdropping, by the second remote cell node, to the transmission of the first plurality of stored NSM-packet signals;

comparing, by the second remote cell node, the first plurality of stored NSM-packet signals to a second plurality of stored NSM-packet signals, said second plurality of stored NSM-packet signals being stored by the second remote cell node in a memory; and identifying a third plurality of NSM-packet signals common to both the first plurality of stored NSM-packet signals and the second plurality of stored NSM-packet signals.

60. The method as set forth in claim 59, further including the step of:

deleting the third plurality of NSM-packet signals from the memory.

61. The method as set forth in claim 59, further including the step of:

overwriting the third plurality of NSM-packet signals.

62. The method as set forth in claim 59, further including the step of:

transmitting, synchronized to the IDT-synchronization signal in a ninth channel of the frame, from the first intermediate data terminal to the second remote cell node, a third polling signal;

receiving, at the second remote cell node, the third polling signal; and transmitting, synchronized to the IDT-synchronization signal, in a tenth channel of the frame, from the second remote cell node to the first intermediate data terminal, responsive to the third polling signal, the second plurality of stored NSM-packet signals, but not including the third plurality of NSM-packet signals, as a second RCN-packet signal.

63. The method as set forth in claim 62, further including the steps of:

receiving, an the first intermediate data terminal, the second RCN-packet signal; and transmitting, from the first intermediate data terminal to the second remote cell node, responsive to receiving the second RCN-packet signal, an acknowledgement signal.

64. The method as set forth in claim 55, further including the steps of:

transmitting, from the central data terminal to a second intermediate data terminal, in a ninth channel of the frame, a third polling signal;

receiving, at the second intermediate data terminal, the third polling signal; and transmitting, in a tenth channel of the frame, from the second intermediate data terminal to the central data terminal, responsive to the third polling signal, a second plurality of RCN-packet signals as a second IDT-packet signal.

65. The method as set forth in claim 64, further including the steps of:

receiving at the central data terminal, the second IDT-packet signal; and transmitting, from the central data terminal to the second intermediate data terminal, responsive to receiving the second IDT-packet signal, an acknowledgement signal.

66. The method as set forth in claim 64, further including the steps of:

receiving, at the central data terminal from the second intermediate data terminal, the second plurality of RCN-packet signals;

comparing, at the central data terminal, the second plurality of RCN-packet signals to the first plurality of RCN-packet signals; and identifying a third plurality of RCN-packet signals common to both the first plurality of RCN-packet signals and the second plurality of RCN-packet signals.

67. The method as set forth in claim 66, further including the step of:

deleting the third plurality of RCN-packet signals.

68. The method as set forth in claim 66, further including the step of:

overwriting the third plurality of RCN-packet signals.

69. The method as set forth in claim 55, further including the steps of:

eavesdropping, by a second intermediate data terminal, to the second polling signal;

eavesdropping, by the second intermediate data terminal, to the transmission of the first plurality of RCN-packet signals;

comparing, by the second intermediate data terminal, the first plurality of RCN-packet signals to a second plurality of RCN-packet signals, said second plurality of RCN-packet signals being stored by the second intermediate data terminal in a memory; and identifying a third plurality of RCN-packet signals common to both the first plurality of RCN-packet signals and the second plurality of RCN-packet signals.

70. The method as set forth in claim 69, further including the step of:

deleting the third plurality of RCN-packet signals from the memory.

71. The method as set forth in claim 69, further including the step of:

overwriting the third plurality of RCN-packet signals.

72. The method as set forth in claim 69, further including the step of:

transmitting, synchronized to the IDT-synchronization signal in a ninth channel of the frame, from the central data terminal to the second intermediate data terminal, a third polling signal;

receiving, at the second intermediate data terminal, the third polling signal; and transmitting, synchronized to the IDT-synchronization signal, in a tenth channel of the frame, from the second intermediate data terminal to the central data terminal, responsive to the third polling signal, the second plurality of stored RCN-packet signals, but not including the third plurality of RCN-packet signals, as a second IDT-packet signal.

73. The method as set forth in claim 57, further including the steps of:

detecting, at the first network service module, an alarm condition; and transmitting, responsive to detecting the alarm condition, in the real-time request channel of the frame, from the first network service module to the central data terminal, the alarm condition.

74. A method for communicating between a central data terminal (CDT), a plurality of remote cell nodes (RCN), and a plurality of network service modules (NSM), using a plurality of frames with each frame having a plurality of channels, comprising the steps, during each frame, of:

transmitting, in a first channel of the frame, from the central data terminal to the plurality of remote cell nodes, a CDT-synchronization signal;

transmitting, synchronized to the CDT-synchronization signal, in a second channel of the frame, from the central data terminal to a first remote cell node, a first polling signal;

receiving, at each of the plurality of remote cell nodes, the CDT-synchronization signal;

synchronizing, at each of the plurality of remote cell nodes, responsive to receiving the CDT-synchronization signal, an RCN-timing circuit to the CDT-synchronization signal;

transmitting, using radio waves, in a third channel of the frame, from each of the plurality of remote cell nodes to the plurality of network service modules, responsive to receiving and synchronizing to the CDT-synchronization signal, an RCN-synchronization signal;

receiving, at each of the plurality of network service modules, the ECN-synchronization signal;

synchronizing, at each of the plurality of network service modules, responsive to receiving the RCN-synchronization signal, an NSM-timing circuit to the RCN-synchronization signal;

collecting, at the plurality of network service modules, data from a plurality of physical devices, respectively;

transmitting, using radio waves, in a fourth channel of the frame, from the first remote cell node to a first network service module, a command signal;

receiving, at the first network service module, the command signal;

transmitting, using radio waves, synchronized to the RCN-synchronization signal and responsive to the command signal, in a fifth channel of the frame, from the first network service module to the first remote cell node, data as an NSM-packet signal;

receiving, at the first remote cell node, the NSM-packet signal;

storing, at the first remote cell node, the NSM-packet signal;

receiving, at the first remote cell node, the first polling signal; and transmitting, synchronized to the CDT-synchronization signal and responsive to the first polling signal, in a sixth channel of the frame, from the first remote cell node to the central data terminal, a first plurality of stored NSM-packet signals as a first RCN-packet signal.

75. The method as set forth in claim 74, further including the steps of:

receiving, at the central data terminal, the first RCN-packet signal; and transmitting, in an seventh channel of the frame, from the central data terminal to the first remote cell node, responsive to receiving the first RCN-packet signal, an acknowledgement signal.

76. The method as set forth in claim 74, further including the step of:

transmitting, in a real-time request channel of the frame, from the central data terminal to the first network service module, a CDT-request for a set of requested data;

receiving, at the first network service module, the CDT-request; and transmitting, responsive to the CDT-request and in real-time, from the first network service module to the central data terminal, the set of requested data.

77. The method as set forth in claim 74, further including the steps of:

eavesdropping, by a second remote cell node, to the first polling signal;

eavesdropping, by the second remote cell node, to the transmission of the first plurality of stored NSM-packet signals;

comparing, by the second remote cell node, the first plurality of stored NSM-packet signals to a second plurality of stored NSM-packet signals, said second plurality of stored NSM-packet signals being stored by the second remote cell node in a memory; and identifying a third plurality of NSM-packet signals common to both the first plurality of stored NSM-packet signals and the second plurality of stored NSM-packet signals.

78. The method as set forth in claim 77, further including the step of:

deleting the third plurality of NSM-packet signals from the memory.

79. The method as set forth in claim 77, further including the step of:

overwriting the third plurality of NSM-packet signals.

80. The method as set forth in claim 77, further including the step of:

transmitting, synchronized to the CDT-synchronization signal in an eighth channel of the frame, from the central data terminal to the second remote cell node, a second polling signal;

receiving, at the second remote cell node, the second polling signal; and transmitting, synchronized to the CDT-synchronization signal, in a ninth channel of the frame, from the second remote cell node to the central data terminal, responsive to the second polling signal, the second plurality of stored NSM-packet signals, but not including the third plurality of NSM-packet signals, as a second RCN-packet signal.

81. The method as set forth in claim 80, further including the steps of:

receiving, at the central data terminal, the second RCN-packet signal; and transmitting, from the central data terminal to the second remote cell node, responsive to receiving the second RCN-packet signal, an acknowledgement signal.

82. The method as set forth in claim 74, further including the steps of:

receiving, at the central data terminal, from a second remote cell node, a second plurality of NSM-packet signals as a second RCN-packet signal;

comparing, at the central data terminal, the second plurality of NSM-packet signals to the first plurality of NSM-packet signals; and identifying a third plurality of NSM-packet signals common to both the first plurality of NSM-packet signals and the second plurality of NSM-packet signals.

83. The method as set forth in claim 82, further including the step of:

deleting the third plurality of NSM-packet signals.

84. The method as set forth in claim 82, further including the step of:

overwriting the third plurality of NSM-packet signals.

85. The method as set forth in claim 76, further including the steps of:

detecting, at the first network service module, an alarm condition; and transmitting, responsive to detecting the alarm condition, in the real-time request channel of the frame, from the first network service module to the central data terminal, the alarm condition.

* * * * *

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 1, line 6, please delete the word "Mar." and replace with the word "May".

Column 6, line 33, please replace the word "nodes" with the word "node".

Column 7, line 37, please replace the word "or" with the word "of".

Column 8, line 9, please replace the word "IPH" with the word "IRH".

Column 8, line 30, please replace the word "is" with the word "are".

Column 8, line 64, please insert the numeral "54" after the word "FIG.".

Column 9, line 1, please delete the word "and".

Column 9, line 2, please delete the word "illustrates".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 9, line 4, please replace the "." with a ";".

Column 9, line 6, please replace the "." with a ";".

Column 9, line 9, please insert the words "shows an" after the numeral "61".

Column 9, line 57, please replace the word "They" with the word "The".

Column 9, line 59, please delete the word "a".

Column 10, line 36, please replace the word "a" with the word "an".

Column 11, line 17, please delete the ",".

Column 12, line 11, please replace "pseudo-random" with the word "pseudorandom".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 12, line 49, please replace the word "Transmitter" with the word "transmitter".

Column 13, line 6, please replace the word "Transmitter" with the word "transmitter".

Column 13, line 13, please replace the word "An" with the word "an".

Column 14, line 10, please replace the word "race" with the word "rate".

Column 14, line 34, please replace the word "tapering" with the word "tampering".

Column 15, line 12, please replace the word "A" with the word "An".

Column 17, line 10, please replace the word "race" with the word "rate".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 17, line 15, please replace the word "confiming" with the word "confirming".

Column 17, line 28, please replace the word "innerfere" with the word "interfere".

Column 17, line 32, please replace the word "ocher" with the word "other".

Column 17, line 66, please replace the word "nodule" with the word "module".

Column 18, line 38, please insert the word "the" following the words "subset of".

Column 19, line 37, please delete the "-" between the words "the" and "remote".

Column 19, line 51, please replace the word "see" with the word "set".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 20, line 6, please replace the word "The" with the word "the".

Column 20, line 36, please insert a "." following the word "immediately". Please insert the word "In" preceding the words "this way".

Column 20, line 49, please replace the word "module's" with the word "modules".

Column 20, line 51, please replace the word "co" with the word "to".

Column 21, line 7, please replace the word "races" with the word "rates".

Column 21, line 14, please replace the word "general" with the word "generally".

Column 21, line 61 and 62, please replace the word "innermediate" with the word "intermediate".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 22, line 31, please replace the word "no" with the word "to".

Column 22, line 49 and 50, please delete the "-" between the words "packet" and "signal".

Column 23, line 27, please replace the word "antennas" with the word "antenna".

Column 23, line 29, please replace the word "call" with the word "cell".

Column 23, line 41, please insert the word "the" between the words "by" and "intermediate".

Column 24, line 62, please replace the word "mode" with the word "node".

Column 24, line 63, please replace "31 115" with "31-115".

Column 25, line 51, please add the word "level" following the word "terminal".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 26, line 13, please replace the word "chose" with the word "those".

Column 26, line 41, please replace the word "massage" with the word "message".

Column 26, line 53, please replace "5000" with "5,000".

Column 27, line 16, please add the word "to" before the word "suit".

Column 27, line 43, please delete one tab to align the paragraph.

Column 29, lines 13 and 14, please remove the bold highlight from the numerals "0, 1, .... , 28".

Column 29, line 28, please replace "IHR" with "IRH".

Column 29, line 40, please remove the bold highlight from the numerals "0 to 28".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 29, line 58, please insert the word "the" following the word "of".

Column 30, line 51, please replace "{0}.3.XX10" with "{0} .3 .XX10".

Column 30, line 52, please replace "{0}.3.X000" with "{0} .3 .X000".

Column 30, line 53, please replace "{0 }" with "{0}". Please add a space between "{0}" and the word "link".

Column 30, line 59, please remove the bold highlight from the numerals "2, 6, 10 and 14".

Column 30, line 60, please replace "{0}.3.XX10" with "{0} .3 .XX10". Please replace the word "than" with the word "that".

Column 30, line 63, please replace "{0}.3.00XX" with "{0} .3 .00XX".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 30, line 64, please replace "{0}.3.XXX0" with "{0} .3 .XXX0," and replace "{0}.3.X010" with "{0} .3 .X010".

Column 31, line 24, please replace the word "sloes" with the word "slots".

Column 32, line 50, please replace the word "synchronizatin" with the word "synchronization".

Column 35, line 13, please remove the bold highlight from the numerals "0-15".

Column 35, line 14, please remove the bold highlight from the numerals "15-28".

Column 35, line 16, please remove the bold highlight from the numerals "0-15".

Column 35, line 17, please remove the bold highlight from the numerals "0..15".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 36, line 8, please replace the words "terminal—remote" with the words "terminal - remote".

Column 36, line 10, please replace the word "date" with the word "data".

Column 36, line 25, please replace the word "relative" with the word "relatively".

Column 36, line 41, please highlight in bold the words "Flow Control".

Column 36, line 44, please highlight in bold the words "Stop-and-Wait Flow Control".

Column 36, line 48, please highlight in bold the words "Sliding-Window Flow Control".

Column 36 line 55, please highlight in bold the words "Error Control".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 36, lines 61 and 62, please highlight in bold the words "automatic repeat request".

Column 36, line 65, please highlight in bold the words "Error Detection".

Column 36, line 66, please highlight in bold the words "Positive Acknowledgement".

Column 37, line 9, please highlight in bold the words "Stop-and-Wait ARQ".

Column 37, line 18, please highlight in bold the words "Go-back-N ARQ".

Column 37, line 27, please highlight in bold the words "Selective-reject ARQ".

Column 37, line 33, please replace the word "no" with the word "to".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 37, line 34, please replace the symbol "$\leqq$" with the symbol "$\leq$".

Column 37, line 37, please replace the word "TranSport" with the word "Transport".

Column 37, line 48, please highlight in bold the words "Error Detection and Correction".

Column 37, line 58, please insert "e.g.," following the words "cyclic code".

Column 37, line 65, please highlight in bold the words "Path Redundancy and Collision Avoidance".

Column 38, line 16, please highlight in bold the words "Message Redundancy and Self-sufficiency".

Column 39, line 15, please replace the word "date" with the word "data".

UNITED STATES PATENT AND TRADEMARK OFFICE
CERTIFICATE OF CORRECTION

PATENT NO. : 5,673,252

DATED : September 30, 1997

INVENTOR(S) : Dennis F. Johnson, Don Marcynuk, Erwin Holowick

It is certified that error appears in the above-identified patent and that said Letters Patent is hereby corrected as shown below:

Column 40, line 34, please replace the word "sloes" with the word "slots".

Column 41, line 42, please delete the "." between the words "IRD/RIR" and "links".

Column 42, line 1, please highlight in bold the words "Broadcast Addressing".

Column 44, line 58, please replace the word "no" with the word "to".

Column 44, line 65, please delete the "." between the words "every" and "little".

Column 44, line 66, please delete the "." between the words "requires" and "that".

Column 45, line 5, please replace the word "no" with the word "to" following the words "decisions as". Please replace the word "no" with the word "to" following the words "and when".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 46, line 12, please replace the word "illustrates" with the word "illustrate".

Column 48, line 21, please replace the word "an" with the word "a".

Column 48, line 65, please replace the word "non" with the word "not".

Column 48, line 67, please replace the word "in" with the word "it".

Column 52, line 9, please insert the word "RIQ" between the words "the" and "after".

Column 53, line 6, please replace the word "transmitred" with the word "transmitted". Please delete the "," following the word "transmitted". Please replace the word "non-discarded" with the word "non-discardable".

Column 53, line 7, please delete the "," between the words "to" and "identify".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick.

It is certified that error appears in the above-identified patent and that said Letters Patent is hereby corrected as shown below:

Column 53, line 38, please highlight in bold the words "Edge-Gather and Partial Poll".

Column 53, line 44, please replace the word "ochers" with the word "others".

Column 53, line 47, please highlight in bold the words "Wider-Gather and Partial Poll".

Column 53, line 52, please highlight in bold the words "Table Based Message Acceptance".

Column 53, line 55, please replace the word "an" with the word "a".

Column 53, line 57, please highlight in bold the words "Random Discard".

Column 53, line 64, please highlight in bold the words "Random Discard Based on Signal Strength".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 54, line 3, please highlight in bold the words "Signal Strength with Exception List".

Column 54, line 60, please highlight in bold the words "Control Fields".

Column 54, line 62, please highlight in bold the word "msgtype".

Column 54, line 66, please highlight in bold the word "msgno".

Column 55, line 5, please highlight in bold the word "revpoll".

Column 55, line 8, please highlight in bold the words "protocol status".

Column 55, line 18, please highlight in bold the word "priority".

Column 55, line 20, please highlight in bold the words "Network Message Field".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 55, line 32, please replace the word "an" with the word "a".

Column 55, line 36, please replace the ";" with a "," following the word "numbering".

Column 55, line 39, please highlight in bold the words "Broadcast to Class Address Messages".

Column 55, line 43, please replace the word "(cofftend)" with the word "(command)".

Column 55, lines 49 and 50, please highlight in bold the words "Delivery to Individually Addressed Network Service Modules".

Column 55, line 60, please highlight in bold the words "CAT Distribution".

Column 56, line 1, please highlight in bold the word "nsmtyp".

Column 56, line 2, please highlight in bold the word "appltyp".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 56, line 7, please replace the word "applcyp" with the word "appltyp".

Column 56, line 9, please highlight in bold the words "CAT ID".

Column 56, line 11, please highlight in bold the words "CAT version".

Column 56, line 13, please highlight in bold the words "NRR channel bitmap".

Column 56, line 14, please remove the bold highlighting from the numerals "1" and "28".

Column 56, line 18, please highlight in bold the words "RND broadcast subchannel".

Column 56, line 26, please highlight in bold the words "RND reverse poll subchannel".

Column 56, line 60, please replace the word "line" with the word "link".

UNITED STATES PATENT AND TRADEMARK OFFICE
CERTIFICATE OF CORRECTION

PATENT NO. : 5,673,252

DATED : September 30, 1997

INVENTOR(S) : Dennis F. Johnson, Don Marcynuk, Erwin Holowick

It is certified that error appears in the above-identified patent and that said Letters Patent is hereby corrected as shown below:

Column 57, line 1, please highlight in bold the word "control".

Column 57, line 4 please replace both "$\leqq$" symbols with the symbol "$\leq$".

Column 57, line 10, please highlight in bold the word "length".

Column 57, line 12, please highlight in bold the words "NSM msg IDs".

Column 57, line 14, please highlight in bold the words "intermediate CRC".

Column 57, line 15, please highlight in bold the words "RCN status".

Column 57, line 25, please highlight in bold the words "NSM msg contents".

Column 57, line 29, please highlight in bold the word "ptag".

Column 57, line 30, please highlight in bold the word "vtag".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 57, line 31, please highlight in bold the word "dtag".

Column 57, line 33, please highlight in bold the word "etag".

Column 57, line 34, please highlight in bold the word "ttag".

Column 57, line 35, please highlight in bold the word "ftag".

Column 57, line 36, please highlight in bold the word "stag".

Column 57, line 37, please highlight in bold the word "crc".

Column 57, line 38, please highlight in bold the word "ctag".

Column 57, line 39, please highlight in bold the word "mtag".

Column 58, line 13, please replace the word "IPH" with the word "IRH".

Column 58, line 16, please highlight in bold the word "slottype".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 58, line 18, please highlight in bold the word "seqno".

Column 58, line 26, please highlight in bold the word "msgtype".

Column 58, line 27, please highlight in bold the word "index".

Column 58, line 29, please highlight in bold the word "special application control".

Column 58, line 31, please highlight in bold the word "SAC enable".

Column 58, line 37, please replace the word "IPH" with the word "IRH".

Column 58, line 49, please replace the word "than" with the word "that".

Column 59, line 7, please replace the words "form an" with the word "format".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 59, line 37, please highlight in bold the word "subchan".

Column 59, line 38, please highlight in bold the word "initialSlot".

Column 59, line 40, please highlight in bold the word "lifetime".

Column 59, line 42, please highlight in bold the word "position".

Column 60, line 9, please replace the word "an" with the word "at".

Column 60, line 18, please replace the words "form an" with the word "format".

Column 60, line 30, please highlight in bold the word "subchan".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 60, line 31, please highlight in bold the word "repetitions".

Column 60, line 32, please highlight in bold the word "lifetime".

Column 60, line 35, please highlight in bold the word "hashParms".

Column 60, line 37, please highlight in bold the word "criteria".

Column 61, line 37, please replace the word "Those" with the word "those".

Column 61, line 39, please replace the word "which" with the word "with".

Column 62, line 15, please highlight in bold the words "Fault Management".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 62, line 21, please replace the word "Transparent" with the word "transparent".

Column 62, line 29, please highlight in bold the words "Performance Management".

Column 63, lines 4 and 5, please highlight in bold the entirety of lines 4 and 5.

Column 63, line 53, please replace the word "These" with the word "these".

Column 65, line 23, please replace the word "an" with the word "a".

Column 65, line 59, please replace the paragraph heading "MSGHD.RIO" with "MSGHD.RIQ".

Column 65, line 65, please replace the paragraph heading "MSGHD.UIO" with MSGHD.UIQ".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 66, line 10, please replace the word "She" with the word "the".

Column 66, lines 63 and 64, please highlight in bold the entirety of lines 63 and 64.

Column 67, line 3, please replace the word "an" with the word "a".

Column 68, line 13, please replace the word "than" with the word "that".

Column 68, lines 16 and 17, please highlight in bold the entirety of lines 16 and 17.

Column 68, lines 32 and 33, please highlight in bold the entirety of lines 32 and 33.

Column 68, line 56, please highlight in bold the words "Configuration Control Database Items".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 68, line 59, please replace the words "customer+an" with the words "customer + an".

Column 68, line 61, please highlight in bold the words "Performance Management Database Items".

Column 69, line 6, please insert a paragraph break preceding the word "Ten".

Column 69, line 8, please highlight in bold the words "Fault Management Database Items".

Column 69, line 18, please highlight in bold the entirety of line 18.

Column 70, lines 22 and 23, please have the number "240,000" placed on one line only.

Column 71, line 7, please replace the word "wish" with the word "with".

Column 71, line 13, please delete the word "is".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 72, line 46, please replace the word "races" with the word "rates".

Column 72, line 56, please replace the word "a" with the word "an".

Column 73, line 27, please insert the word "the" between the words "in" and "future".

Column 77, line 4, please replace the word "tell" with the word "cell".

Column 77, line 17, please replace the word "step" with the word "steps".

Column 77, line 26, please replace the word "a" with the word "an".

Column 77, line 36, please replace the word "an" with the word "a".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 79, line 7, please replace the word "step" with the word "steps".

Column 79, line 40, please replace the word "step" with the words "steps".

Column 80, line 12, please replace the word "step" with the word "steps".

Column 81, line 15, please replace the word "etch" with the word "each".

Column 81, line 49, please replace the ":" with a ";".

Column 82, line 4, please replace the word "step" with the word "steps".

Column 82, line 38, please replace the word "step" with the word "steps".

Column 82, line 46, please replace the word "a" with the word "an".

UNITED STATES PATENT AND TRADEMARK OFFICE
CERTIFICATE OF CORRECTION

PATENT NO. : 5,673,252
DATED : September 30, 1997
INVENTOR(S) : Dennis F. Johnson, Don Marcynuk, Erwin Holowick It is certified that error appears in the above-identified patent and that said Letters Patent is hereby corrected as shown below:

Column 82, line 58, please replace the word "packet" with the word "RCN-packet".

Column 84, line 11, please replace the word "an" with the word "a".

Column 84, line 16, please replace the word "step" with the word "steps".

Column 84, line 51, please replace the word "step" with the word "steps".

Column 86, line 24, please replace the word "step" with the word "steps".

Column 86, line 36, please replace the word "an" with the word "at".

Column 86, line 67, please replace the word "step" with the word "steps".

UNITED STATES PATENT AND TRADEMARK OFFICE
CERTIFICATE OF CORRECTION

PATENT NO. : 5,673,252

DATED : September 30, 1997

INVENTOR(S) : Dennis F. Johnson, Don Marcynuk, Erwin Holowick.

It is certified that error appears in the above-indentified patent and that said Letters Patent is hereby corrected as shown below:

Column 87, line 16, please replace the word "an" with the word "at".

Column 88, line 17, please replace the word "step" with the word "steps".

Column 88, line 65, please replace the word "ECN-synchronization" with the word "RCN-synchronization".

Column 89, line 31, please replace the word "an" with the word "a".

Column 89, line 36, please replace the word "step" with the word "steps".

UNITED STATES PATENT AND TRADEMARK OFFICE
CERTIFICATE OF CORRECTION

PATENT NO. : 5,673,252

DATED : September 30, 1997

INVENTOR(S) : Dennis F. Johnson, Don Marcynuk, Erwin Holowick.

It is certified that error appears in the above-indentified patent and that said Letters Patent is hereby corrected as shown below:

Column 90, line 9, please replace the word "step" with the word "steps".

Signed and Sealed this

Seventh Day of July, 1998

*Attest:*

BRUCE LEHMAN

*Attesting Officer*   Commissioner of Patents and Trademarks